(12) United States Patent
Forbes, Jr. et al.

(10) Patent No.: US 10,311,416 B2
(45) Date of Patent: Jun. 4, 2019

(54) SYSTEMS AND METHODS FOR ADVANCED ENERGY SETTLEMENTS, NETWORK-BASED MESSAGING, AND APPLICATIONS SUPPORTING THE SAME

(71) Applicant: Causam Energy, Inc., Raleigh, NC (US)

(72) Inventors: Joseph W. Forbes, Jr., Raleigh, NC (US); Nathaniel Taylor Brockman, Mt. Pleasant, SC (US)

(73) Assignee: CAUSAM ENERGY, INC., Raleigh, NC (US)

( * ) Notice: Subject to any disclaimer, the term of this patent is extended or adjusted under 35 U.S.C. 154(b) by 764 days.

(21) Appl. No.: 14/918,840

(22) Filed: Oct. 21, 2015

(65) Prior Publication Data
US 2016/0117657 A1    Apr. 28, 2016

Related U.S. Application Data

(60) Provisional application No. 62/067,180, filed on Oct. 22, 2014.

(51) Int. Cl.
*G06Q 20/14* (2012.01)
*G06Q 30/02* (2012.01)

(52) U.S. Cl.
CPC ....... *G06Q 20/145* (2013.01); *G06Q 30/0202* (2013.01)

(58) Field of Classification Search
USPC .......... 705/310, 34; 700/286, 291, 295, 296
See application file for complete search history.

(56) References Cited

U.S. PATENT DOCUMENTS

| | | | |
|---|---|---|---|
| 6,900,556 B2 | 5/2005 | Provanzana et al. | |
| 6,978,931 B2 | 12/2005 | Brobeck | |
| 7,274,975 B2 | 9/2007 | Miller | |
| 7,890,436 B2 | 2/2011 | Kremen | |

(Continued)

FOREIGN PATENT DOCUMENTS

KR    20090033299 A    4/2009

OTHER PUBLICATIONS

Extended European Search Report, European Patent Office, Munich Germany, Mar. 18, 2018, Entire Document.

*Primary Examiner* — Eric W Stamber
*Assistant Examiner* — Arif Ullah
(74) *Attorney, Agent, or Firm* — NEO IP

(57) ABSTRACT

Systems and methods for electric power messaging and settlements including advanced energy settlements, messaging, and applications for electric power supply, load, and/or curtailment and data analytics associated with the same. Systems and methods for providing data analytics and customer or consumer guidance and controls are provided, and coupled with graphic user interfaces for interactive control and command of grid elements, design, specification, construction, management and financial settlement for data centers and/or microgrids, business and residential power consumption, control, management, messaging and settlements, mobile applications, websites, marketing offers, optimal pricing for comparable energy plans, retail electric provider and direct consumer alternatives, network of power architecture, EnergyNet applications, software development kit, and application web-based storefronts.

32 Claims, 50 Drawing Sheets

(56) References Cited

U.S. PATENT DOCUMENTS

| | | |
|---|---|---|
| 2003/0009401 A1 | 1/2003 | Ellis |
| 2003/0074244 A1* | 4/2003 | Braxton ................. G06Q 10/06 |
| | | 705/412 |
| 2004/0220869 A1 | 11/2004 | Perera |
| 2006/0276938 A1 | 12/2006 | Miller |
| 2007/0276547 A1 | 11/2007 | Miller |
| 2008/0091580 A1 | 4/2008 | Kremen |
| 2008/0091581 A1 | 4/2008 | Kremen |
| 2008/0091590 A1 | 4/2008 | Kremen |
| 2008/0091625 A1 | 4/2008 | Kremen |
| 2008/0091626 A1* | 4/2008 | Kremen ................. G06Q 40/00 |
| | | 705/412 |
| 2008/0177678 A1* | 7/2008 | Di Martini ............. G01D 4/002 |
| | | 705/412 |
| 2009/0177548 A1 | 7/2009 | Eisenlohr |
| 2011/0040666 A1* | 2/2011 | Crabtree ............ G06Q 30/0283 |
| | | 705/37 |
| 2011/0208365 A1 | 8/2011 | Miller |
| 2011/0231028 A1 | 9/2011 | Ozog |
| 2013/0018821 A1 | 1/2013 | Shao |
| 2014/0222698 A1* | 8/2014 | Potdar ................. G06O 30/018 |
| | | 705/317 |
| 2014/0279711 A1* | 9/2014 | Angelis ................. G06Q 50/06 |
| | | 705/412 |

* cited by examiner

Figure 28

Find a Station

1. Locate and reserve stations near you now, in advance, or on your GPS itinerary.
2. Target marketing to user profile and priority.
3. "Green" app for people focused on recharging
4. "Urban" app for people focused on reserved parking
5. "Healthy" app for people focused on shopping.

Reserve a Station

1. Browse availability, fees, recharge strength, amenities, and nearby services
2. Book your reservation in advance
3. Pre-purchase one time or with subscription Arrive at your Station 1. Simply park your car, receive a push notification call to action
2. Purchase via smartphone device or in vehicle dash display
3. New users sign up by GPS Location, QR, RFID, Video, or EV Charger identification.

Enjoy your Parked Time

1. Vehicle recharging status, fees associated, browse offers, order food
2. Easily top-up or extend reservation
3. Discounts and parking validation is automatic by local retailers and marketers
4. Find my car! Video security monitoring. Enjoy your free WiFi videos and games!

Persona: Field Technician

Story: Field Technician installs the EnergyNet Grid Element Photo Capture application on any modern smartphone platform including Apple and Android.

Professional ruggedized devices can be pre-provisioned and shipped to technicians, or techs can use their own commodity equipment available over the counter.

Persona: Field Technician

Story: Field Technician launches the application for the first time and approves the application to record / geotag pictures.

Persona: Field Technician

Story: Field Technician authenticates via single sign-on with cloud service, such as Google, or enterprise service such as Active Directory or SAP.

Persona: Field Technician

Story: Inside the application, the primary function is to take pictures of grid elements, meters, infrastructure, and power bill invoices.

The video camera on the device instantly activates and displays in the view finder the object the smartphone camera is pointed at.

Users press the 'Take Photo' button to capture an image.

Persona: Field Technician

Story: After taking the image, the user is prompted to tag the content with a drop down list of selections, free form text, and optical character recognition review + approval.

Example of this is OCR can be used to automatically detect meter manufacturer brand information, face place data, or LCD real time datapoints.

Persona: Field Technician

Story: After the photo is tagged, the user 'Submits Grid Element' and the image, tagging, description, location, geoTag is all sent to the server side.

SYSTEMS AND METHODS FOR ADVANCED ENERGY SETTLEMENTS, NETWORK-BASED MESSAGING, AND APPLICATIONS SUPPORTING THE SAME

CROSS-REFERENCES TO RELATED APPLICATIONS

This application claims priority from U.S. Provisional Patent Application No. 62/067,180 filed Oct. 22, 2014, which is in incorporated herein by reference in its entirety.

BACKGROUND OF THE INVENTION

1. Field of the Invention

The present invention relates to electric power messaging and settlements, and more particularly, to advanced energy settlements, messaging, and applications for electric power supply, load, and/or curtailment and data analytics associated with the same.

2. Description of the Prior Art

Generally, it is known in the prior art to provide electric power systems management including financial settlements and messaging. However, limited information is available to electric power consumers regarding their past, present, and future projected use of power with sufficient details to make informed choices about types of power supply and pricing alternatives. Furthermore, retail electric providers (REPs) in prior art systems and methods have no access to data and analytics to provide optimal pricing for power supply to business and/or residential electricity customers, and do not have the ability to provide advanced energy settlements to provide the lowest pricing for power supplied at predetermined times, due at least in part to costs associated with obtaining power agreements without visibility to the data and analytics that provides reduced risk of capital and performance associated with the supply and demand sides.

Examples of prior art documents include the following:

U.S. Pat. No. 6,978,931 for Energy credit card system by inventor Brobeck issued Dec. 27, 2005 describes a method of providing an energy credit system for providing redeemable energy or mass transit credits to consumers who contribute power to a shared electric power grid, wherein at least some of the consumers have their own local renewable energy source connected to the power grid including the steps of measuring the excess power generated by each consumer's energy source that is fed into the electric power grid, awarding energy credits to each of the consumers in relation to the excess power contributed to the electric power grid by the consumer, allowing each consumer receiving the energy credits to redeem them by acquiring fuel, power, or mass transit tickets from a fuel or power provider or mass transit system, and requiring the operator of the electric power grid to compensate the fuel for energy provided or mass transit system in direct relation to the energy credits redeemed by each consumer. Additionally, it claims recording the credits at an energy brokerage house, requiring the operator of the power grid to compensate the brokerage house for the expenses generated by the consumers, and allowing the brokerage house to retain as profit a portion of the compensation received from the operator of the power grid. See also, US Patent Application Publication No. 20040206813.

U.S. Pat. No. 6,900,556 by Provanzana, and assigned on the face of the patent to American Electric Power Company, Inc., for Power load-leveling system and packet electrical storage issued May 31, 2005, describing a large-scale, capacitor-based electrical energy storage and distribution system capable of effectuating load-leveling during periods of peak demand and a cost savings associated with the purchase of electrical energy; and disclosing a method of storing and distributing electrical energy to achieve a cost savings associated with the purchase thereof including the steps of providing a source of electrical energy, providing at least one electrical energy storage capacitor capable of storing a significant amount of energy, the capacitor in communication with the source, providing control equipment adapted to analyze and monitor the real-time cost of purchasing electrical energy from the source and to predict a future cost, supplying an amount of electrical energy to the capacitor to charge it in response to a charge signal from control equipment, discharging at least a portion of the stored energy to a load, and repeating to maximize cost savings; also disclosing deducting the value of the electrical energy sold back to the source for any costs of purchasing energy from the source. See also US Patent Application Pub. No. 20030160595.

US Patent Application Pub. No. 20090177548 for Cooperative environmental and life benefit exchange system by Eisnlohr filed Jan. 9, 2009 and published Jul. 9, 2009 describing a cooperative environmental and life benefit system including a grid transmitting available energy, a plurality of rate payers using energy generated from available energy sources, a plurality of utility companies providing the grid, a plurality of credits redeemable for acquiring one or more of a plurality of life benefits, and an administrator overseeing a redemption process, wherein credits are accumulated by the rate payers based on either a predetermined amount of electrical energy purchased from or sold back to the grid; further describing the redemption process wherein credits accumulated by the payers are redeemed at a redemption rate to provide a redemption value, which is remitted by the rate payers to satisfy benefit cost for acquiring the benefits, or portions thereof.

U.S. Pat. No. 7,274,975 for Optimized energy management system by Miller and assigned to Gridpoint, Inc., issued Sep. 25, 2007 describing methods and systems for optimizing the control of energy supply and demand, including activating battery storage and alternative energy sources to sell energy to the power grid during favorable cost conditions, including method steps for allocating energy at a location where the electrical energy is consumed, with computer-implemented steps of: determining a marginal cost for each of a plurality of energy sources available at the location, at least one of which is a non-grid source of electricity; determining a capacity of electrical energy available from each non-grid energy source; determining a demand for electrical energy at the location; dynamically allocating, in order of lowest marginal cost to highest marginal cost, electrical energy capacity from each of the plurality of energy sources to meet the demand; reducing demand at the location by automatically deferring electrical consumption for a device for which consumption can be deferred from a higher-cost time period to a lower-cost time period, including the computer-implemented step of issuing a command to the device to cause the deferral to occur, and further including determining projected marginal costs in each of a plurality of future time frames and deferring electrical consumption for the device to one of the plurality of future time frames, while conforming to an operational constraint for the device, the operational constraint for the device comprising a maximum time duration for which the device can be switched off; further including step of determining, on the basis of time-varying cost of grid-based electrical energy, whether it is cost-effective to sell electrical energy back to a grid-based source, and if so, automatically initiating such sale; and the step of selling electrical energy from a battery to the grid-based source. See also US Patent Application Pub. Nos. 20110208365, 20070276547, and 20060276938.

U.S. Pat. No. 7,890,436 for Billing and payment methods and systems enabling consumer premises equipment by Kremen and assigned to Clean Power Finance, Inc. issued Feb. 15, 2011 and describes a variety of systems and methods enabling renewable energy consumer premises equipment (CPE) such as dual metering techniques, and disclosing supporting by increasing a likelihood of meeting financing obligations, a consumer purchasing, leasing, installing, and/or maintaining renewable energy CPE for power generation at a consumer premises; coupling the CPE to a power grid operable to receive at least a portion of the power generated by the CPE, measuring power generated by the CPE and delivered onto the power grid of a utility, and processing receivables from the utility associated with the power generated and delivered onto the power grid directly to the lender at times corresponding to power measurement to fulfill the consumer's obligation to repay the loan. See also US Patent App. Pub. Nos. 20080091625, 20080091581, 20080091626, 20080091590, 20080091580.

Thus, there remains a need for improved information, controls, real-time or near-real-time data on power consumption for electric power market participants, REPs, customers, data centers, microgrid owners, and messaging and management of financial settlement therefor.

SUMMARY OF THE INVENTION

The present invention relates electric power messaging and settlements, and more particularly, to advanced energy settlements, messaging, and applications for electric power supply, load, and/or curtailment and data analytics associated with the same. Systems and methods for providing data analytics and customer or consumer guidance and controls are provided, and coupled with graphic user interfaces for interactive control and command of grid elements, design, specification, construction, management and financial settlement for data centers and/or microgrids, business and residential power consumption, control, management, messaging and settlements, mobile applications, websites, marketing offers, optimal pricing for comparable energy plans, retail electric provider and direct consumer alternatives, network of power architecture, EnergyNet applications, software development kit, application web-based storefronts, and combinations thereof.

The present invention provides for systems, methods, and graphic user interface embodiments for providing electric power usage (past, current, and/or future projected) information, management, financial settlements, and messaging, and applications as described herein.

An advanced energy settlement platform is provided including at least one server computer operable for communication over a network with a multiplicity of distributed computing devices. The advanced energy settlement platform aggregates consumption data from energy customers and aggregates revenue grad metrology data from distributed generators into settlement blocks. The advanced energy settlement platform further aggregates and settles distributed energy charges with distributed generators for energy consumers during the billing period through a clearing house. The advanced energy settlement platform further aggregates and settles fixed energy changes with the energy retailer or retail energy provider for energy customers during the billing period.

These and other aspects of the present invention will become apparent to those skilled in the art after a reading of the following description of the preferred embodiment when considered with the drawings, as they support the claimed invention.

BRIEF DESCRIPTION OF THE DRAWINGS

FIG. 28 illustrates another GUI screen shot showing EnergyNet App dashboard view for developing a profile for a building or facility.

DETAILED DESCRIPTION

Figure 1:
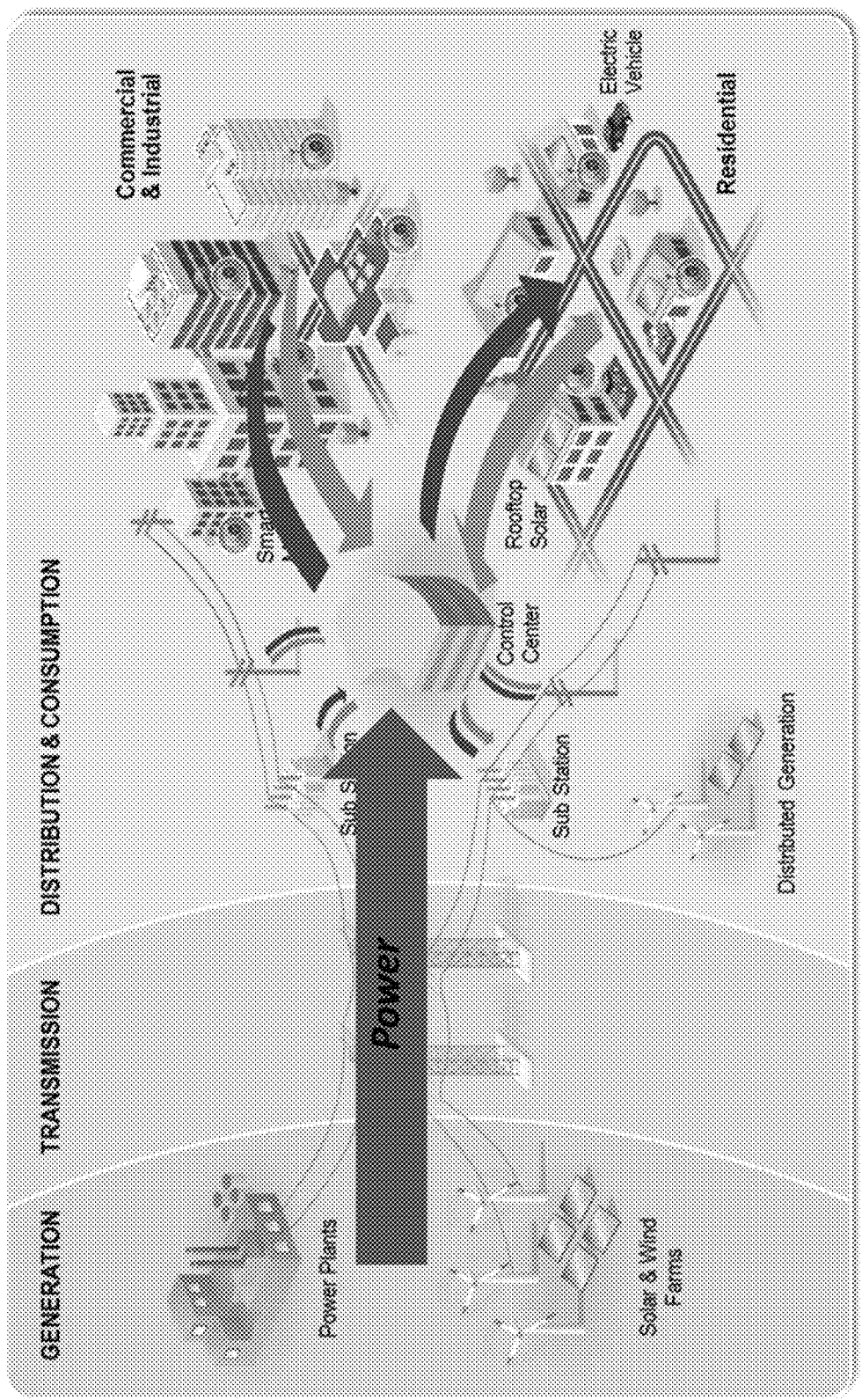
FIG. 1 illustrates an electric power grid in the present invention.

Referring now to the drawings in general, the illustrations are for the purpose of describing preferred embodiment(s) of the invention at this time, and are not intended to limit the invention thereto. Any and all text associated with the figures as illustrated is hereby incorporated by reference in this detailed description.

The present invention provides systems and methods for data analysis, messaging, advanced energy settlements, command and control and management of electric power supply, demand, and/or curtailment including graphic user interface for consumers, including consumer profiles and alternative pricing programs and/or settlement programs for business and residential applications, including but not limited to graphic user interfaces for interactive control and command of grid elements, design, specification, construction, management and financial settlement for data centers and/or microgrids, business and residential power consumption, control, management, messaging and settlements, mobile applications, websites, marketing offers, optimal pricing for comparable energy plans, retail electric provider and direct consumer alternatives, network of power architecture, EnergyNet applications, software development kit, application web-based storefronts, and combinations thereof. Apparatus embodiments are also provided in accordance with the systems and methods described herein.

Furthermore, novel methods of the present invention provided for consumer guidance and controls are coupled with graphic user interfaces for mobile applications, websites, and computer displays that provide improved information and controls for consumers for electric power consumption and management of financial settlement therefor.

In the description of the present invention, it will be understood that all EnergyNet embodiments and AES systems and methods descriptions include and incorporate by this reference without regard to individual, specific recitation for each example described, real-time and/or near-real-time data, including revenue grade metrology or revenue grade metrology equivalent (RGME) as defined herein, used for AES financial settlements. Additionally and similarly, real-time communication, messaging, and data packet transfer is provided over at least one network associated with the advanced energy settlement platform of the systems and methods of the present invention.

This detailed description of the present invention includes energy financial settlements and messaging and/or data packet transfer or transmission, including the following issued patents, copending application publications, and/or copending non-published applications by common inventor and/or assignee Causam Energy, Inc.: U.S. Pat. Nos. 8,849,715, 8,583,520, 8,595,094, 8,719,125, 8,706,583, 8,706,584, 2014/0180884, 8,775,283, 8,768,799, 2014/0279326, WO2014/066087, 2014/0039699, 2014/0277788, 2014/0039701, U.S. Pat. Nos. 8,588,991, 8,761,952, 2014/0277786, 2014/0277787, WO2014/022596, 2014/0039699, U.S. Pat. Nos. 8,849,715, 8,983,669, Ser. No. 14/885,525, each of which is incorporated by reference in its entirety herein.

FIG. 1 illustrates an overall electric power grid. Traditionally, it is largely One-Way Power Network from generation to transmission to distribution and consumption. The present invention reconstructs the traditional market and enables new market participants, including residential customers, and commercial and industrial customers. Residential customers may have their own power generation system (for example but not limited to rooftop solar systems) and their energy storage devices (for example but not limited to electric vehicles). Commercial and industrial buildings have smart meters installed.

Figure 2:
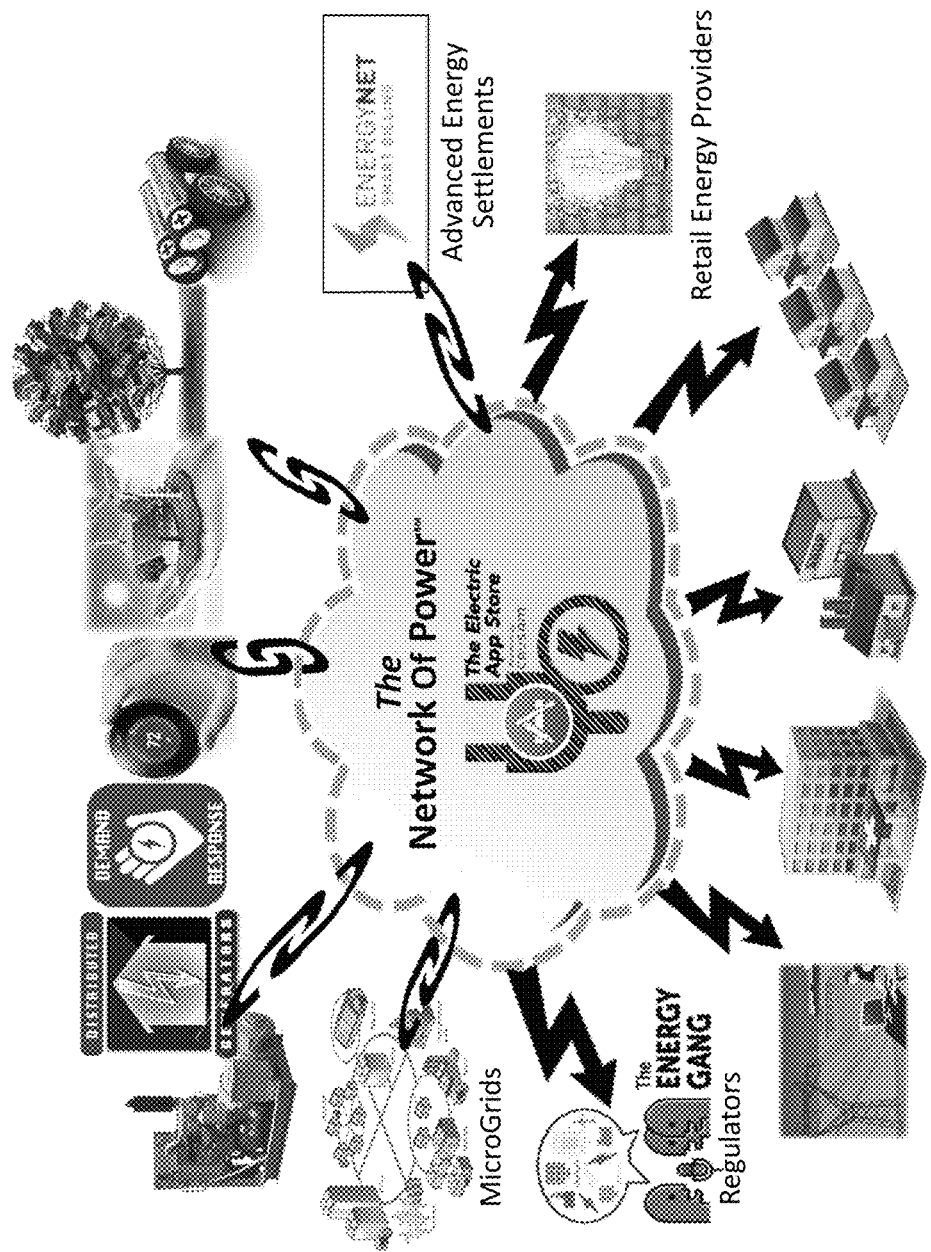
FIG. 2 illustrates a network of power with all the participants and the EnergyNet Platform in the present invention.

FIG. 2 is a network of power with all the participants and the EnergyNet Platform in the present invention. Different market participants are connected to the network of power with specific Application programs from an electric app store over an EnergyNet platform. The EnergyNet platform also provides advanced energy settlements for different market participants.

Figure 3:
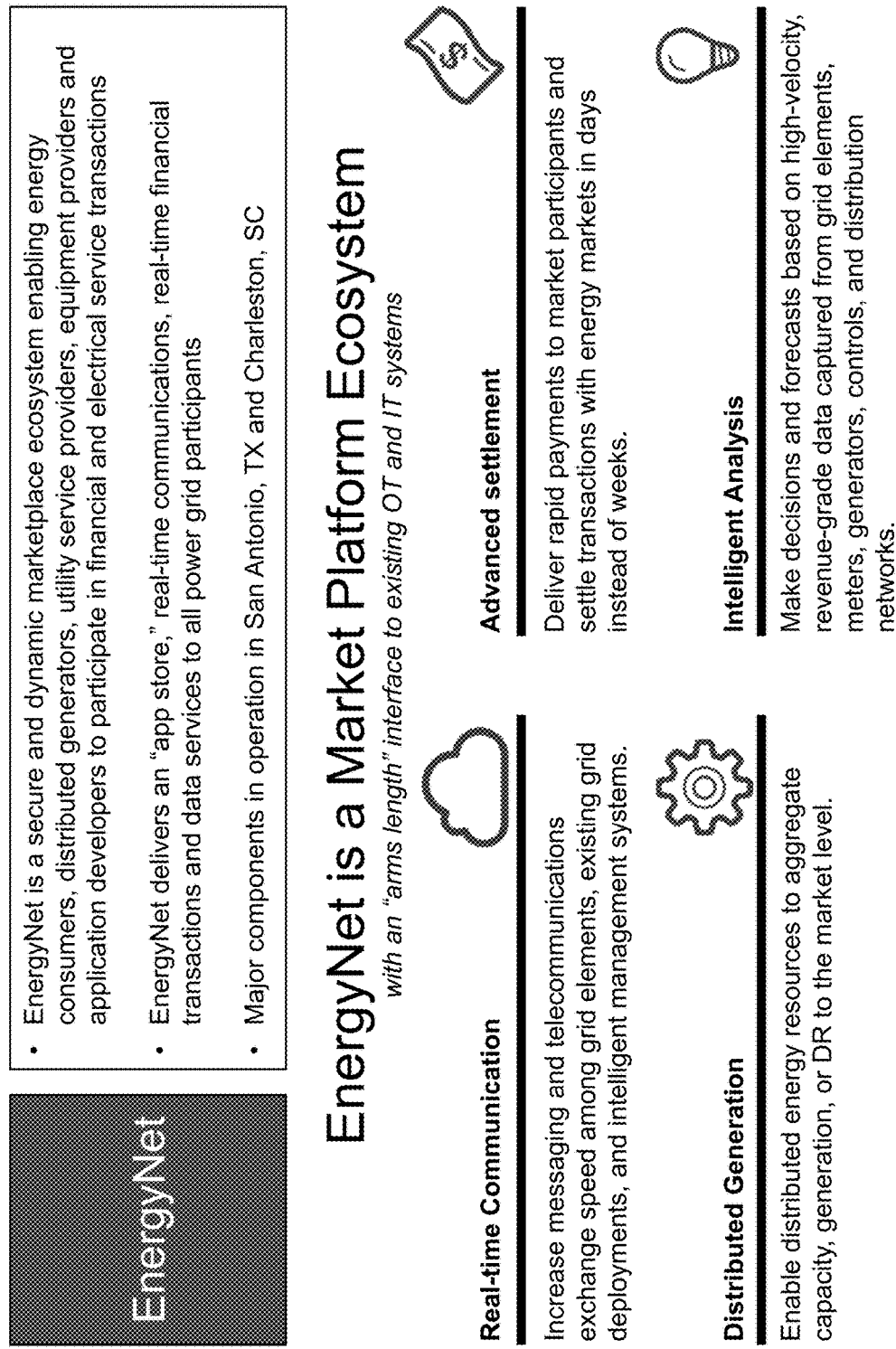
FIG. 3 illustrates EnergyNet features in the present invention.

FIG. 3 illustrates EnergyNet features in the present invention. EnergyNet is a secure and dynamic marketplace ecosystem enabling energy consumers, distributed generators, utility service providers, equipment providers and application developers to participate in financial and electrical service transactions. EnergyNet delivers an "app store," real-time communications, real-time financial transactions and data services to all power grid participants. EnergyNet is a market platform ecosystems with an "arm's length" interface to existing OT and IT systems. Real-time communication increases messaging and telecommunications exchange speed among grid elements, existing grid deployments, and intelligent management systems. Advanced settlements deliver rapid payments to market participants and settle transactions with energy markets in days instead of weeks; enables distributed energy resources to aggregate capacity, generation, or DR to the market level; and provides intelligent analysis including making decisions and forecasting based on high-velocity, revenue-grade data capture from grid elements, meters, generators, controls, and distribution networks.

Figure 4:
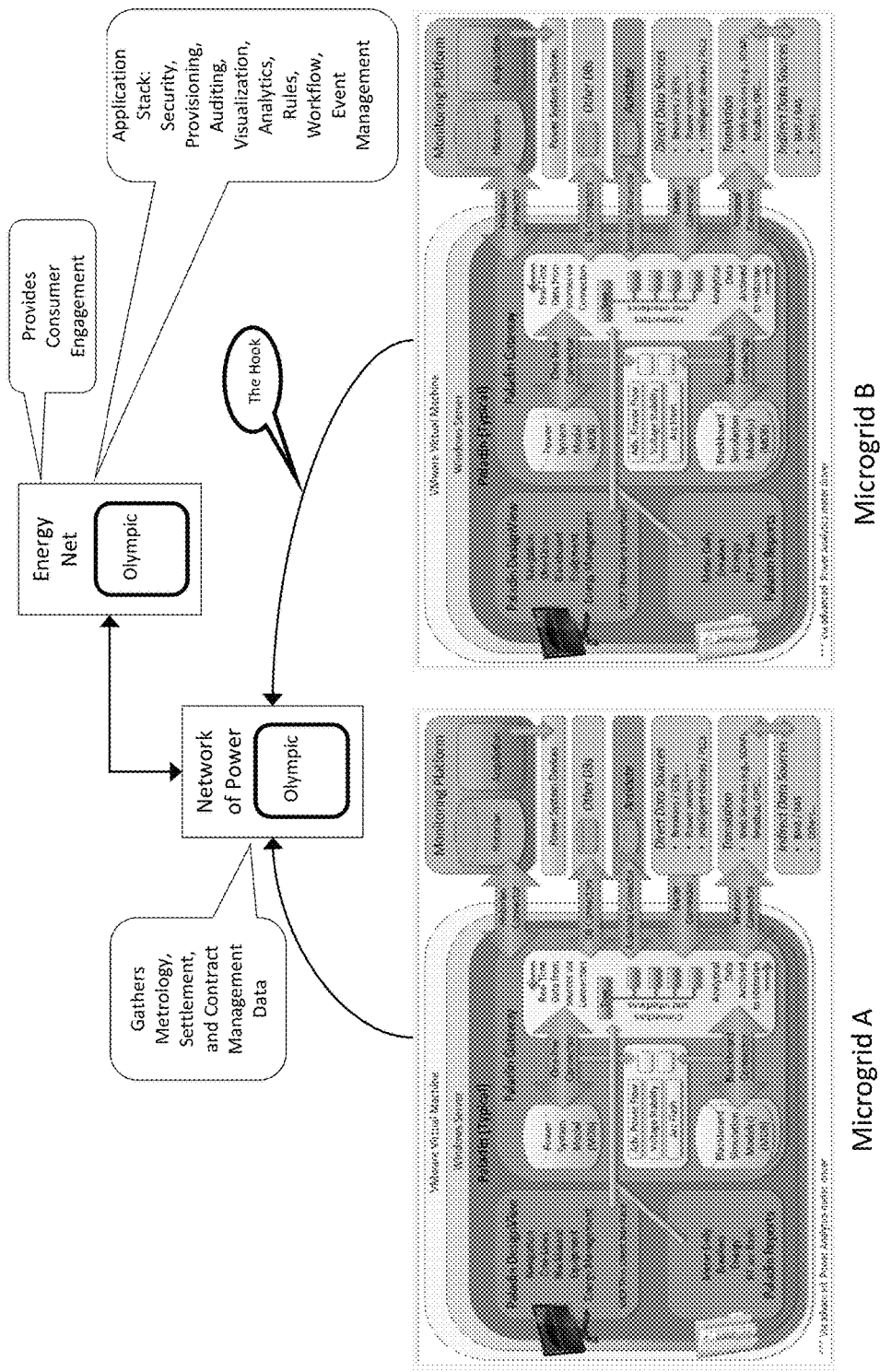
FIG. 4 illustrates an embodiment of a network of microgrids integrated with an EnergyNet platform.

FIG. 4 is a diagram of a microgrid integration. There are two microgrids, Microgrid A and Microgrid B, electrically and communicatively integrated to a network of power. An EnergyNet platform is coupled to the network of power. A detailed structure of Microgrid A and Microgrid B are illustrated in the two modules respectively. The network of power gathers metrology, settlement and contract management data from Microgrid A and Microgrid B. The EnergyNet platform has its application stack including security, provisioning, auditing, visualization, analytics, rules, workflow, event management. The EnergyNet platform provides consumer engagement.

Figure 5:
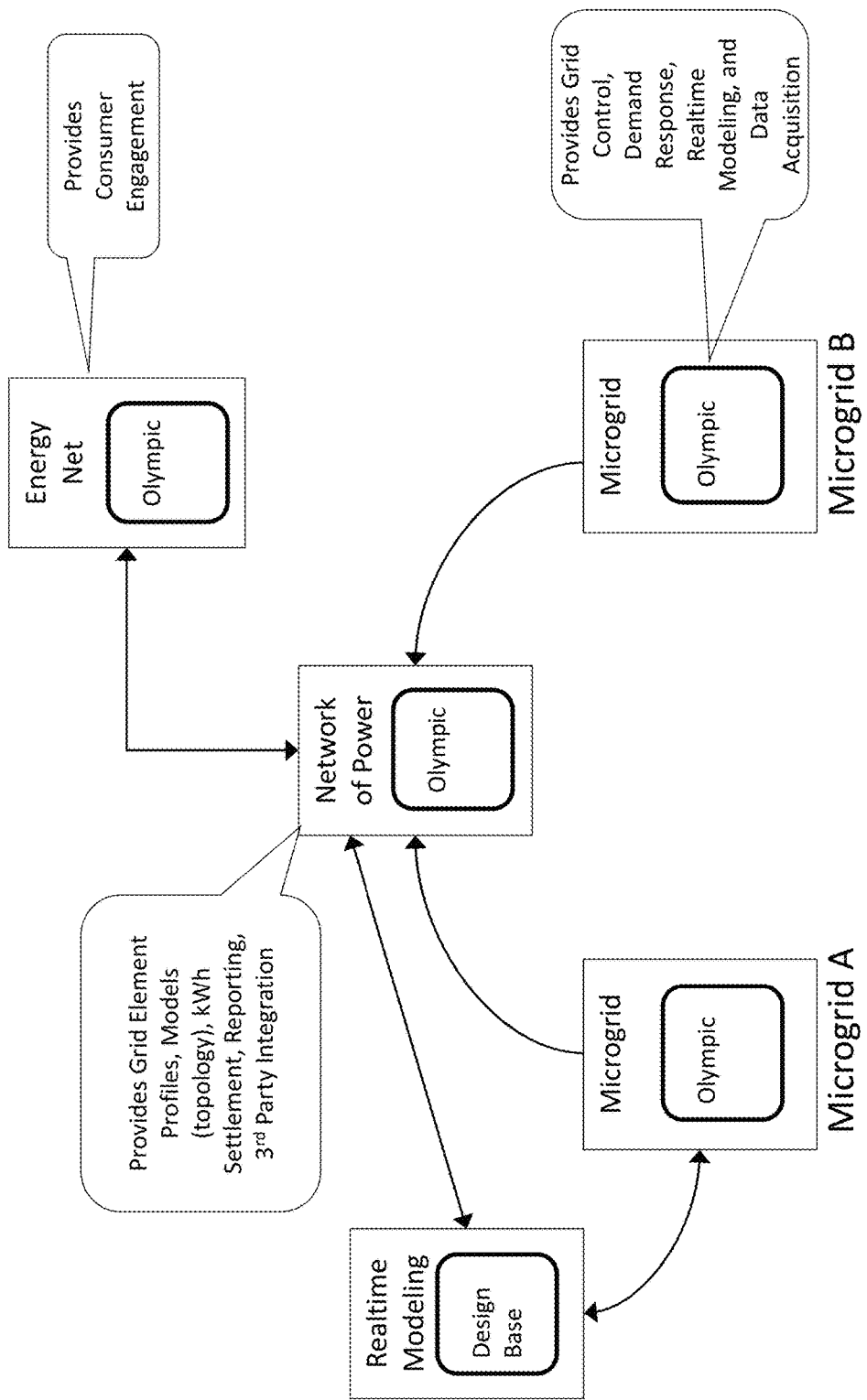
FIG. 5 illustrates another embodiment of a network of power microgrids integrated with an EnergyNet platform.

FIG. 5 is another diagram of microgrid integration. There are two microgrids, Microgrid A and Microgrid B. Microgrid B is electrically and communicatively integrated to a network of power, and provides grid control, demand response, real-time modeling, and data acquisition. Microgrid A is externally linked to a real-time modelling module. Both Microgrid A and the real-time model module are connected to the network of power for providing grid control, demand response, real-time modeling, and data acquisition. The network of power provides grid element profiles, models/topologies, kWh settlement, reporting, and third party integration. The network of power is coupled with an EnergyNet platform, which provides consumer engagement.

Figure 6:
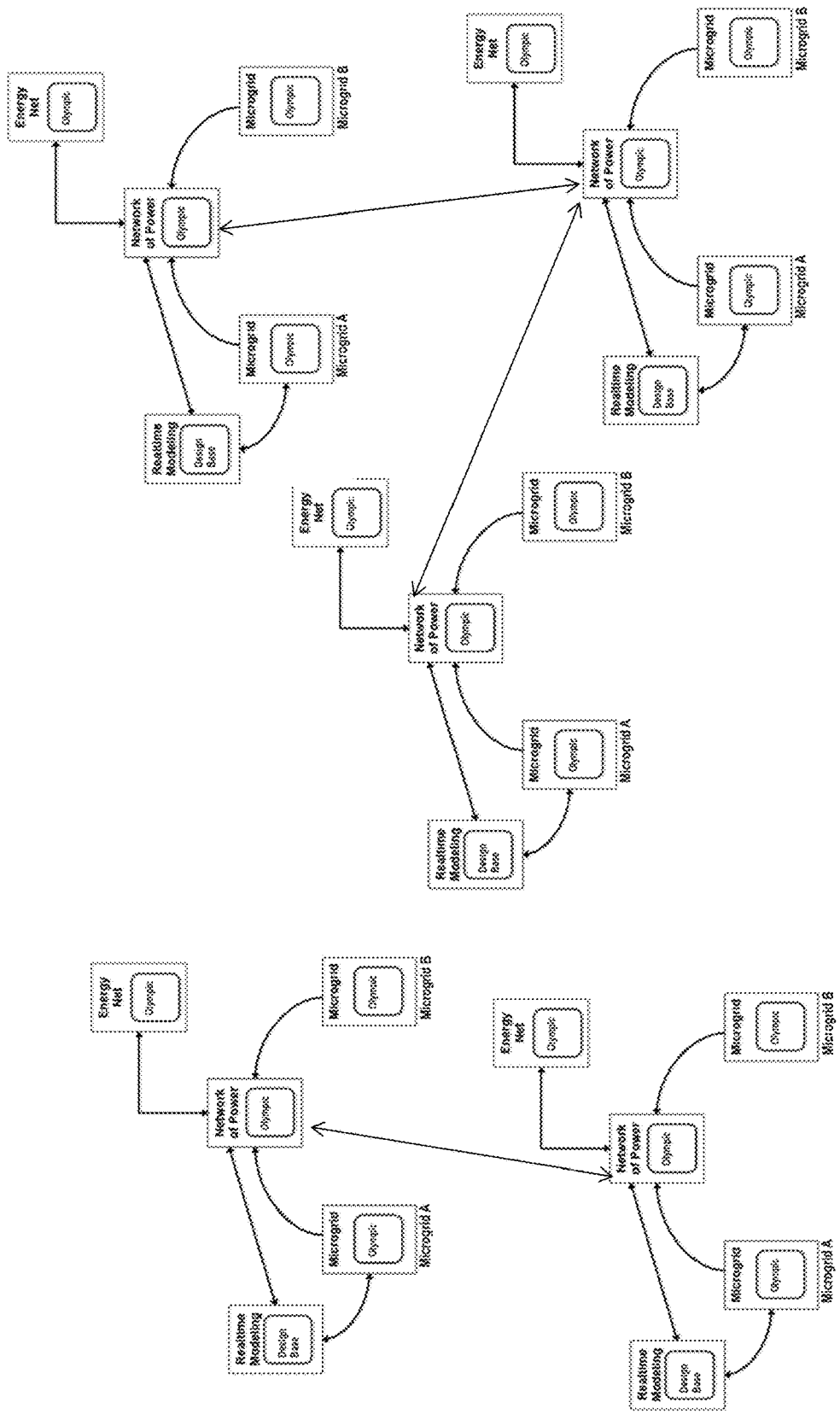
FIG. 6 is a scheme diagram of Federated Microgrid Communities comprising different grid zones.

FIG. 6 is a scheme diagram of Federated Microgrid Communities. These microgrid communities are located in different grid zones. Each of the microgrid communities has a structure shown in FIG. 5. There are communication links among different microgrid communities within a grid zone.

The present invention includes a multiplicity of interactive graphic user interface (GUI) for all aspects of AES and/or EnergyNet embodiments. By way of example and not limitation, as illustrated in the figures, at least one GUI is provided for electric power consumption for business or commercial facilities, including information and/or controls wherein the GUI is provided for mobile applications, websites, terminal and/or computer displays, and combinations thereof. For mobile applications, one embodiment includes a mobile communication computer device, such as a smartphone, tablet computer, or other mobile smart interactive communications device (personal/wearable or portable), having an application including software operable on a processor coupled with memory, wherein the mobile communication computer device is constructed and configured for network-based communication within a cloud-based computing system as illustrated in FIG. 7.

Figure 7:
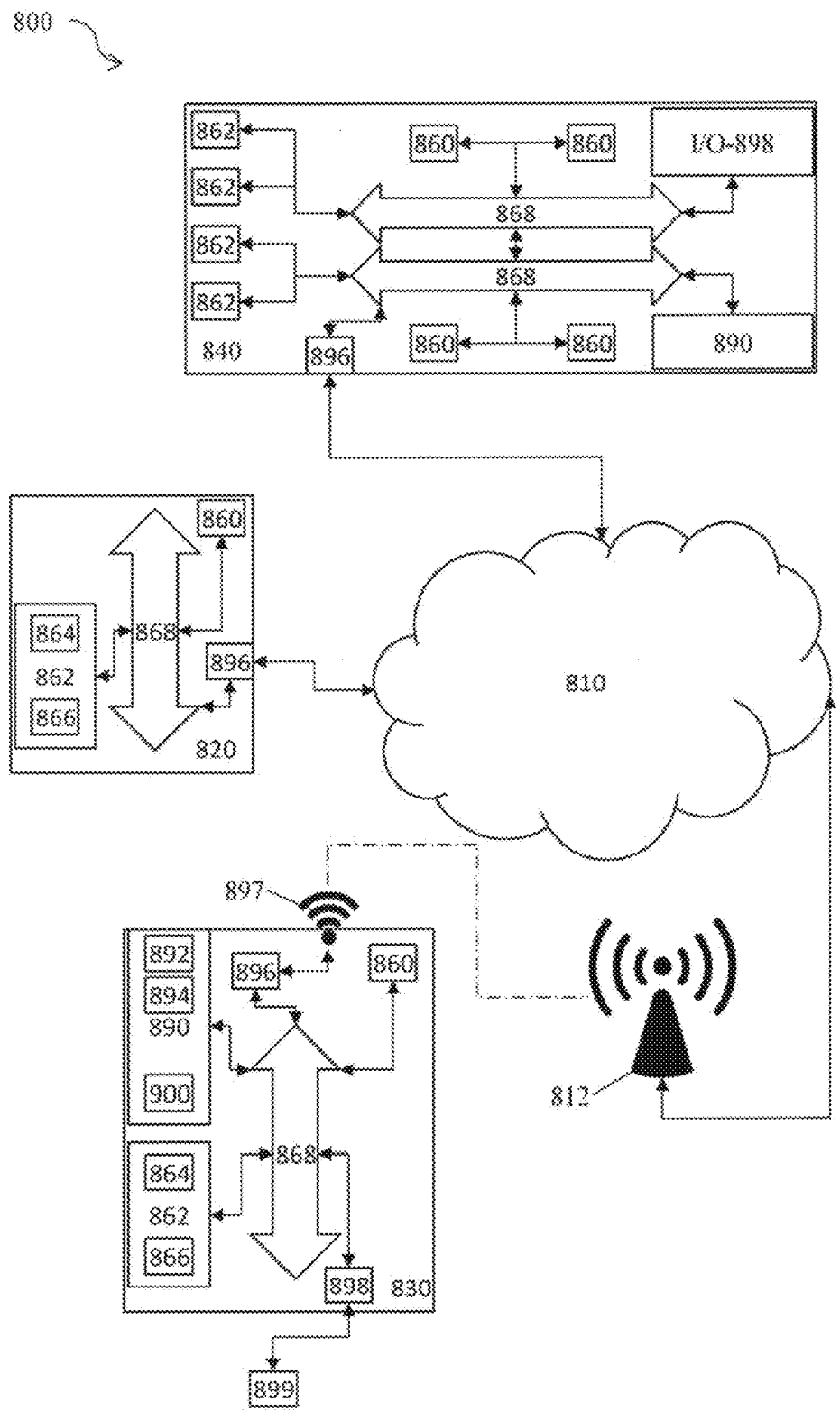
FIG. 7 illustrates a schematic diagram of an embodiment showing a configuration for a cloud-based computing system for user interface with the systems of the present invention.

FIG. 7 is a schematic diagram of an embodiment of the invention illustrating a computer system, generally described as 800, having a network 810 and a plurality of computing devices 820, 830, 840. In one embodiment of the invention, the system 800 includes a cloud-based network 810 for distributed communication via a wireless communication antenna 812 and processing by a plurality of mobile communication computing devices 830. In another embodiment of the invention, the system 800 is a virtualized computing system capable of executing any or all aspects of software and/or application components presented herein on the computing devices 820, 830, 840. In certain aspects, the computer system 800 may be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of digital computers and mobile devices, such as a server, blade server, mainframe, mobile phone, a personal digital assistant (PDA), a smart phone, a desktop computer, a netbook computer, a tablet computer, a workstation, a laptop, a wearable computing device, and other similar computing devices. The components shown here, their connections and relationships, and their functions, are meant to be exemplary only, and are not meant to limit implementations of the invention described and/or claimed in this document In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 may additionally include components such as a storage device 890 for storing the operating system 892 and one or more application programs 894, a network interface unit 896, and/or an input/output controller 898. Each of the components may be coupled to each other through at least one bus 868. The input/output controller 898 may receive and process input from, or provide output to, a number of other devices 899, including, but not limited to, alphanumeric input devices, mice, electronic styluses, display units, touch screens, signal generation devices (e.g., speakers) or printers.

By way of example, and not limitation, the processor 860 may be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information. Also included are embedded and open source program languages, machine language that can be executed at the coordinator, server, the end device, and combinations thereof.

In another implementation, shown as 840 in FIG. 7, multiple processors 860 and/or multiple buses 868 may be used, as appropriate, along with multiple memories 862 of multiple types (e.g., a combination of a DSP and a microprocessor, a plurality of microprocessors, one or more microprocessors in conjunction with a DSP core).

Also, multiple computing devices may be connected, with each device providing portions of the necessary operations (e.g., a server bank, a group of blade servers, or a multi-processor system). Alternatively, some steps or methods may be performed by circuitry that is specific to a given function.

According to various embodiments, the computer system 800 may operate in a networked environment using logical connections to local and/or remote computing devices 820, 830, and 840 through a network 810. A computing device 830 may connect to a network 810 through a network interface unit 896 connected to the bus 868. Computing devices may communicate communication media through wired networks, direct-wired connections or wirelessly such as acoustic, RF or infrared through an antenna 897 in communication with the network antenna 812 and the network interface unit 896, which may include digital signal processing circuitry when necessary. The network interface unit 896 may provide for communications under various modes or protocols.

In one or more exemplary aspects, the instructions may be implemented in hardware, software, firmware, or any combinations thereof. A computer readable medium may provide volatile or non-volatile storage for one or more sets of instructions, such as operating systems, data structures, program modules, applications or other data embodying any one or more of the methodologies or functions described herein. The computer readable medium may include the memory 862, the processor 860, and/or the storage media 890 and may be a single medium or multiple media (e.g., a centralized or distributed computer system) that store the one or more sets of instructions 900. Non-transitory computer readable media includes all computer readable media, with the sole exception being a transitory, propagating signal per se. The instructions 900 may further be transmitted or received over the network 810 via the network interface unit 896 as communication media, which may include a modulated data signal such as a carrier wave or other transport mechanism and includes any delivery media, including modulation across the power lines, modulated carrier signals along or across power lines, distribution or transmission subsystems, and combinations thereof. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory or other solid state memory technology, disks or discs (e.g., digital versatile disks (DVD), HD-DVD, BLU-RAY, compact disc (CD), CD-ROM, floppy disc) or other optical storage, magnetic cassettes, magnetic tape, magnetic disk storage or other magnetic storage devices, or any other medium that can be used to store the computer readable instructions and which can be accessed by the computer system 800.

It is also contemplated that the computer system 800 may not include all of the components shown in FIG. 7, may include other components that are not explicitly shown in FIG. 7 or may utilize an architecture completely different than that shown in FIG. 7. The various illustrative logical blocks, modules, elements, circuits, and algorithms described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

In one embodiment, the application (e.g., smartphone app) automatically provides information via the GUI associated with the app to indicate to the user (consumer) information about electric pricing plan alternatives, including but not limited to their location, the price for electric power supply on any per unit (data center, microgrid, building (commercial or residential), facility, device, grid element, and combinations thereof) for a duration and/or at a predetermined time, and combinations thereof. Also, preferably the app GUI provides additional information including marketing and advertising information about any merchants, products, and/or services associated with or related to their profile(s), power usage, activities within the system, and combinations thereof. Also preferably, the app GUI provides an interactive interface allowing inputs to be received for generating at least one account and corresponding profile, advanced energy settlements selections, etc. In one embodiment of the present invention, the received inputs are associated with a consumer or user profile that is stored on the smartphone and/or in a database associated with a server computer and/or cloud-based computing system with at least one server computer and at least one database having remote inputs and outputs via the data and communications network, preferably via secure access and/or secure messaging for authorized users associated with the at least one account. Data centers are interconnected to form a secure SaaS, localized interdependently operated subsystems are connected for autonomous operations if disconnected from the SaaS or cloud-based system. Components must be virtualized through VMware, open source equivalent, etc. even if they are going into the same logical node and running through same EMS or microgrid EMS or microgrid power management solution (MPMS). If a microgrid is 100 Watt or of regulated size, then it is subject to performance and liability regulations from FERC, NERC, ISO, governing entity, etc. Cloud-based system must be separated at or above that level.

In a virtualized or cloud-based computing system and methods of the present invention, the following components are provided as illustrated by way of example and not limitation to those described in FIG. 7. Components of a cloud-based computing system and network for distributed communication therewith by mobile communication devices include but are not limited to a system including a server computer with a processing unit. The server is constructed, configured and coupled to enable communication over a network. The server provides for user interconnection with the server over the network using a remote computer device or a personal computer (PC) or smartphone, tablet computer, etc. positioned remotely from the server. Furthermore, the system is operable for a multiplicity of remote personal computers or terminals for example, in a client-server architecture, as shown. Alternatively, a user may interconnect through the network using a user device such as a personal digital assistant (PDA), mobile communication device, such as by way of example and not limitation, a mobile phone, a cell phone, smart phone, tablet computer, laptop computer, netbook, a terminal, in car computer, or any other computing device suitable for network connection. Also, alternative architectures may be used instead of the client/server architecture. For example, a computer communications network, or other suitable architecture may be used. The network may be the Internet, an intranet, or any other network suitable for searching, obtaining, and/or using information and/or communications. The system of the present invention further includes an operating system installed and running on the server, enabling server to communicate through network 810 with the remote, distributed user devices. The operating system may be any operating system known in the art that is suitable for network communication.

Figure 8:
FIG. 8 illustrates method steps for providing advanced energy settlements (AES) according to one embodiment of the present invention.

FIG. 8 illustrates method steps for providing advanced energy settlements (AES) according to one embodiment of the present invention. A settlement AES process is outlined in six distinct steps as follows: Revenue grade settlement block data is used to underpin the settlement process for the billing period e.g. daily, weekly, monthly or predict and pay; Settlement block data is mapped to the appropriate distributed or fixed energy power purchase agreement in effect at that point in time; the cost or pricing of each settlement block inclusive of Time of Use (TOU), demand, taxes, access fees and energy charges is calculated; a customer balance is summated from all the settlement blocks that apply within the period is and automatically collected from the customer; Distributed energy charges billed in the cycle are aggregated by generator and settled through the clearing house for activities by the distributed generators and/or at least one customer; Fixed energy charges billed in the cycle are aggregated and settled with the energy retailer or REP for the delivery of power by the Transmission/Distribution Service Provider (TDSP).

The EnergyNet data platform used with AES preferably provides and/or is operable for real time revenue grade data ingress; store and organise packet level information that can be used for forecasting, data mining, revenue extraction, event detection, sophisticated energy management and enterprise integration purposes; aggregate and store revenue data into revenue grade settlement blocks (or Power Trading Blocks (PTBs)); connect microgrid and spot market buyers and sellers; provide a fully automated and high latency industry leading settlement process underpinned by a distributed settlement rules engine capable of settling with both distributed and fixed generator market participants; provide an automated payment exchange which supports all advanced billing models (shared data plan, daily plan and predict & pay); payments should be managed as single energy bills for customers with EnergyNet responsible for settlement payments between multiple distributed energy generators and the customers existing energy retailer; provide a real time energy purchasing solution that matches the customers real energy consumption against energy currently available within the microgrid or spot market; capture and transform market data that can provide intelligent analytics by generators for trending, forecasting, planning and maximising revenue/investment opportunities; capture and transform energy data that can provide intelligent analytics for customers energy management, forecasting, procurement, profiling, bill optimization and recommendation purposes; and integrate with the existing distributed energy market exchange to allow EnergyNet buyers and sellers to connect and agree prices on distributed generation or curtailment, with revenue grade metrology or with a revenue grade metrology equivalent (RGME) that provides data within less than about 10% variation from revenue grade metrology as required by the utility or governing entity for the electric power grid management and settlement, wherein the RGME is provided by a lower accuracy device and/or derived by data from the lower accuracy device combined with historical data or other complex rules and billing determinants, to generate the RGME that is approved or accepted for financial settlement based upon contracts, digital contracts, or virtual contracts between and among at least two entities in connection with the financial settlement for those grid elements having RGME. For example RTU is a non-revenue grade device but is used for energy auditing, or as a starting point for disputing payments within prior art systems for financial settlement and energy settlement. In the systems and methods of the present invention, RGME mechanism provides data that the buyer and seller agree to accept for settlement, including financial and energy settlement for DER, load control, curtailment, and combinations, and including line losses. For interconnected devices, i.e., power supplying or power consuming devices that share the same interconnection for the electric power grid, the agreements between the parties provide for energy settlement and the corresponding market-based financial settlement for the electric power generated or consumed, including RGME instead of traditional revenue grade metrology as required by the utility or governing entity of the electric power grid.

Figure 14:
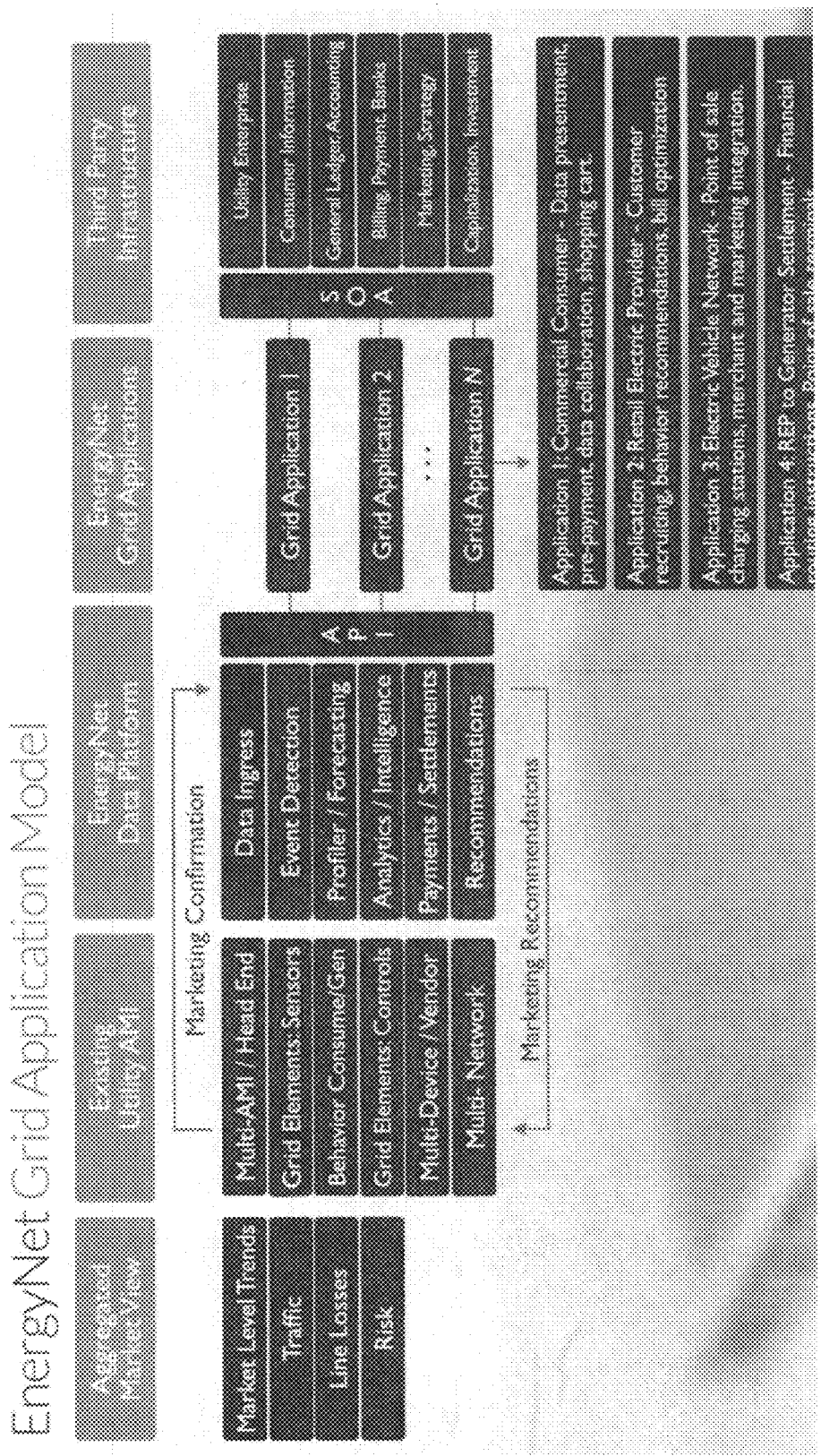
FIG. 14 is a schematic diagram illustrating a grid application model of the systems and methods of the present invention.

As illustrated in FIG. 14, EnergyNet grid applications ensure that the EnergyNet framework is operable to support 1:n grid applications. Third party infrastructure may provide Service-Oriented Architecture (SOA) integration with utility and/or market participant enterprise systems; provide SOA integration with general ledger and accounting systems; and/or provide SOA integration with the financial, banking and clearing infrastructure, as needed.

Figure 9:
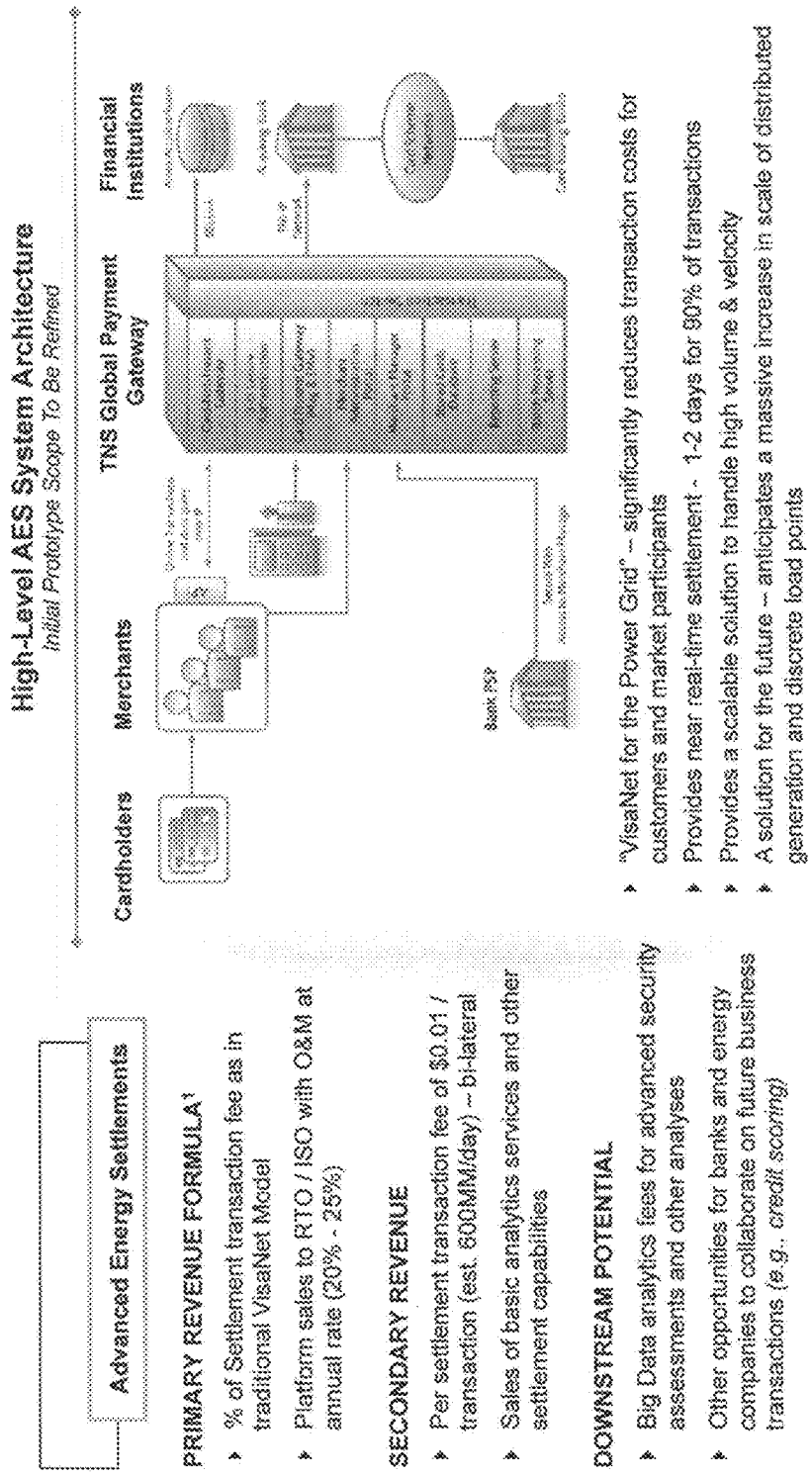
FIG. 9 shows a schematic diagram illustrating a high-level AES system architecture according to the present invention.
Figure 15:
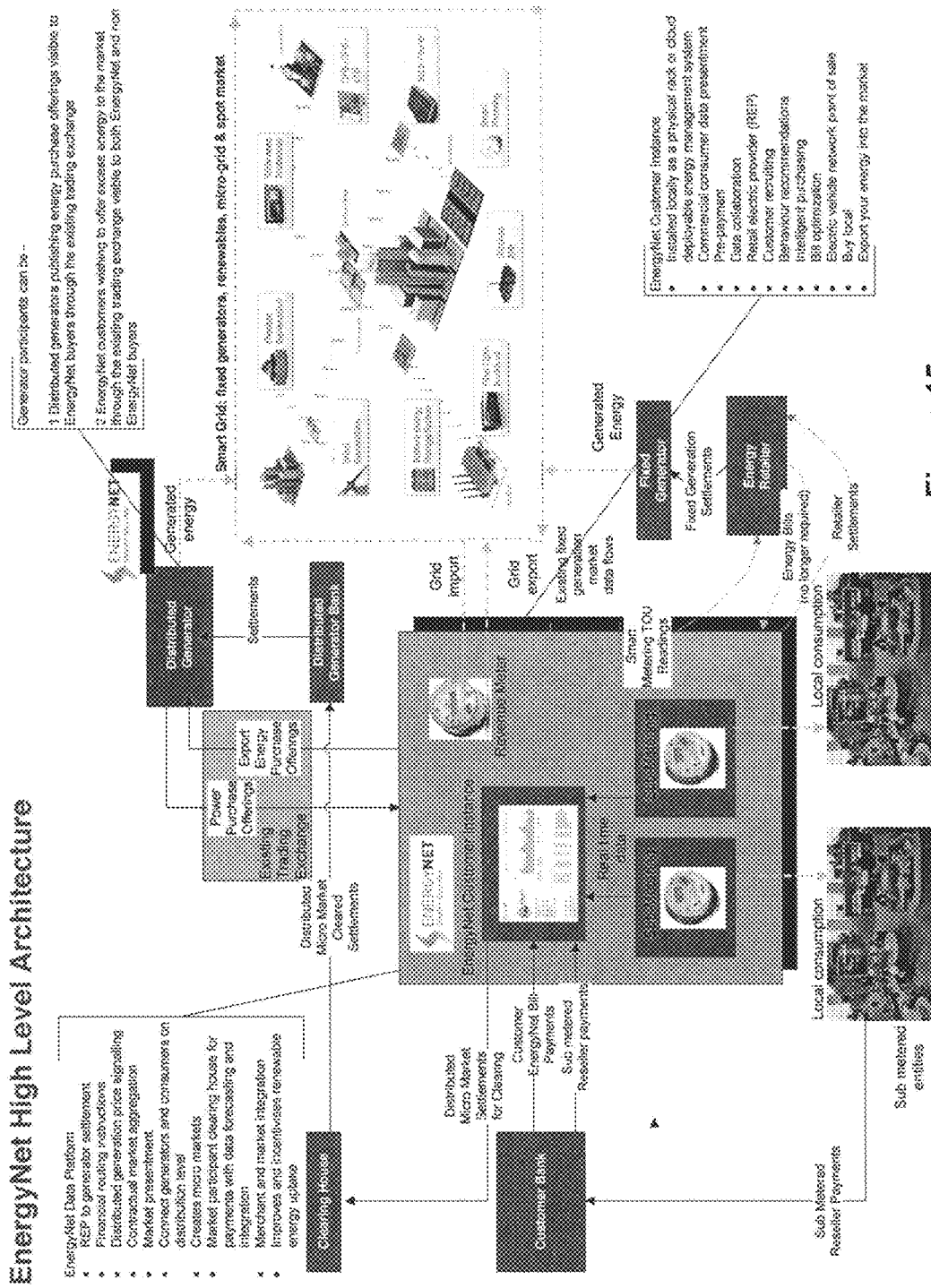
FIG. 15 shows a schematic diagram illustrating a high-level system architecture for an EnergyNet embodiment according to the present invention.
Figure 16:
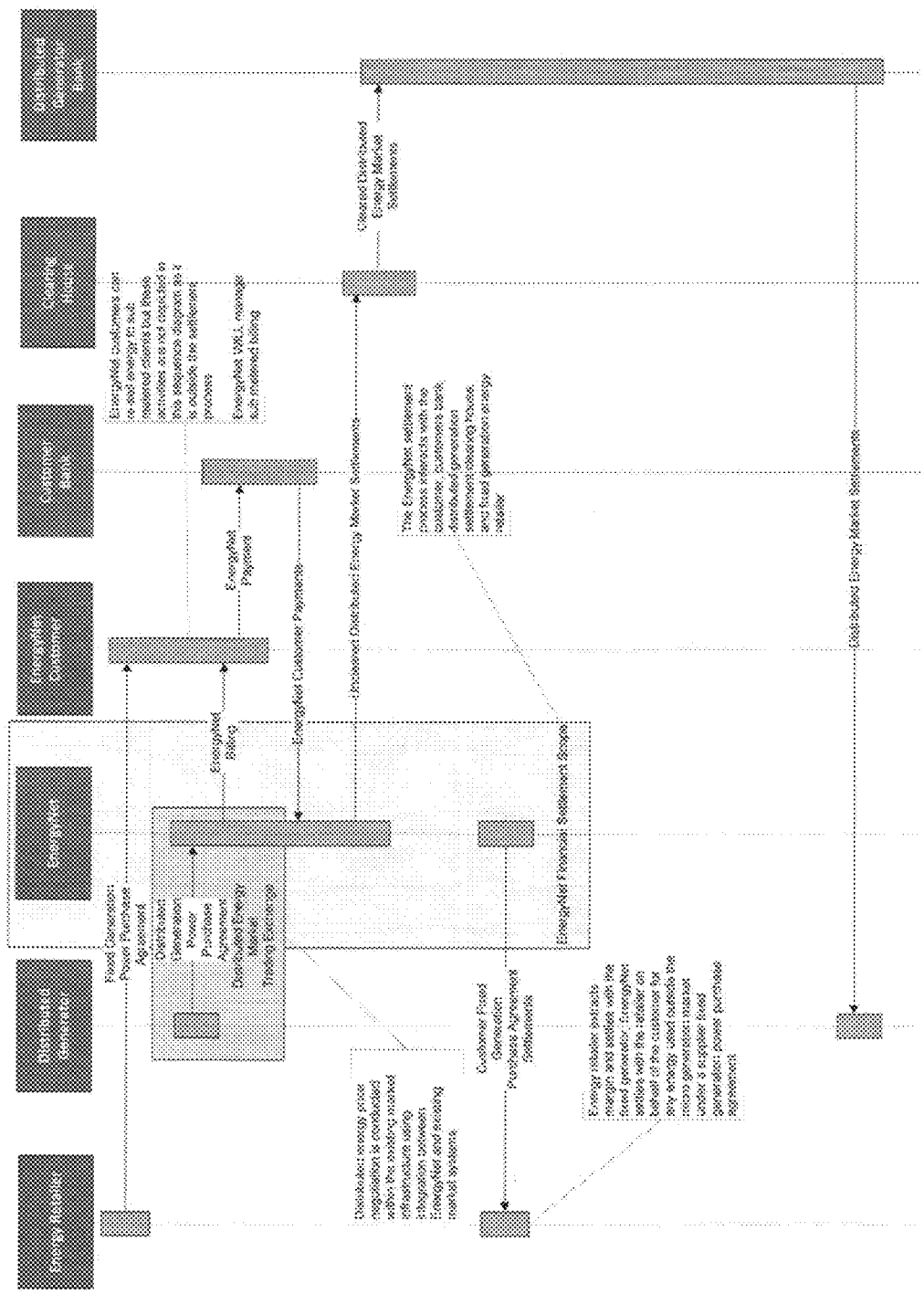
FIG. 16 is a schematic and flow diagram illustrating AES sequencing.

FIG. 9 shows a schematic diagram illustrating a high-level AES system architecture according to the present invention. The principal actors and data flows depicted in FIG. 9 and FIGS. 15 and 16 are as follows for EnergyNet embodiments: Customers receive near real time market connection data and price signals giving visibility to generation as it becomes available in the market. This data is used by EnergyNet to facilitate intelligent energy purchasing and settlement between all market participants; Distributed generation availability in the form of power purchase offerings is received from Distributed Generators ensuring that intelligent energy purchasing decisions can be automated or recommended within a real time market. Customers with a generation capacity can also act as generators through EnergyNet if they have an exportable capacity; Payments received from the Customer Bank represent consolidated single payments to EnergyNet for energy supplied from their existing Energy Retailer or from Distributed Generators;

Settlements are apportioned across revenue grade TOU meter readings over a billing period and internal usage is measured through real time sub metering technology at 1 second intervals and/or near-real-time or real-time. Sub-metered entities are considered as follows: EnergyNet supports the billing of sub-metered occupants allowing the EnergyNet customer to re-sell or cross charge energy using the sub metered meter readings. The EnergyNet customer instance will allow these energy costs to be recovered against the enterprises total energy consumption. Distributed generation suppliers are included as follows: Market participants publish power purchase offerings to EnergyNet customers. This data is used by EnergyNet to facilitate intelligent energy purchasing. Excess energy capacity can also be offered to the market by customers using EnergyNet. The distributed generator/generation supplier participants receive settlements from the Distributed Generator Bank or financial settlement entity (non-bank); distributed generator receives cleared settlements for all energy consumed within the billing timelines specified in the distributed power purchase agreements of EnergyNet customers. A clearinghouse receives all un cleared distributed energy settlements made through EnergyNet's, point of sale devices or advanced billing methods before passing the cleared settlements to the Generator Bank or financial settlement entity (non-bank entity). Customer Payments received from the Customer Bank represent consolidated single payments for energy purchased on the both the distributed and fixed generation market. EnergyNet performs all settlement activities for all participants behind the single bill; EnergyNet can also manage the payments for energy re-sold or cross charged by the customer. This can be viewed and analysed against the imported energy bill. The distributed generator bank receives aggregated and cleared settlements from the Clearinghouse for distributed energy that was consumed within each power purchase agreement held by EnergyNet customers. An energy retailer or REP is included as follows in one EnergyNet embodiment: Customers can still consume energy supplied by fixed generators outside the spot energy or micro market and the portion of a customer's consumption that resides within their fixed generation power purchase agreement will be settled with the retailer. The settlement algorithms resolve this using settlement blocks, all power purchase agreements in place and revenue grade meter reads. Purchasing within the spot market requires prices to be negotiated and agreed in seconds and these activities require integration with existing market trading systems. A growing customer base would allow EnergyNet to provide a complete trading market between users in the future. The purchasing rules engine criteria allows generators respond to customer preferences and offer a variety of different tariffs as wells as alter their own behavior e.g. if they are a customer/generator can they shift their highest usage off peak and export excess energy at peak periods when demand and prices are higher.

Figure 10:
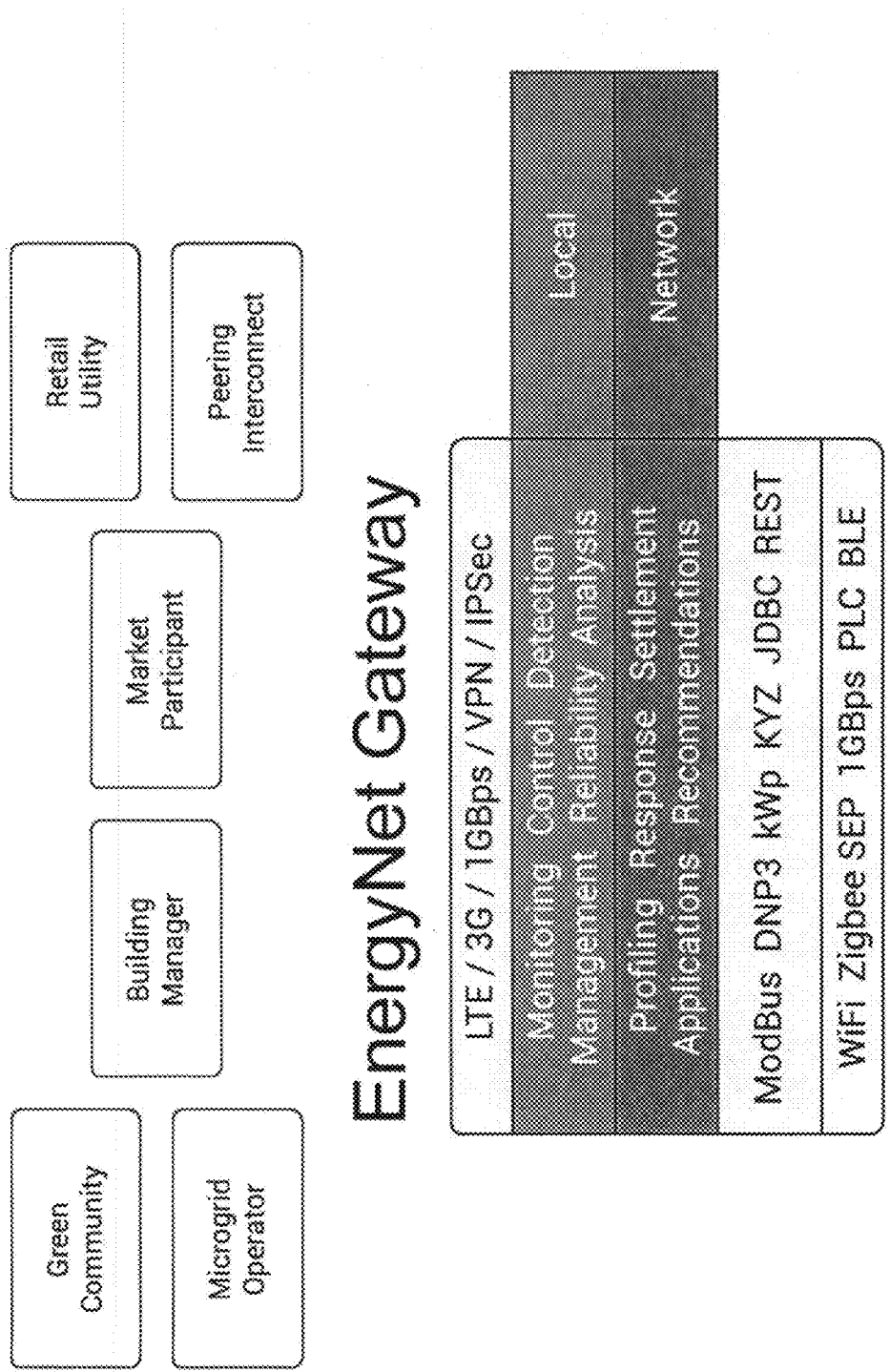
FIG. 10 is a schematic diagram illustrating an exemplary EnergyNet gateway according to the present invention.

FIG. 10 is a schematic diagram illustrating an exemplary EnergyNet gateway according to the present invention. The EnergyNet gateway in the present invention connects different participants having different network protocols to the advanced energy settlement platform. The different participants comprises green communities, microgrid operators, building managers, market participants, and retail utilities. The EnergyNet gateway is also used for peering interconnections. Different communication protocols/standards supported by the EnergyNet gateway include but not limited to LTE, 3G, 1 GBps, VPN, IPSec, ModBus, DNP3, kWp, KYZ, JDBC, REST, WiFi, Zigbee, SEP, 1 GBps, PLC, BLE. At local level, the EnergyNet gateway is operable for monitoring, control detection, management, and reliability analysis. At network level, the EnergyNet gateway is operable for profiling response settlement and applications recommendations.

Figure 11:
FIG. 11 is a schematic diagram illustrating a partial selection of exemplary grid elements according to the present invention.

FIG. 11 is a schematic diagram illustrating a partial selection of exemplary grid elements according to the present invention. The grid elements can be power transfer switches, wind meters, utility meters, battery discharge controllers, tenant sub meters, solar meters, power distribution units (PDUs), appliance switches, EV charging stations, distributed energy resources (DERs), transfer switches, EV batteries, inverters, controllable loads, weather stations, and HAVC environments.

Figure 12:
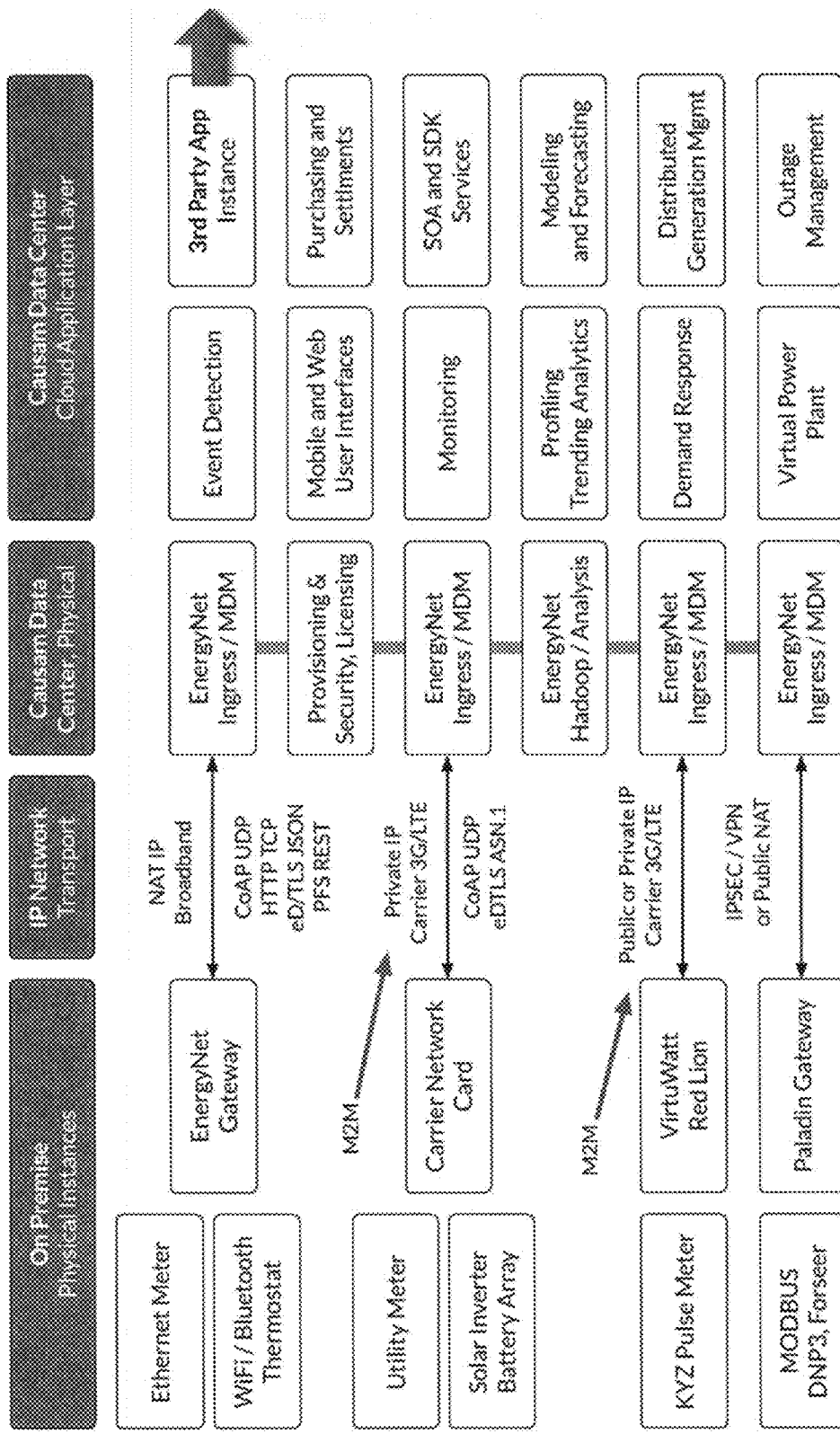
FIG. 12 is a schematic diagram illustrating components of the systems and methods of the present invention.
Figure 13:
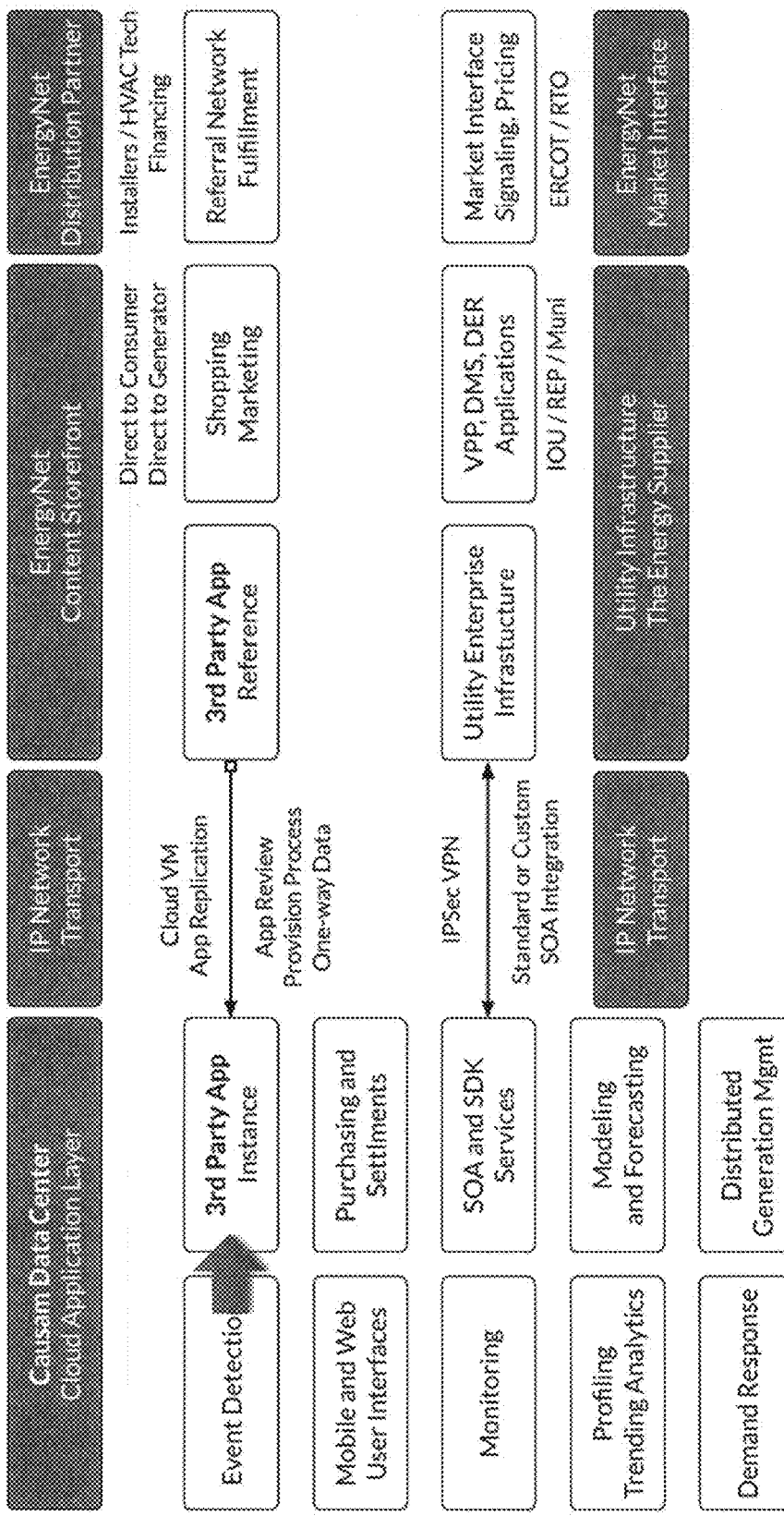
FIG. 13 is a schematic diagram illustrating components of the systems and methods of the present invention.

FIGS. 12 and 13 is a schematic diagram illustrating components of the systems and methods of the present invention. The systems of the present invention includes on premise physical instances, IP network, a Causam data center, EnergyNet Content Storefront, and EnergyNet Distribution Partner, EnergyNet Market Interface, and Utility Infrastructure at the Energy Supplier. The on premise physical instances such as EnergyNet gateway, carrier network card, VirtuWatt Red Lion, Paladin gateway are present at Ethernet meters, WiFi/Bluetooth thermostats, utility meters, solar inverter battery array, KYZ Pulse meters, MODBUS DNP3 Foreseer, for IP network connection. The Causam data center has a physical layer includes EnergyNet Ingress for meter data management (MDM), provisioning, security and licensing, and EnergyNet Hadoop for analysis. The Causam data center further includes a cloud application layer providing event detection, third party App instance, mobile and web user interface, purchasing and settlements, monitoring, Service-Oriented Architecture (SOA) and Software Development Kit (SDK) services, profiling trending analytics, modeling and forecasting, demand response, distributed generation management, virtual power plant (VPP), and outage management. The EnergyNet Content Storefront provides third party App reference, which has one-way communication to the third party App instance in the Causam data center for cloud Virtual Machine (VM), App replication, App review, and provision process. The EnergyNet Content Storefront also provides shopping and marketing directed to consumer and generator. The EnergyNet Distribution Partner includes installers, HVAC technicians, and financing institutions, which are referrals for network fulfilment. The EnergyNet Market Interface connects with regulation agencies, for example ERCOT and other RTOs, for signaling and pricing. The Energy Supplier can be IOU, REP, and/or Municipal power agencies. The Utility Infrastructure at the Energy Supplier provides applications, such as VPP, Distribution Management System (DMS), and DER applications, and Utility Enterprise Infrastructure. The Utility Enterprise Infrastructure communicates with the SOA and SDK services at the Causam data center via IPSec and/or VPN for standard or customer SOA integration. FIG. 14 is a schematic diagram illustrating a grid application model of the systems and methods of the present invention. The EnergyNet Grid Application Model includes aggregated market view, existing utility AMI, EnergyNet Data Platform, EnergyNet Grid Applications, and Third Party Infrastructure. The Aggregated market View provides information such as market level trends, traffic, line losses, and risk. The Existing Utility AMI includes multi-AMI for head end systems, grid elements for sensing, grid elements for controlling, multi-devices/vendors, and multi-network. The EnergyNet Data Platform provides API for data ingress, event detection, profiling and forecasting, analytics and intelligence, payments and settlements, recommendations. The multi-AMI for head end systems in the existing utility AMI provides marketing confirmation to data ingress on the EnergyNet Data Platform. The recommendations provided by the EnergyNet Data Platform are marketing recommendations provided to multi-network in the existing Utility AMI. EnergyNet Grid Applications include multiple grid applications. For example, grid application 1 is for data presentment, pre-payment, data collaborations, shopping carts for commercial consumers, grid application 2 is for customer recruiting, behavior recommendations, bill optimization for retail electric provider; grid application 3 is for point of sale, charging stations, merchant and marketing integration for electric vehicle network; grid application 4 is for financial routing instructions, point of sale terminals for REP to generator settlement, etc. Third Party Infrastructure includes SOA for utility enterprise, consumer information, general ledger, accounting, billing, payment, banks, marketing, strategy, capitalization and investment.

FIG. 15 shows a schematic diagram illustrating a high-level system architecture for an EnergyNet embodiment according to the present invention. This high-level system architecture includes a customer deployable distributed EnergyNet Customer Instance providing customers with a complete energy management, purchasing and settlement solution within the microgrid and spot generation market for AES. FIG. 16 is a schematic and flow diagram illustrating AES sequencing; there are four key elements within the EnergyNet enterprise financial settlement product: data ingress, market participation, payments collection and advanced energy settlements. Intelligent purchasing decisions require advanced smart metering and EnergyNet uses high speed IP metering technology to build a complete and real time energy consumption profile aggregated from multiple sub-metering points. All consumption data within the enterprise forms settlement blocks, which are used to drive the billing and settlement process. All metering data is aggregated to provide a real time settlement block and total enterprise consumption view with drill down. This data forms the basis for billing, settlement, forecasting, market view and other analytical transformations. Aggregation of multiple distributed nodes and/or microgrids into logical nodes for interconnection with the utility or main power grid and for settlement at those nodes is also provided. Note that EnergyNet can also utilise less dynamic data from legacy meters and head end systems where a customer investment in conventional sub metering has already been made. Profiling is an important element for customers to forecast future usage and committing to purchase offerings. Time of Use (TOU) and/or demand profiles created from base data are an important tool for customers and generators alike; industry standard profiling techniques can be used to create profiles. Generators can use profiles to price their products and plan their generation activities. Customers can use them to ensure they commit to the power purchase offerings that are best aligned with their anticipated usage.

Buyers and sellers of electric power are connected within the microgrid or spot market associated with AES of the present invention. Buyers can expose their generated capacity to customers in near real time and customers can make intelligent purchasing decisions based upon actionable real time data. The Advanced Energy Settlement (AES) process performs all billing, payment and settlement activities with financial and clearing participants. A configurable market purchasing rules engine ranks and selects energy from the market based on customer preferences such as cost, payment preference, locality, how green the energy, market supply, consumption etc. and may recommend purchasing from one or more suppliers. The suitability of the offering also depends on additional factors such as any minimum and maximum usage constraints which requires decisions to be made based upon forecasts derived using historical data and profiling stored within EnergyNet.

Figure 17:
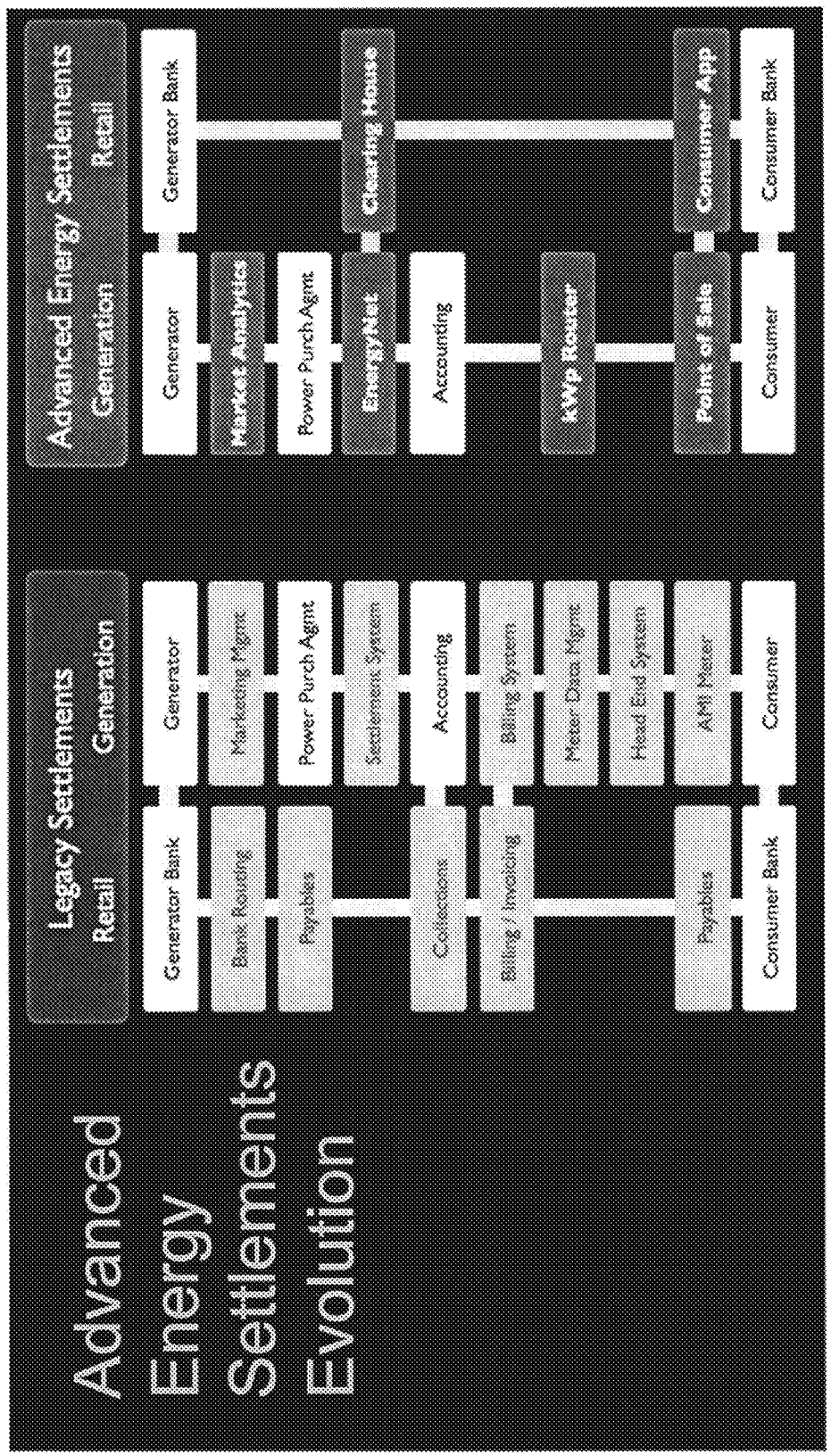
FIG. 17 is a schematic diagram illustrating AES evolution for the systems and methods of the present invention.

FIG. 17 is a schematic diagram illustrating AES evolution for the systems and methods of the present invention. Comparing to legacy settlements, the advanced energy settlements in the present invention has an EnergyNet Platform communicates with a clearing house, which does the settlements between the generator bank and the consumer bank besides simpler communications and less participants.

Certain Apps are provides for different participants in the advanced energy settlement systems. These Apps are operable for command and control, advanced settlement, monitoring and alarming, etc. via real time communication.

Figure 18:
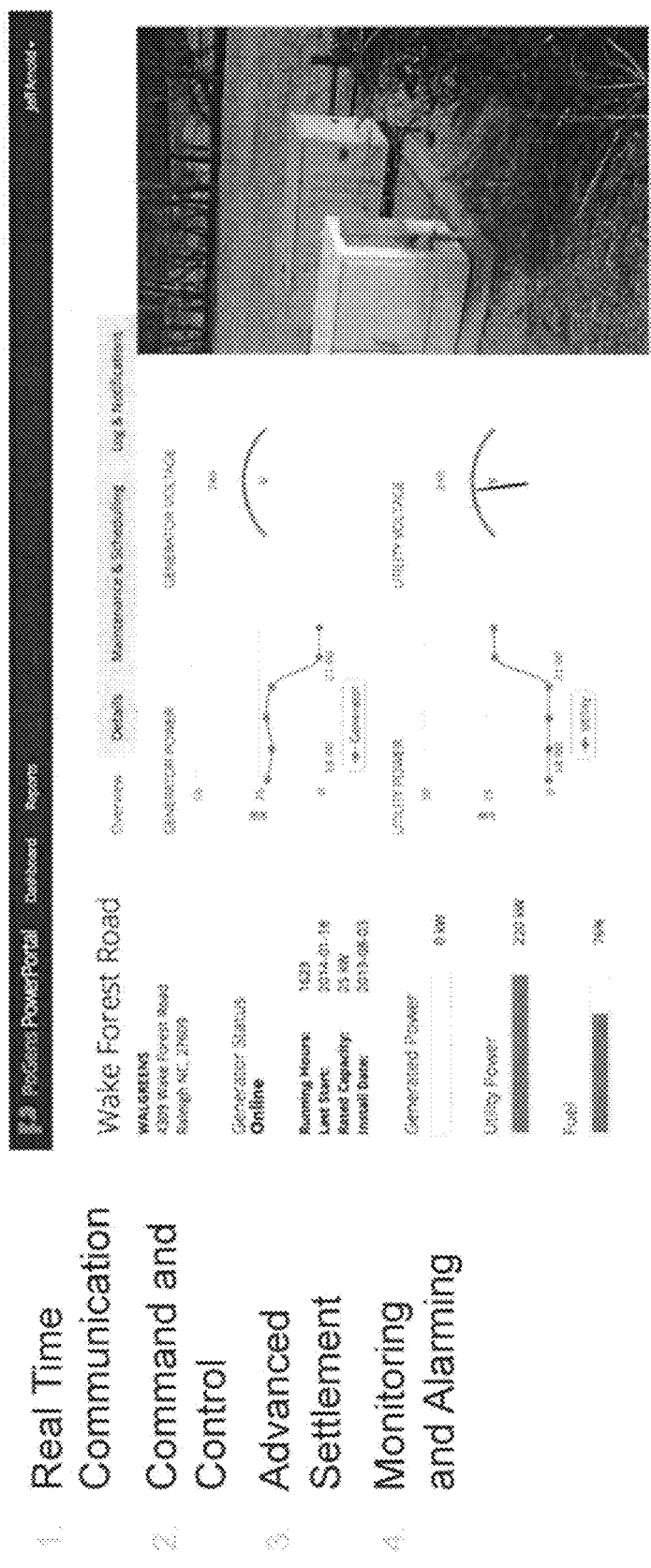
FIG. 18 illustrates a graphic user interface screen shot for an embodiment of the present invention showing a distributed generation App.

FIG. 18 illustrates a graphic user interface screen shot for an embodiment of the present invention showing a distributed generation App. The Distribution Generation App provides an overview of a distributed generator including a basic profile, curves for generator power and utility power, scales for generator voltage and utility voltage. The distribution generation App also provides details for the generator, maintenance and scheduling, log and notifications.

Figure 19:
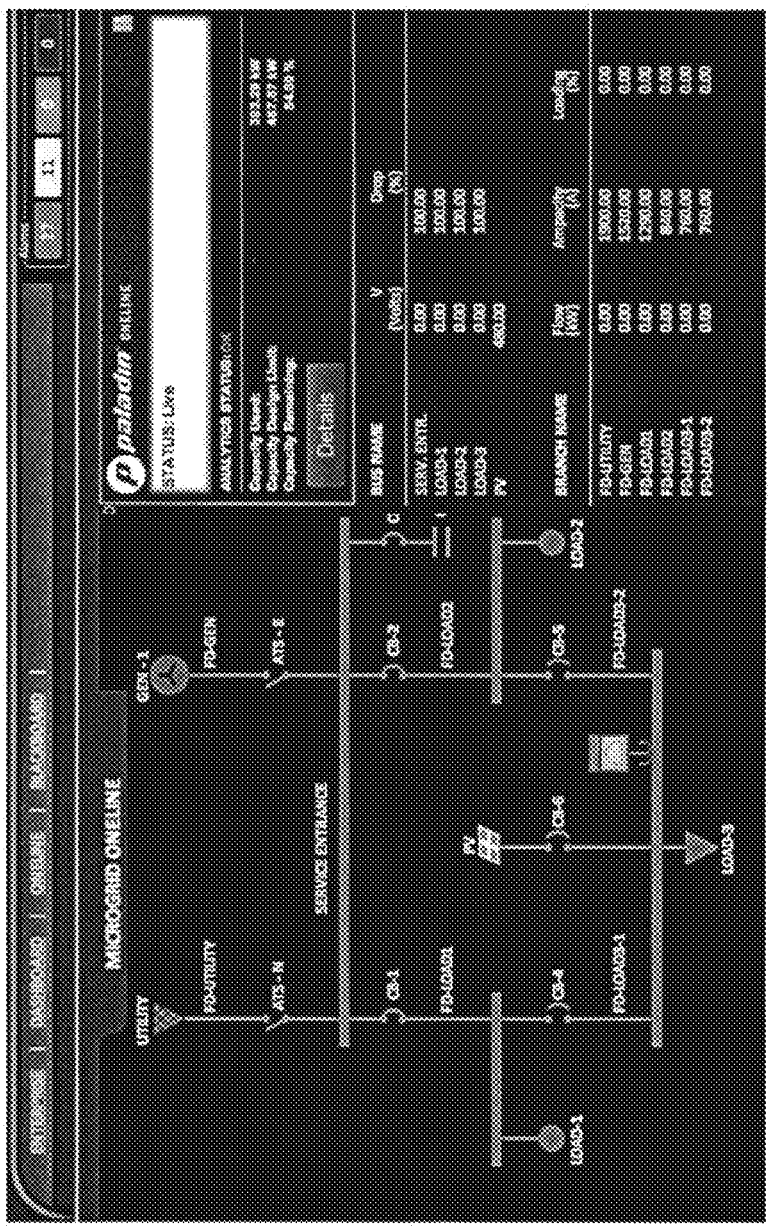
FIG. 19 illustrates a graphic user interface screen shot for one embodiment of the present invention showing a microgrid control App applicable to data centers and/or microgrids.

FIG. 19 illustrates a graphic user interface screen shot for one embodiment of the present invention showing a microgrid control App applicable to data centers and/or microgrids. A one-line microgrid diagram is displayed with bus voltage information and branch power flow information.

Figure 20:
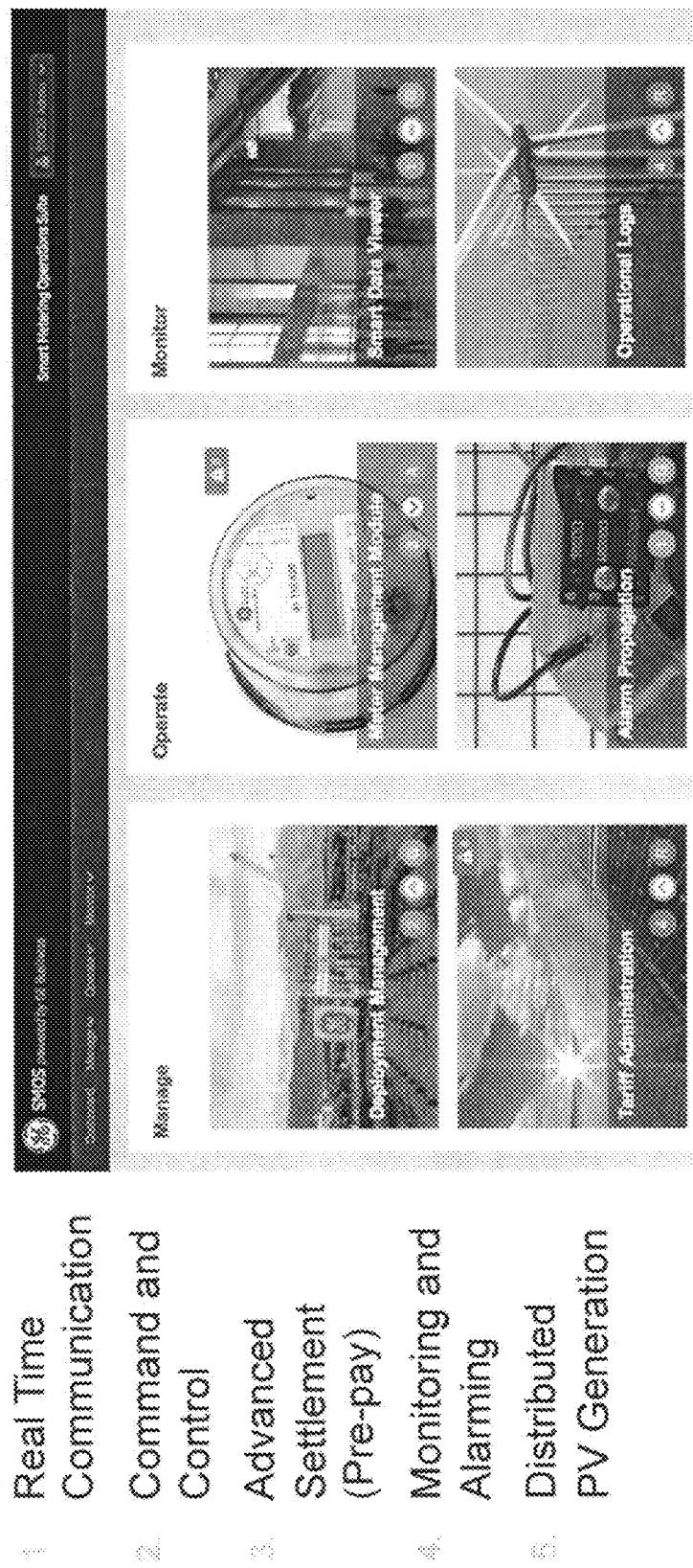
FIG. 20 illustrates a graphic user interface screen shot for an embodiment of the present invention showing an AMI Head End App.

FIG. 20 illustrates a graphic user interface screen shot for an embodiment of the present invention showing an AMI Head End App. The AMI Head End App is operable for deployment management and tariff administration. The AMI Head End App is operable to operate meter management module and alarm propagation. The AMI Head End App provides smart data viewer and operational logs for monitoring distributed PV generation and/or wind farm.

Figure 21:
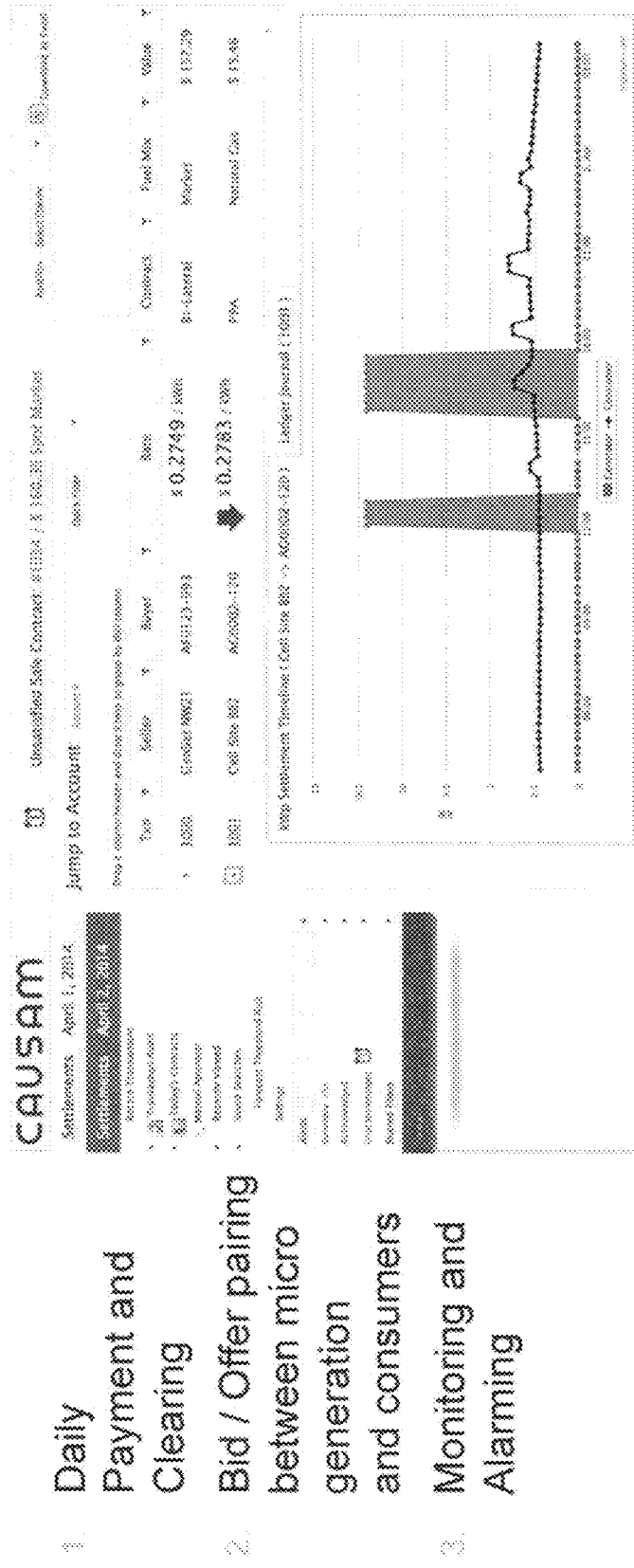
FIG. 21 illustrates a graphic user interface screen shot for an embodiment of the present invention showing an AES App.

FIG. 21 illustrates a graphic user interface screen shot for an embodiment of the present invention showing an AES App. The AES app provides daily payment and clearing, bid/offer pairing between micro generation and consumers, monitoring and alarming.

Figure 22:
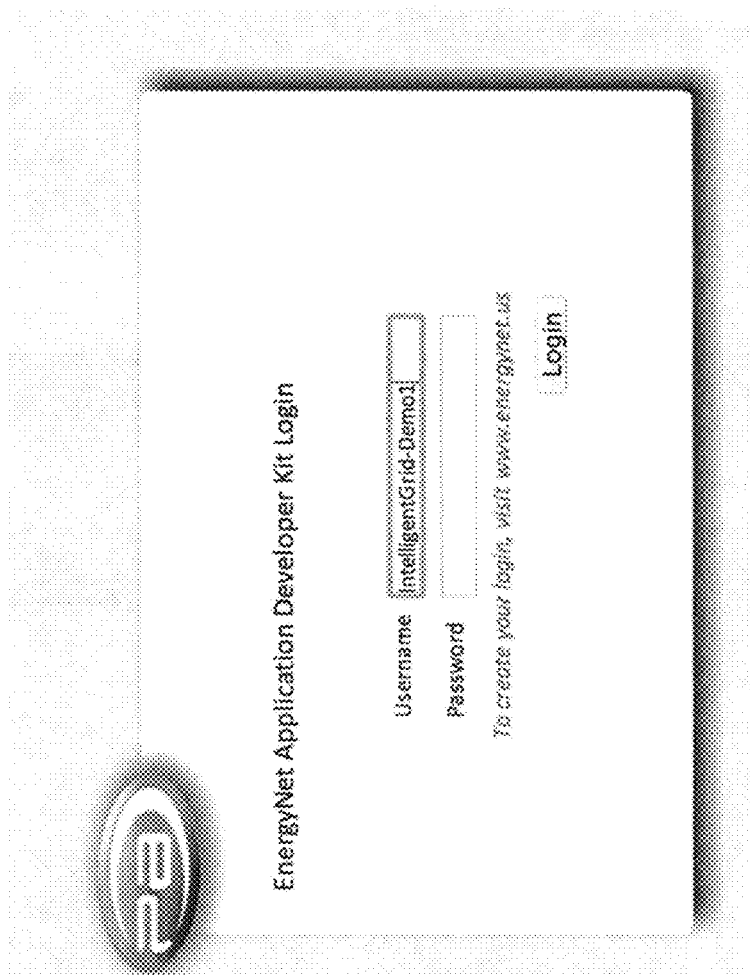
FIG. 22 illustrates a graphic user interface screen shot for an EnergyNet application development kit for a datacenter example case.

FIG. 22 illustrates a graphic user interface screen shot for an embodiment of the present invention showing an EnergyNet application development kit. Users can login the kit with a username and password. The EnergyNet Application Development Kit provides codes for browser construction and layout. The Kit provides connectivity for real time communication, command and control, payments and settlements, and third party SOA services and Enterprises.

Figure 23:
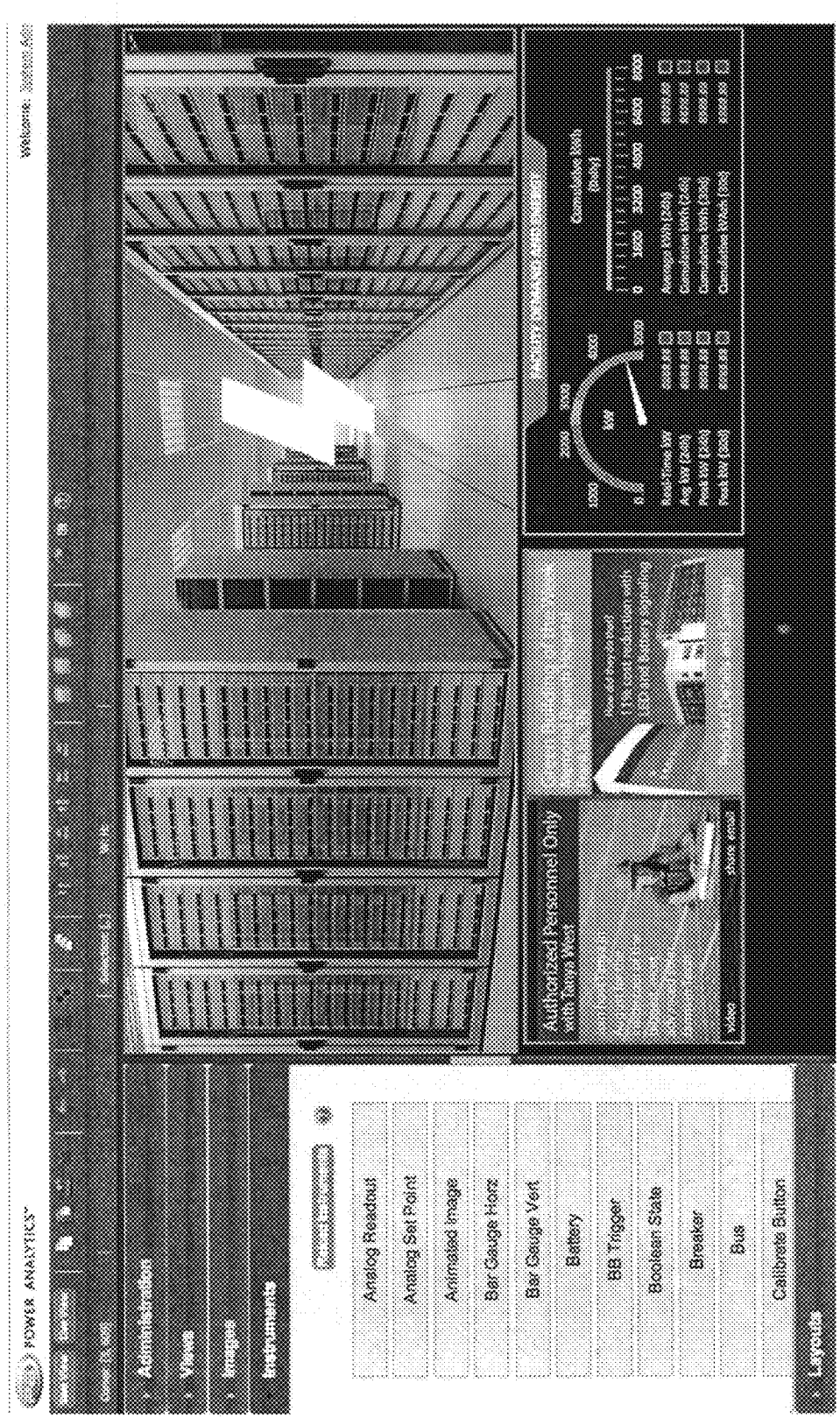
FIG. 23 illustrates another GUI screen shot for a datacenter example case of FIG. 15.
Figure 24:
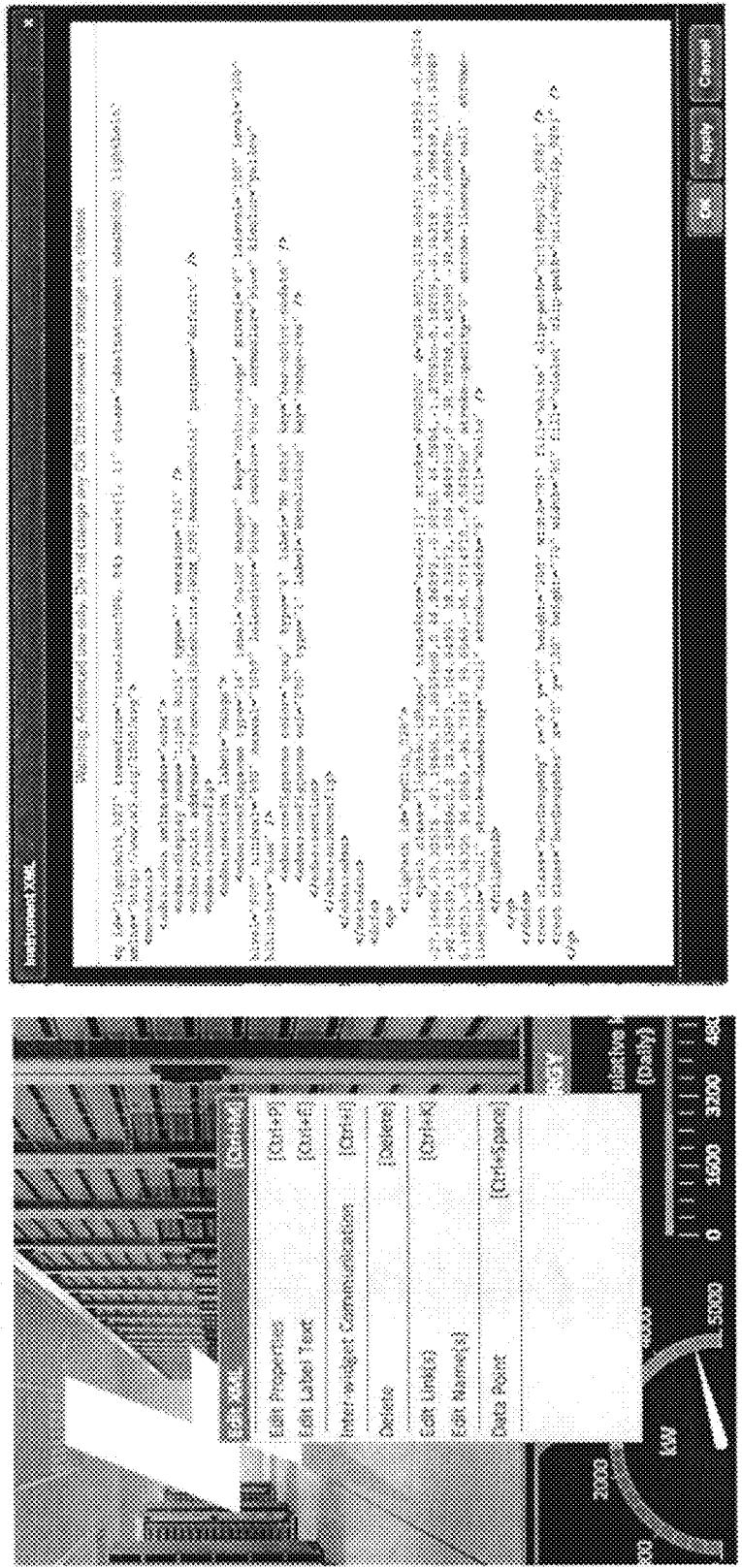
FIG. 24 illustrates another GUI screen shot for a datacenter example case with XML editing.
Figure 25:
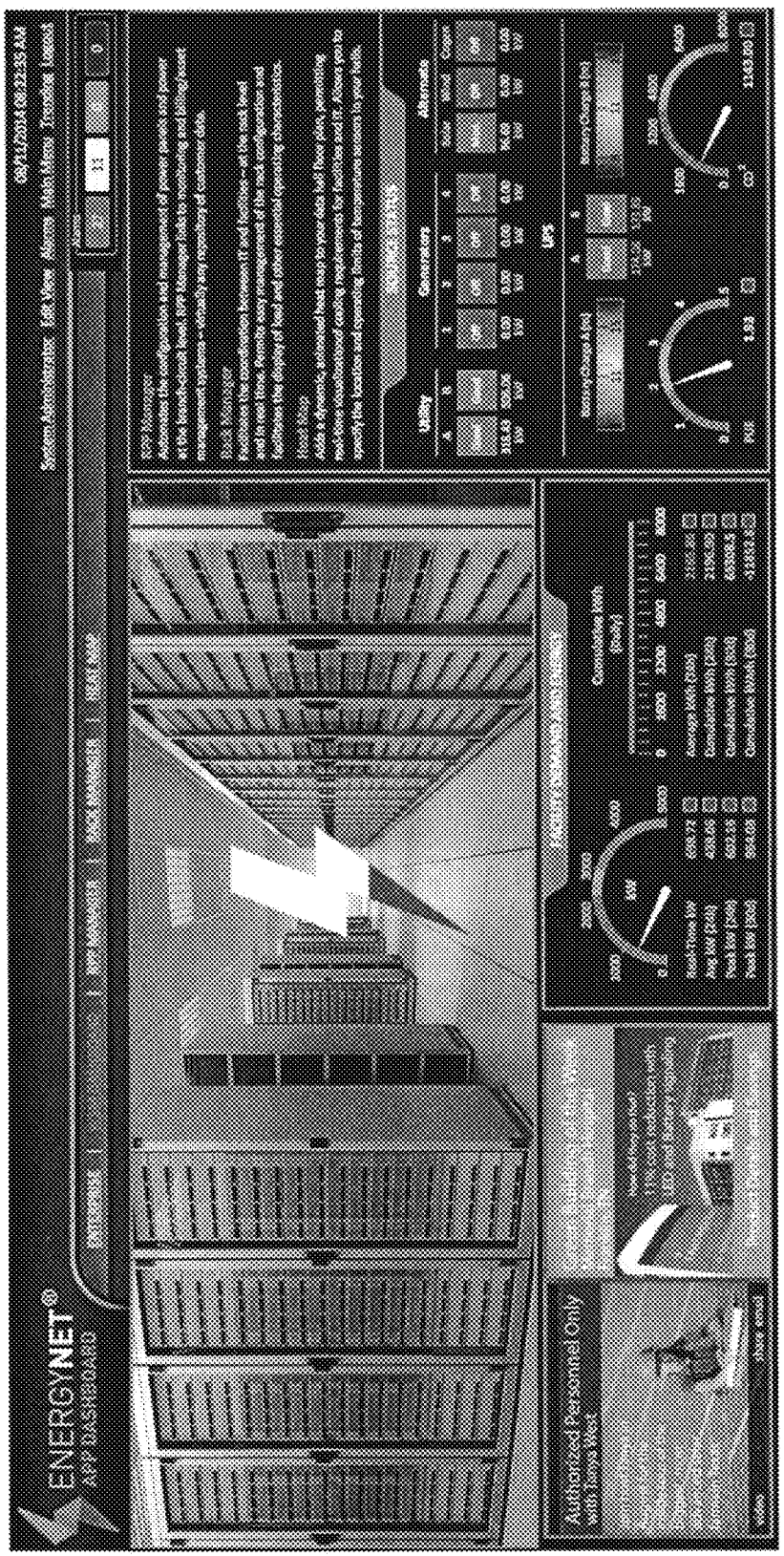
FIG. 25 illustrates another GUI screen shot for a datacenter example case with EnergyNet App dashboard view.
Figure 26:
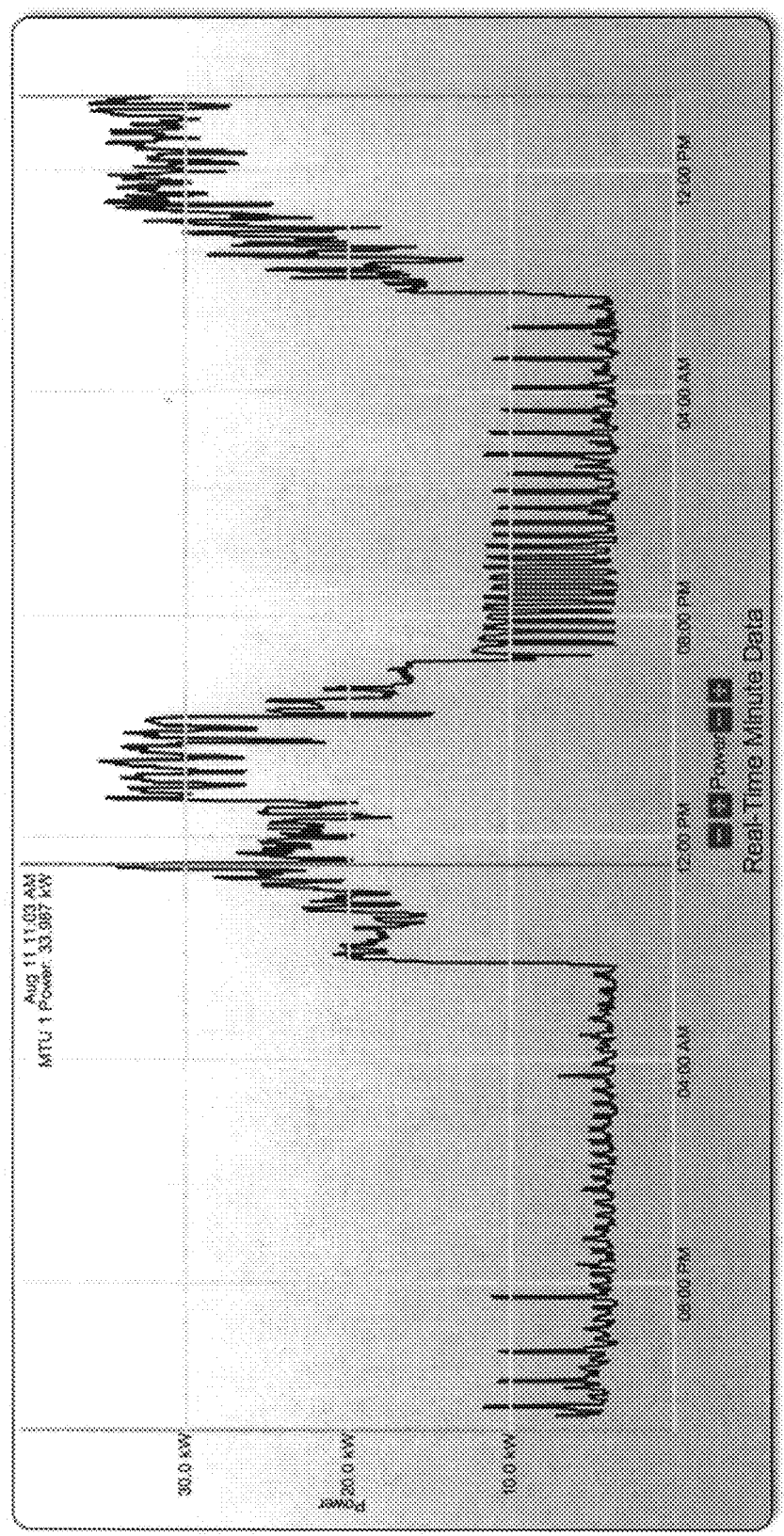
FIG. 26 illustrates another GUI screen shot for an EnergyNet App view.

FIG. 23 illustrates another GUI screen shot for the embodiment of FIG. 22 showing a datacenter example case. Several instruments can be utilized for developing the datacenter layout. FIG. 24 illustrates another GUI screen shot for the embodiment of FIG. 22 showing a datacenter example case with XML editing. FIG. 25 illustrates another GUI screen shot for the embodiment of FIG. 22 showing a datacenter example case with EnergyNet App dashboard view. FIG. 26 illustrates another GUI screen shot for the embodiment of FIG. 22 showing an EnergyNet App view for real-time minute data.

Figure 27:
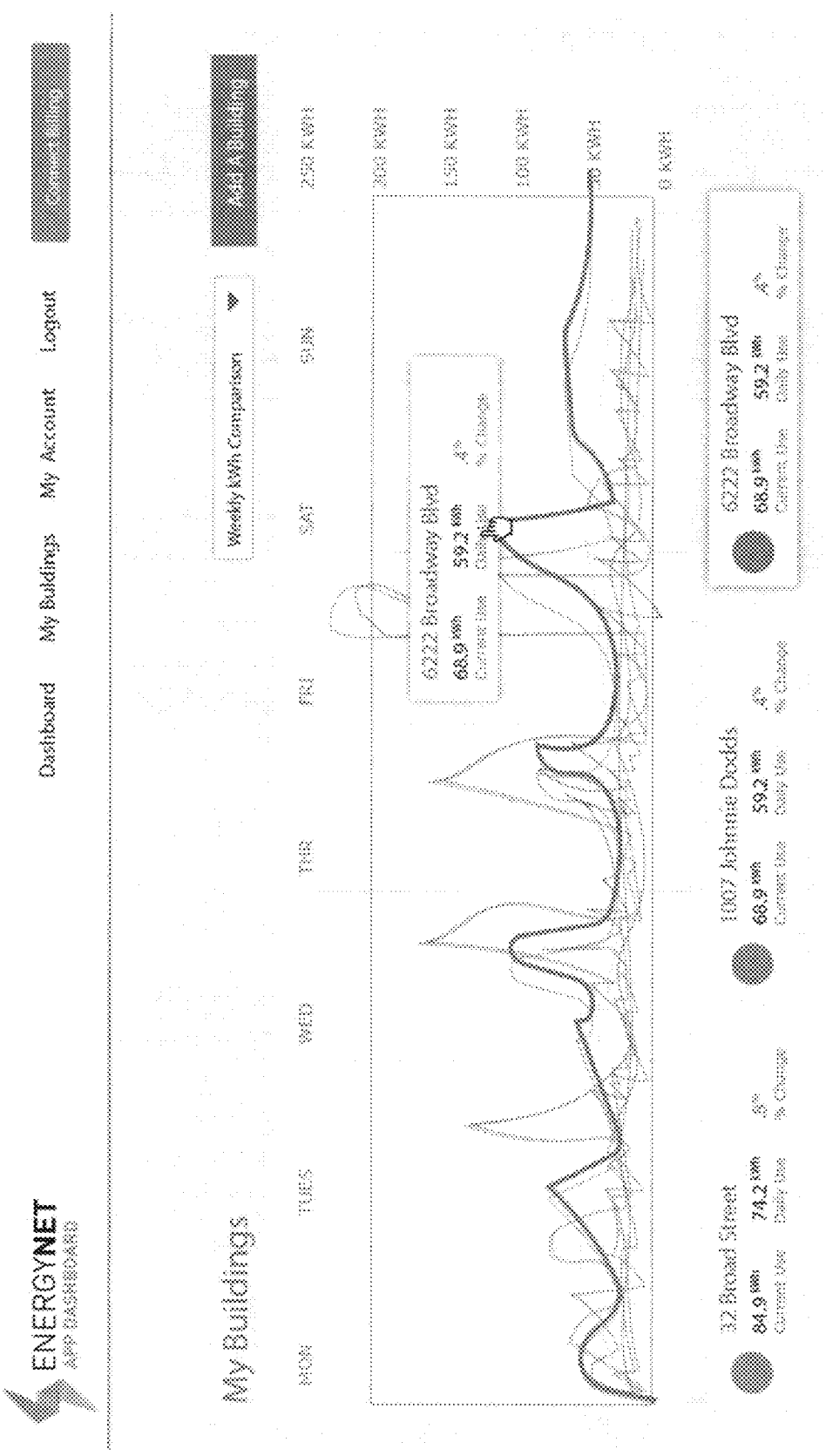
FIG. 27 illustrates another GUI screen shot showing EnergyNet App dashboard view for commercial building or facilities data.
Figure 28:
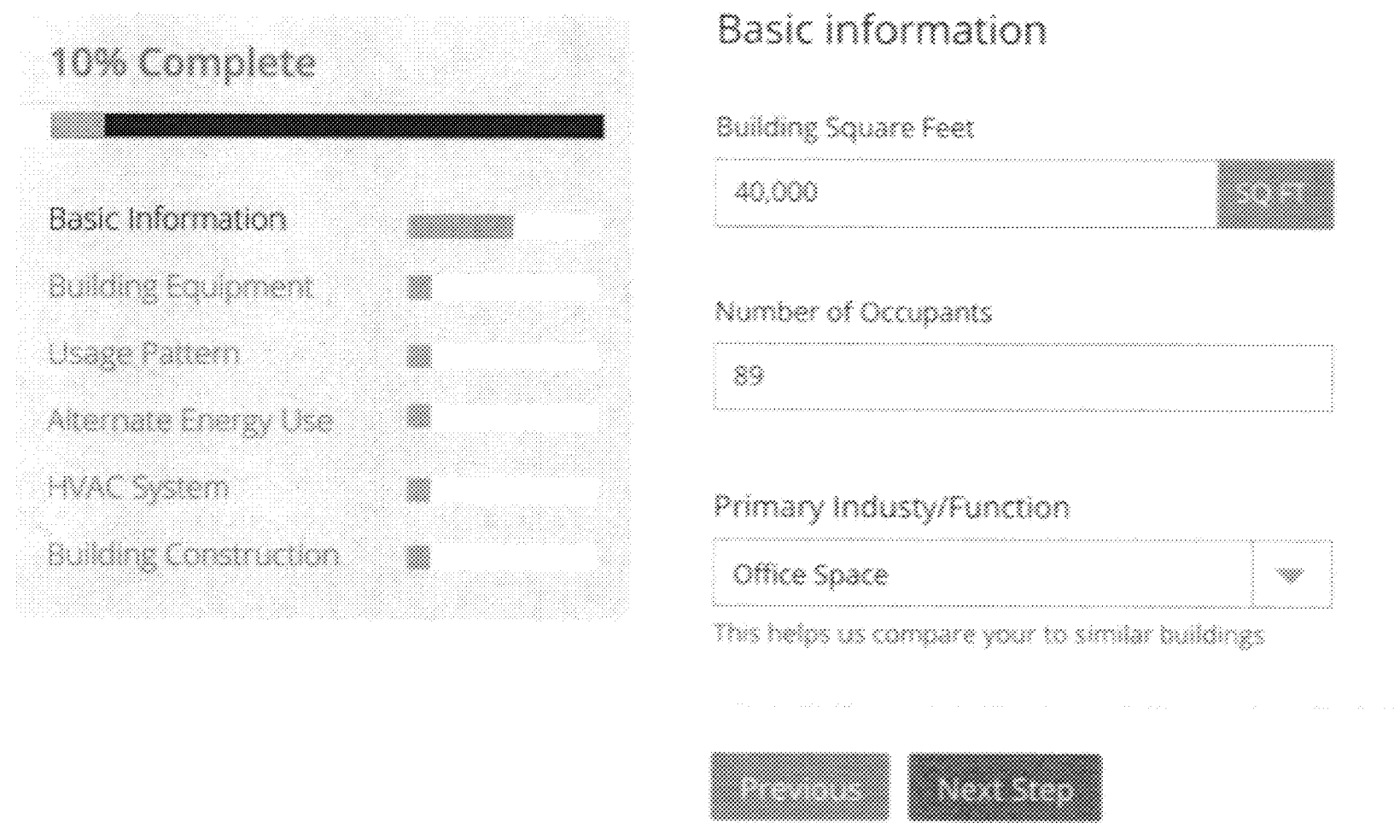
Figure 29:
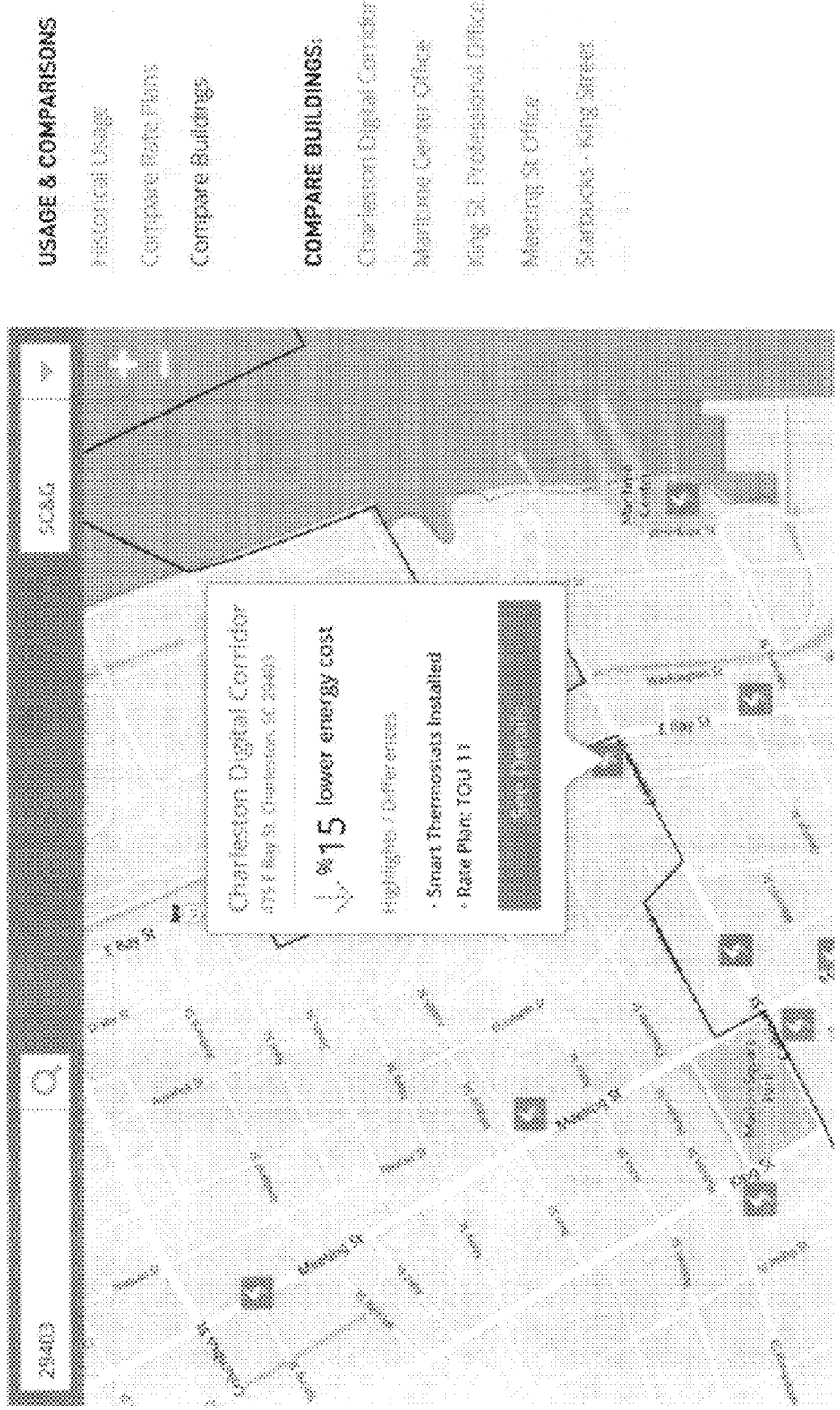
FIG. 29 illustrates another GUI screen shot showing EnergyNet App dashboard view for comparing buildings within a predetermined geographic area.
Figure 30:
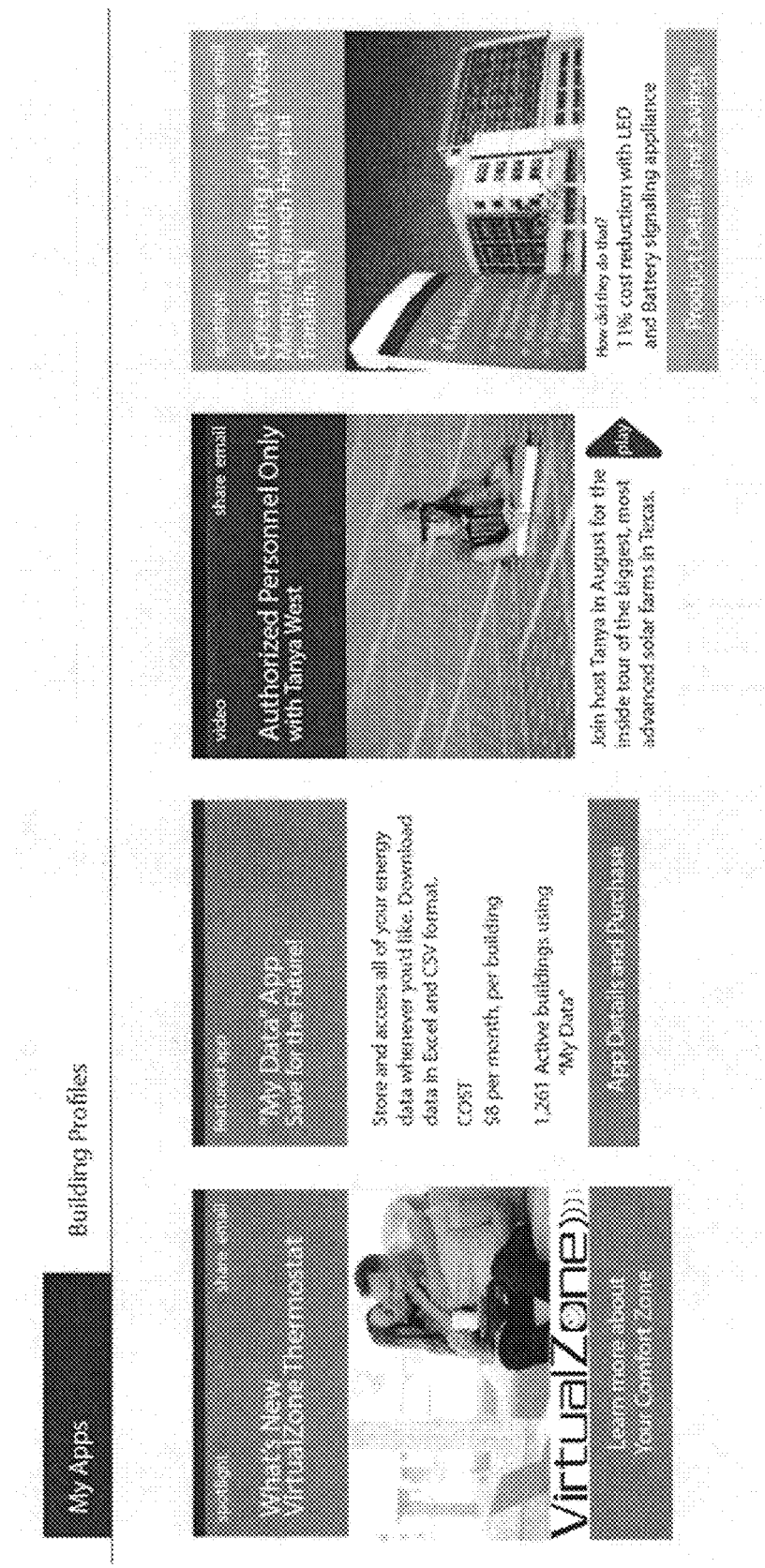
FIG. 30 illustrates another GUI screen shot showing EnergyNet App dashboard view for Apps associated with the profile and/or account in addition to building profiles.
Figure 31:
FIG. 31 illustrates another GUI screen shot showing EnergyNet App dashboard view for automatically generated recommendations.
Figure 32:
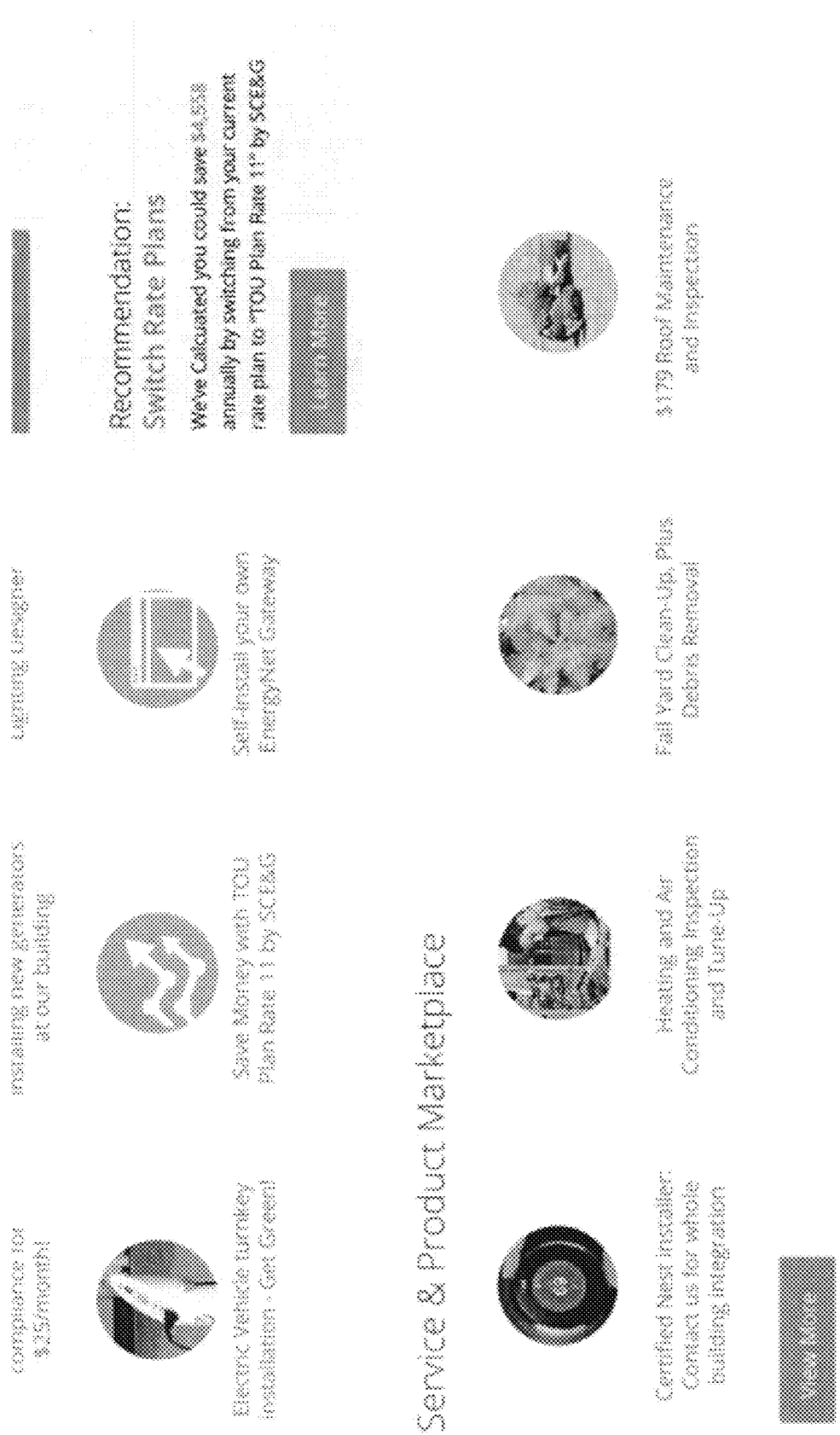
FIG. 32 illustrates another GUI screen shot showing EnergyNet App dashboard view for service and product marketplace.
Figure 33:
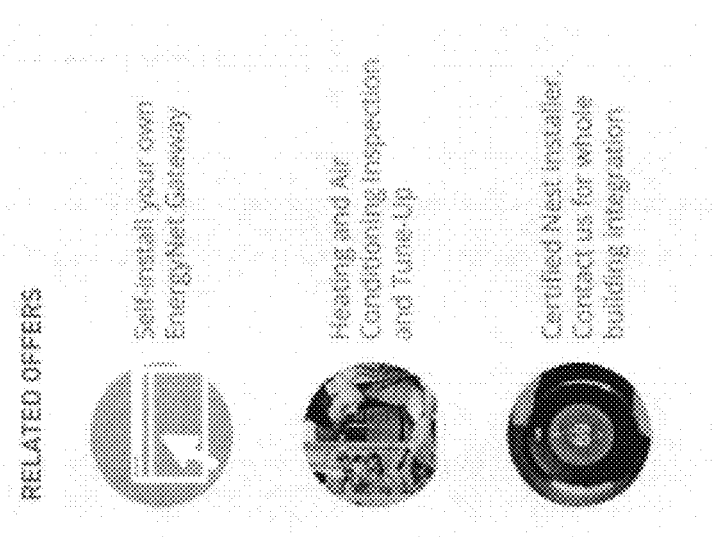
FIG. 33 illustrates another GUI screen shot showing EnergyNet App dashboard view for at least one of the selected automatically generated recommendations.
Figure 33:
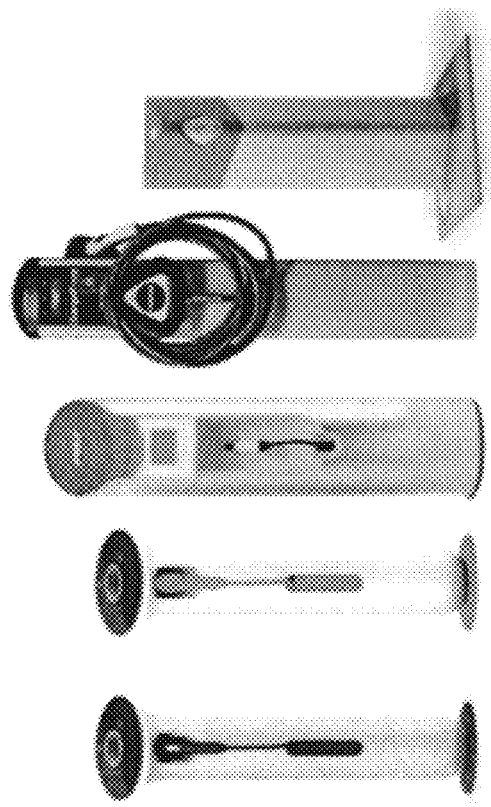

FIG. 27 illustrates another GUI screen shot showing EnergyNet App dashboard view for commercial building or facilities data over time, including historical, real-time, and projected future data for each of at least one commercial building. FIG. 28 illustrates another GUI screen shot showing EnergyNet App dashboard view for commercial building or facilities data associated with FIG. 27 for developing a profile for a building or facility. FIG. 29 illustrates another GUI screen shot showing EnergyNet App dashboard view for commercial building or facilities data associated with FIG. 27 for comparing buildings within a predetermined geographic area. FIG. 30 illustrates another GUI screen shot showing EnergyNet App dashboard view for commercial building or facilities data associated with FIG. 27 for showing Apps associated with the profile and/or account in addition to a tab for building profiles. FIG. 31 illustrates another GUI screen shot showing EnergyNet App dashboard view for automatically generated recommendations for the user and/or account associated with FIG. 27, including Apps and services offerings. FIG. 32 illustrates another GUI screen shot showing EnergyNet App dashboard view for automatically generated recommendations for the user and/or account associated with FIG. 27, in addition to those illustrated in FIG. 31. FIG. 32 also shows recommendations for service and product market place. FIG. 33 illustrates another GUI screen shot showing EnergyNet App dashboard view for at least one of the selected automatically generated recommendations for the user and/or account associated with FIG. 32, including automatically generated related offers. FIG. 33 also shows electric vehicle turnkey installation as a market officer from the recommendations.

EnergyNet is a one-stop or integrated platform and provides an automated payment exchange using advanced billing models which allow customers to pay in a variety of ways, for example a shared data plan coupled with a monthly payment plan, a daily payment plan, and/or prepayment plan with a remote disconnect option enabled. Single payments simplify access to the distributed energy market and are automatically aggregated and settled between the distributed and fixed generators via energy retailers. Prompt payment reduces the cost of capital, bad debt and credit risk for market participants; it is a fundamental aspect of the AES. Payments are collected through integration with third party payment banking systems and can be managed by customers in the Energy Net Customer Portal GUI. A meter data aggregator allows entities to function as intermediary between load serving entity or to share data to the TDSP, and is provided with the platform. Also, payment to customers may be provided for their data to facilitate transactions through the Energy Net Customer Portal GUI.

Figure 34:
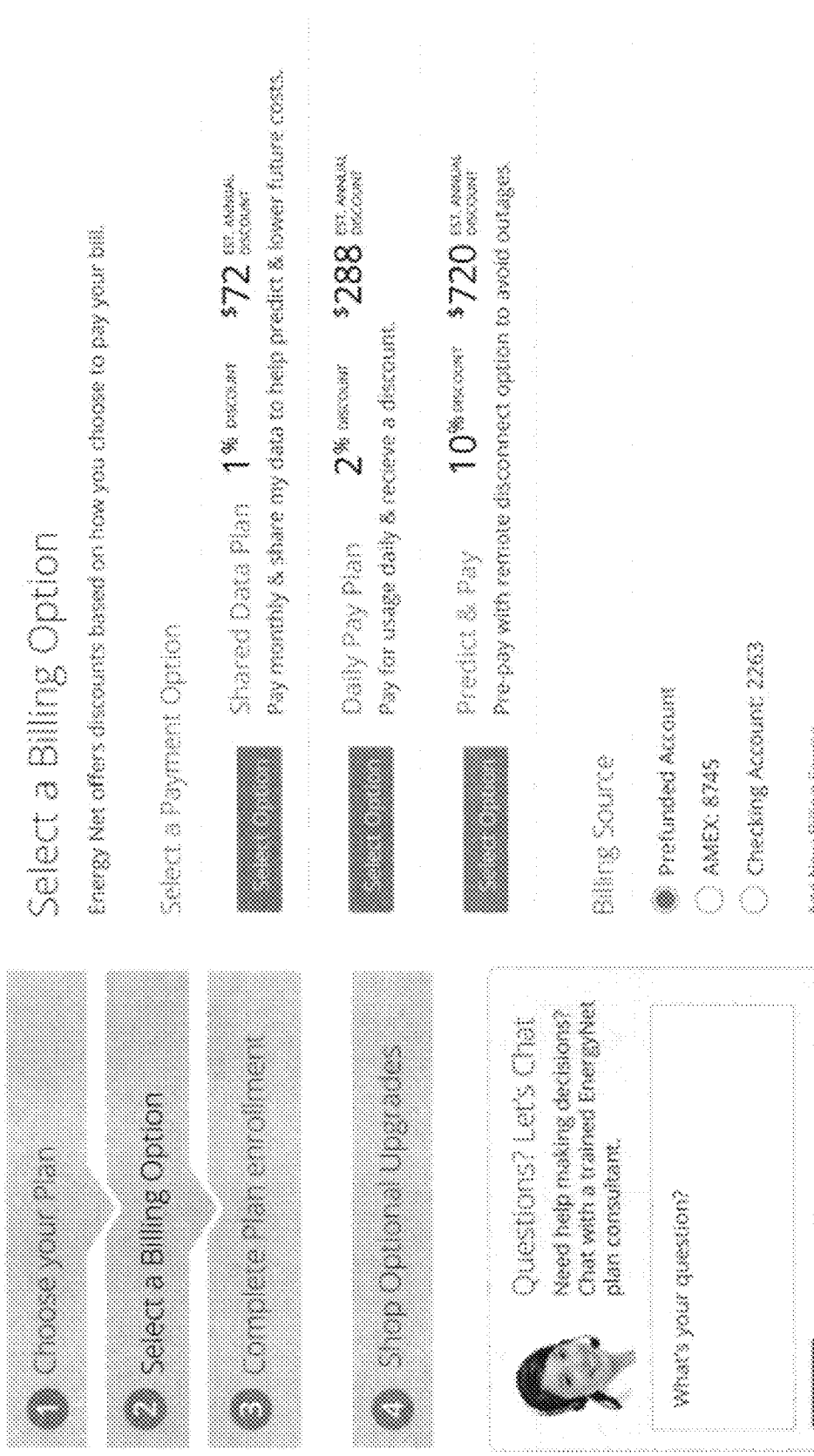
FIG. 34 illustrates a graphic user interface screen shot for an embodiment of the present invention showing a Select a Billing Option interactive GUI.
Figure 35:
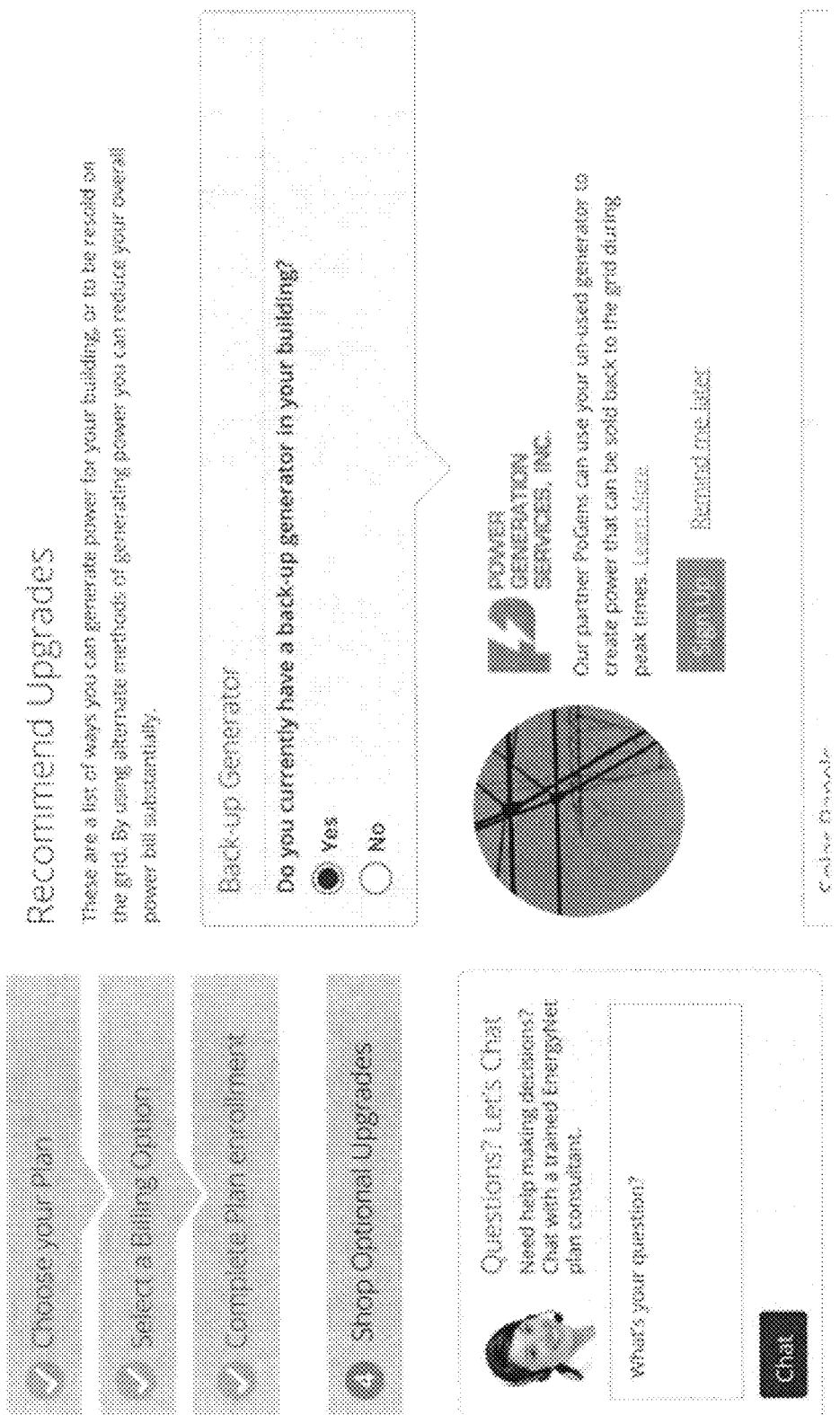
FIG. 35 illustrates another GUI screen shot showing EnergyNet App dashboard view for completing AES plan enrollment and showing Recommend Upgrades options for interactive selection.

FIG. 34 illustrates a GUI screen shot for an embodiment of the present invention showing a Select a Billing Option interactive GUI providing alternative payment options that are optimized to provide lowest rates for AES, including Billing Source for making electronic payments with credit card(s) and/or financial or bank accounts, including adding New Billing Source. FIG. 35 illustrates another GUI screen shot showing EnergyNet App dashboard view for completing AES plan enrollment and showing Recommend Upgrades options for interactive selection.

Figure 36:
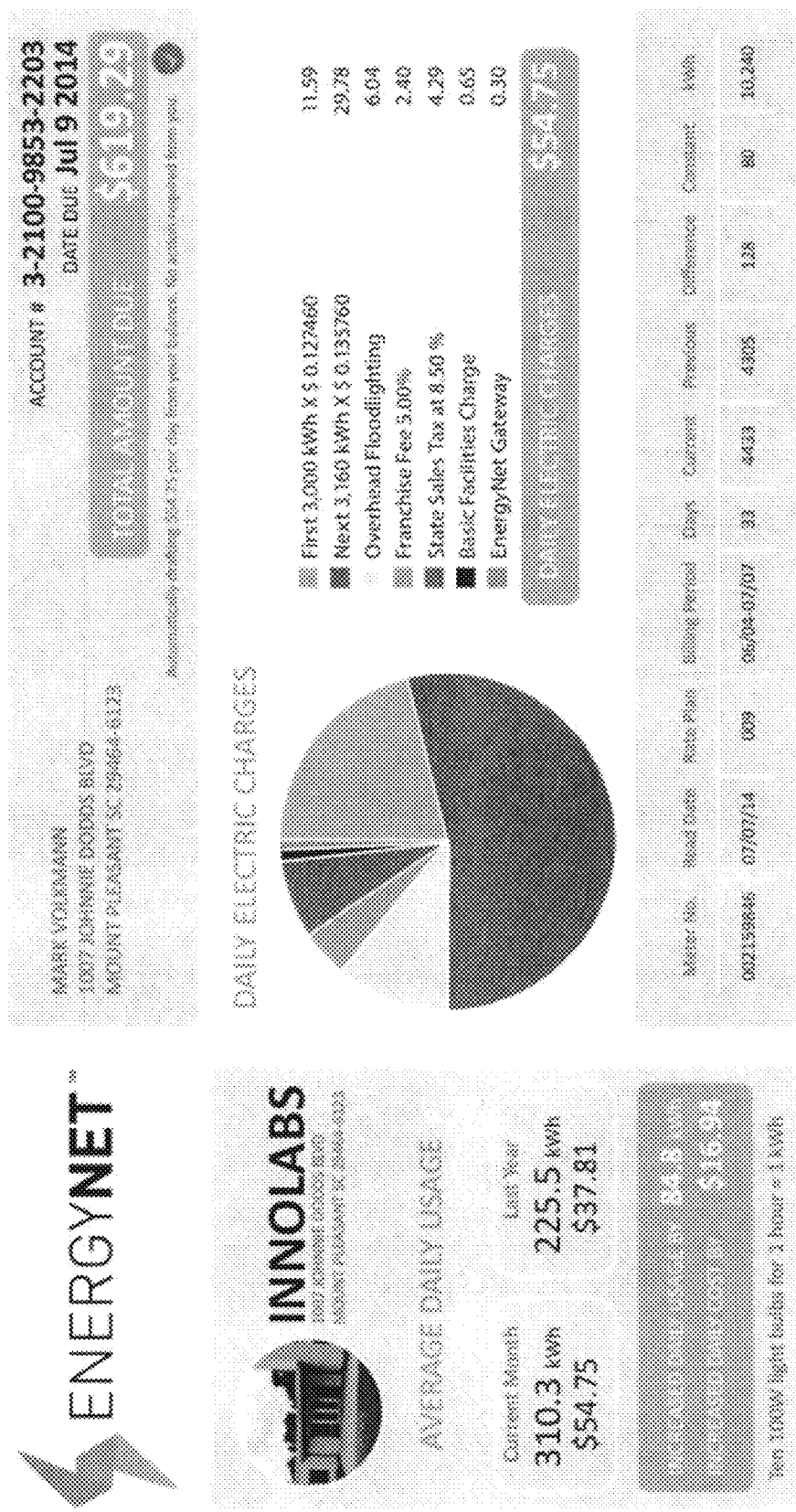
FIG. 36 illustrates another GUI screen shot showing EnergyNet App view for an AES financial summary for a building.
Figure 37:
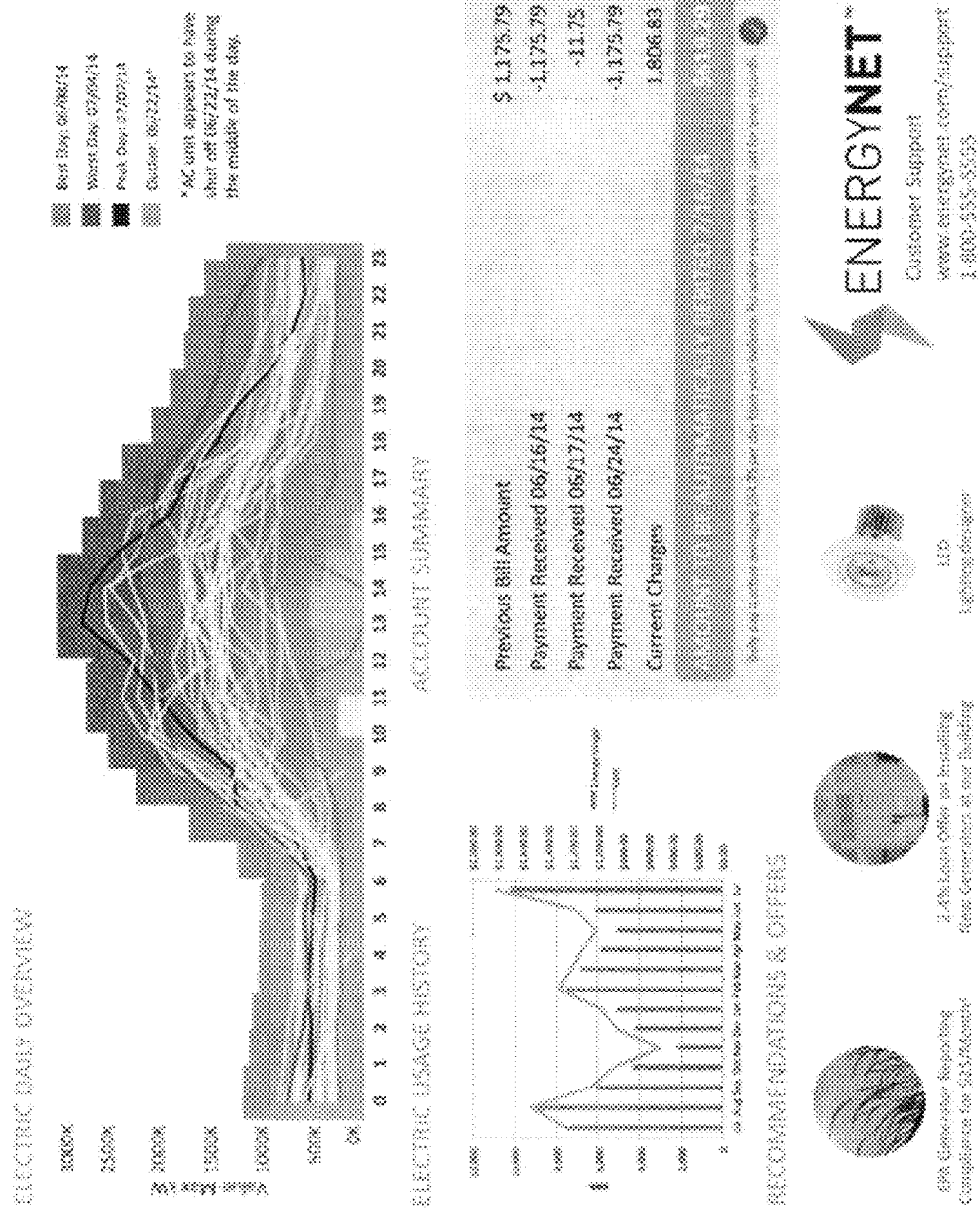
FIG. 37 illustrates another GUI screen shot showing EnergyNet App view for an AES financial summary with additional information relating to FIG. 36.

FIG. 36 illustrates another GUI screen shot showing EnergyNet App view for an AES financial summary for a building as illustrated in the prior figures associated with FIG. 27 for a commercial building. FIG. 37 illustrates another GUI screen shot showing EnergyNet App view for an AES financial summary with additional information relating to FIG. 36. This additional information includes electric daily overview, electric usage history, account summary, and recommendations and offers.

Figure 38:
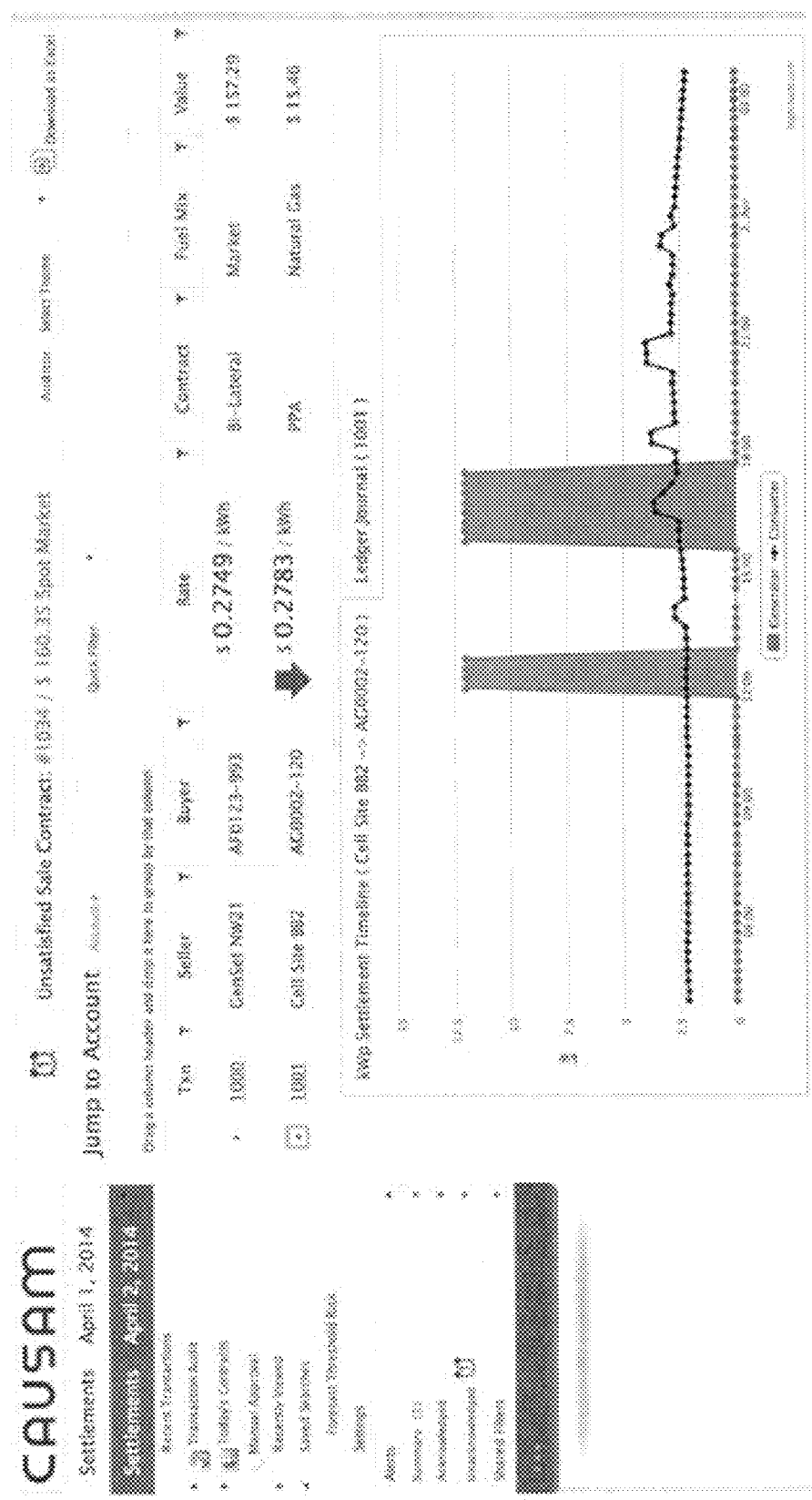
FIG. 38 illustrates another GUI screen shot showing EnergyNet App dashboard view for REPs for AES participation.

FIG. 38 illustrates another GUI screen shot showing EnergyNet App dashboard view for REPs for AES participation, including at least a partial ledger view. Information, such as sellers, buyers, rates, contracts, fuel types, and value, is listed for each transaction. A kilowatt packet (KWP) settlement timeline is also provided.

Figure 39:
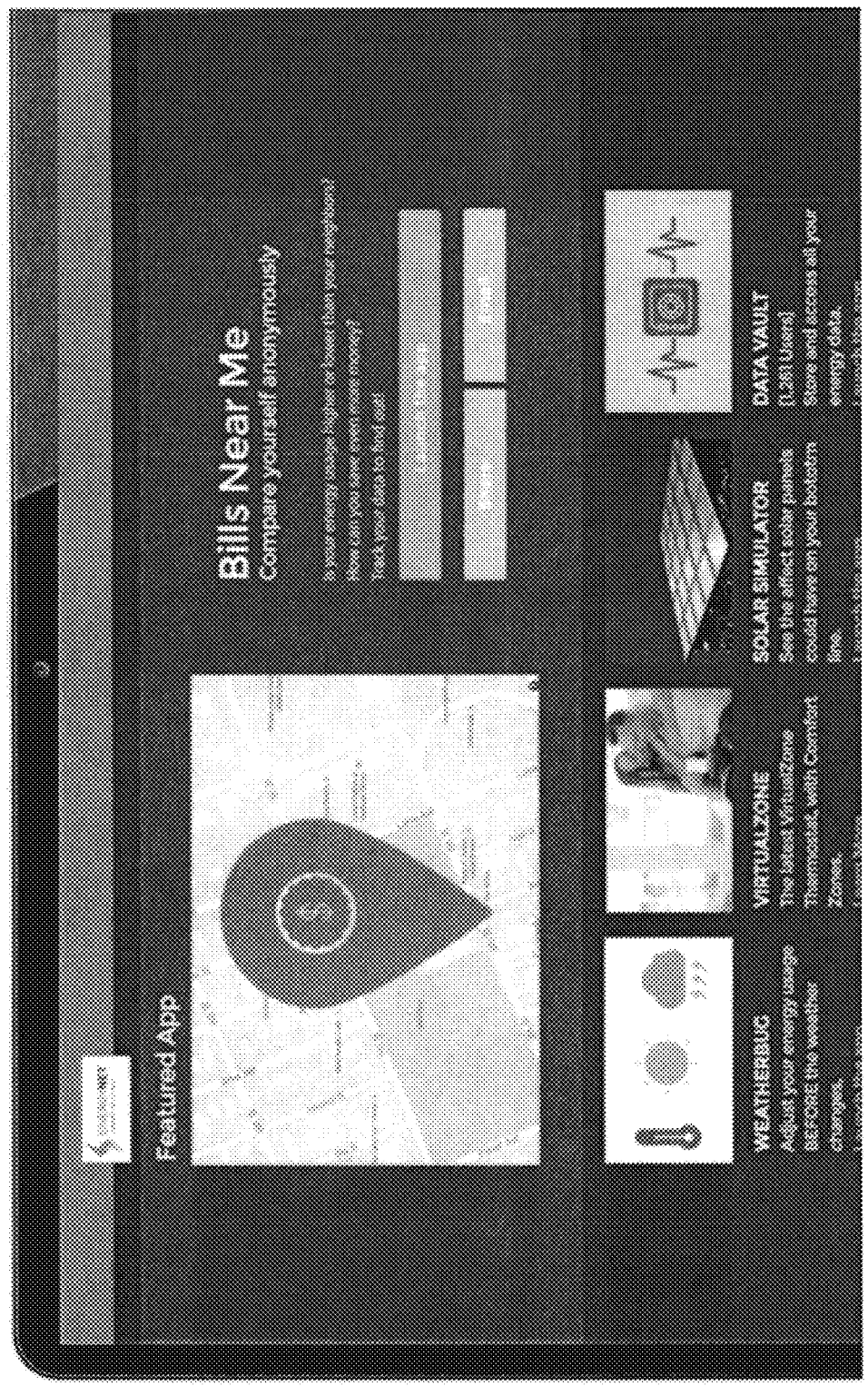
FIG. 39 illustrates another GUI screen shot showing EnergyNet App dashboard view for a featured App "Bills Near Me."

FIG. 39 illustrates another GUI screen shot showing EnergyNet App dashboard view for a featured App for anonymous comparison of electrical energy usage within a predetermined geographic area, as well as other Apps, for selection for an account and/or user.

Figure 40:
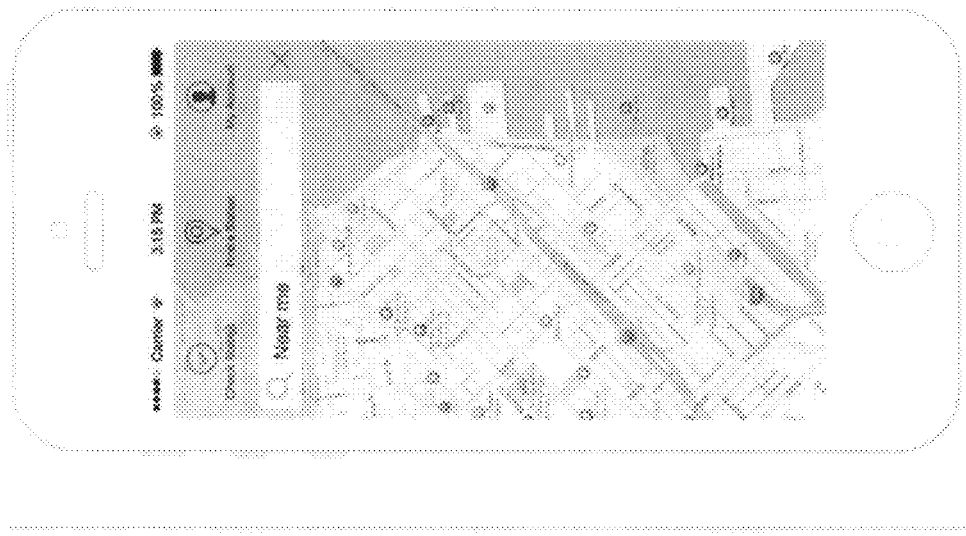
FIG. 40 illustrate a GUI screen shots for a mobile smartphone App for electric vehicle (EV) charging.
Figure 41:
FIG. 41 illustrate another GUI screen shots for a mobile smartphone App for EV charging.
Figure 42:
FIG. 42 illustrate another GUI screen shots for a mobile smartphone App for EV charging.
Figure 43:
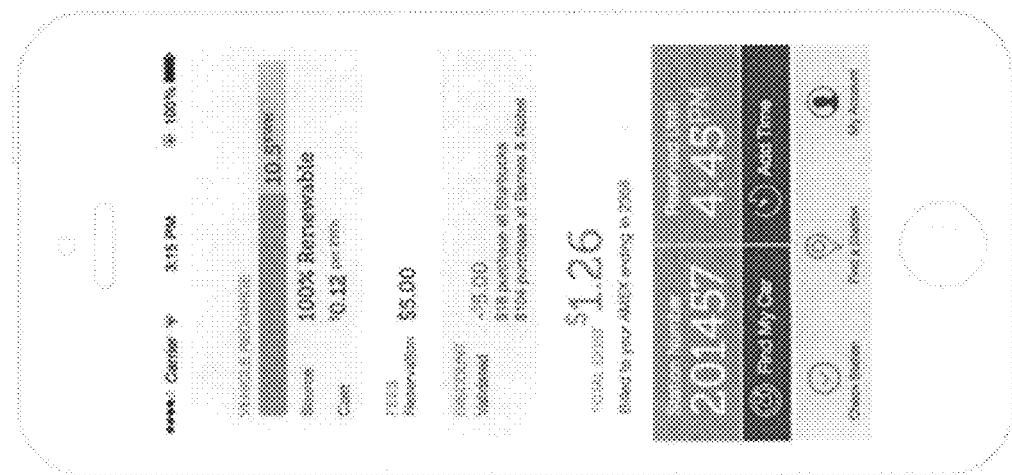
FIG. 43 illustrate another GUI screen shots for a mobile smartphone App for EV charging.

FIGS. 40-43 illustrate GUI screen shots for a mobile smartphone App for electric vehicle (EV) charging. FIG. 40 relates to finding a station and includes a GPS-based map and current location of the EV App user. This App is operable to locate and reserve a station near you now, in advance or on your GPS itinerary, and provide target marketing based on user profile and priority. A "green" App is for people focusing on recharging. An "urban" App is for people focused on reserved parking. A "healthy" app is for people focused on shopping. FIG. 41 relates to reserving a station and includes a blow-out section from a GPS-based map. Information such as availability, fees, recharge strength, amenities, and nearby services, is provides. Users may book reservation in advanced, or pre-purchase one time or with subscription. FIG. 42 relates to arriving at the station reserved in FIG. 41. Once arriving at the reserved station, a user simply parks his car, receives a push notification call to action, and purchases via smartphone device or in vehicle dash display. New users need to sign up by GPS location, GQ, RFID, Video, or EV charger identification. FIG. 43 relates to data associated with the parked and/or charging time for the EV and related reserved station of FIG. 41. Users can view vehicle recharging status and fees associated, browse offers, order food, and easily top-up or extend reservation. Discounts and parking validation is automatic by local retailers and marketers. Users can view their vehicles through video security monitoring while enjoying free WiFi videos and games.

The account, consumer, and/or user profile(s) preferably includes a unique user identifier or identification, such as, by way of example and not limitation, a username and password. Further information is preferably provided, including an account identifier, user financial account information, utility and/or market participant account information, geodetic information such as by way of example and not limitation a smartphone location identifier (such as GPS-based location information, RFID, and/or near-field communication identifier), which is preferably communicated wirelessly over network-based communication to the server computer and/or processor with memory associated with the account for advanced energy settlements, and/or communicated with user of optical bar code, QR code, Digital Radio, Radio Frequency Identification, Optical Pattern Matching, etc. Additional information may optionally be associated and/or stored with the consumer profile, and communicated via the network, including historical data relating to energy consumption, status, supply systems (by way of example and not limitation, back-up power supply, generator(s), battery, alternative energy such as solar, wind, etc., smartphone transactions relating to energy-affected activities, history of purchases made for products and/or services, history of offers and responses made for products and/or services, and combinations thereof. At least one message included with the GUI preferably includes information about electric power supply pricing and corresponding plan alternatives associated with advanced energy settlements; additional advertising and offers for products and/or services may be provided via the GUI based upon the corresponding profile for the user and/or account, opt-in/opt-out inputs, and combinations thereof. Preferably, market pricing conditions via a customer profile that can be loaded to a computer, smart phone, tablet, or any web-enabled appliance for accepting or modifying a profile or moreover a profile that automated controls based upon previously selected economic messages. In a further embodiment, energy consumption patterns within active grid elements profiles could be used to identify opportunities for up selling, down selling, or cross selling. These opportunities may be determined by the power utility or market participant, REP, and/or by affiliates, partners, or advertisers. Data from active grid elements profiles associated with the user and/or account (including historical data, real-time data, and/or projected or predicted future data) may be used to provide insights on inefficient devices, defective devices, or devices that require updating to meet current standards, and/or products and services corresponding or complementary to the active grid elements or the user/account. Active grid elements profiles data, individually or collectively (or selectively) in the aggregate, performance and/or participation, actions or activities, may also be used to identify related power grid participation opportunities. Data from consumer purchase and marketing activities may be used to provide insights on inefficient merchants or service providers.

Figure 44:
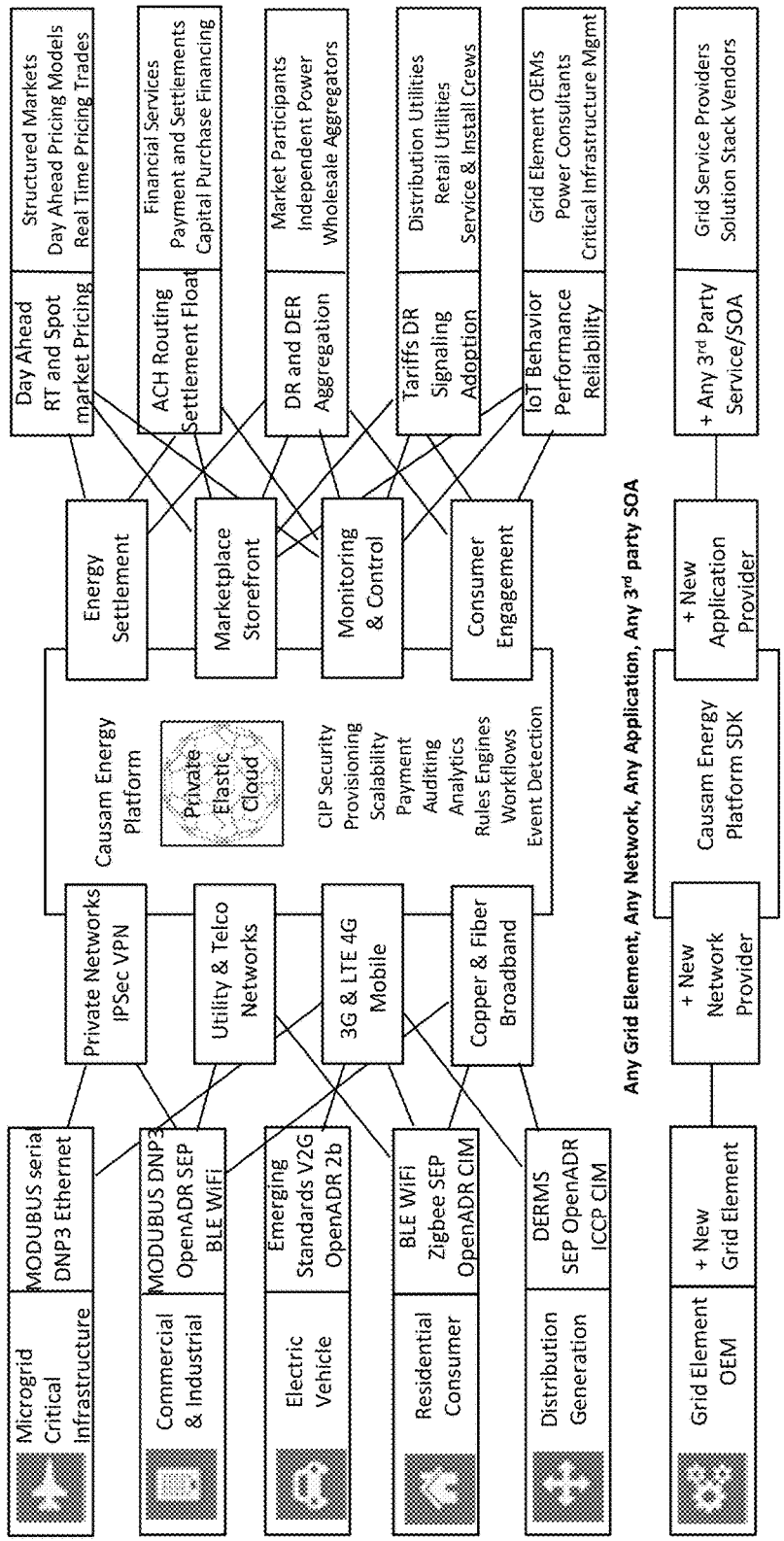
FIG. 44 provides a diagram of the functions of the advanced EnergyNet platform in the present invention.

FIG. 44 provides a diagram of the functions of the advanced EnergyNet platform in the present invention. The platform includes a private elastic cloud providing Critical Infrastructure Protection (CIP) security, provisioning, scalability, payment, auditing, analytics, rules engines, workflows, and event detection. The advanced EnergyNet platform connects a network of power and various EnergyNet Applications. Grid elements are connected to the network of power via various communication protocols over private networks, utility & telecommunication networks, 3G, 4G LTE mobile networks, and/or copper & fiber broadband. Third party SOA is developed by different grid service providers and/or solution stack vendors for different EnergyNet Applications, for example but not limited to energy settlement, market place storefront, monitoring and control, consumer engagement. Grid elements include but not limited to microgrids for critical infrastructure, commercial and/or industrial buildings, electric vehicles, residential consumers, and distribution generations. The communication protocols include but not limited to MODBUS Serial, DNP3, Ethernet, OpenADR SEP, BLE, WiFi, Emerging Standards V2G, OpenADR 2b, ZigBee SEP, OpenADR CIM, DERMS, SEP, OpenADR, ICCP CIM. Meanwhile, grid element OEM can provide new grid elements to be connected to the network of power through new network providers. The third party SOA enables grid service providers and/or solution stack vendors to provide third party service for the EnergyNet applications. Grid service providers and/or solution stack vendors include but not limited to structured markets, financial services, market participants, independent power, wholesale aggregators, distributed utilities, retail utilities, service & Install Crews, Grid Element OEMs, power consultants, critical infrastructure management. The third party service includes day ahead, real time and spot market pricing, Automated Clearing House (ACH) routing, settlement float, tariffs, DR signaling, adoption, IoT behavior, performance, reliability, etc. Meanwhile, new application provider can added new applications to the platform.

By way of example and not limitation, the systems and methods of the advanced energy settlement platform are operable for the design, specification, construction, management, and advanced energy settlement with real-time or near-real-time market rates for electrical activities of a data center or a microgrid. GUI, icons, and/or visual representations or symbols of grid elements (Grid Element Icons—GEIs) are provided by the system and methods of the present invention, and associated with corresponding data for each of the grid elements stored in a grid element library or virtual or digital catalog. The grid element data may be provided by corresponding grid element suppliers, equipment manufacturers, distributors, historical data from user/account (including but not limited to grid element purchases, acquisitions, grid element activations for registration with the electric power grid, etc.), publicly available data from the internet, proprietary data, and/or custom-generated data. Preferably, the GUIs are selectable by a remote user on a computer having a display and interactive graphic user interface for making a digital design for a data center. The GUIs may be click-selected and/or by drag-and-drop selection from the grid element library to the design layout or schematic diagram, as illustrated on FIG. 19.

In one embodiment, an EnergyNet Grid Element Photo Capture application is provided by the advanced EnergyNet Platform. Field technicians are responsible for capturing Microgrid and DER information as part of a site survey or energy assessment. EnergyNet streamlines this process by taking advantage of the geo location and camera capabilities of modern smartphones. All mobile field captured information is immediately available to the back office support team.

Figure 45:
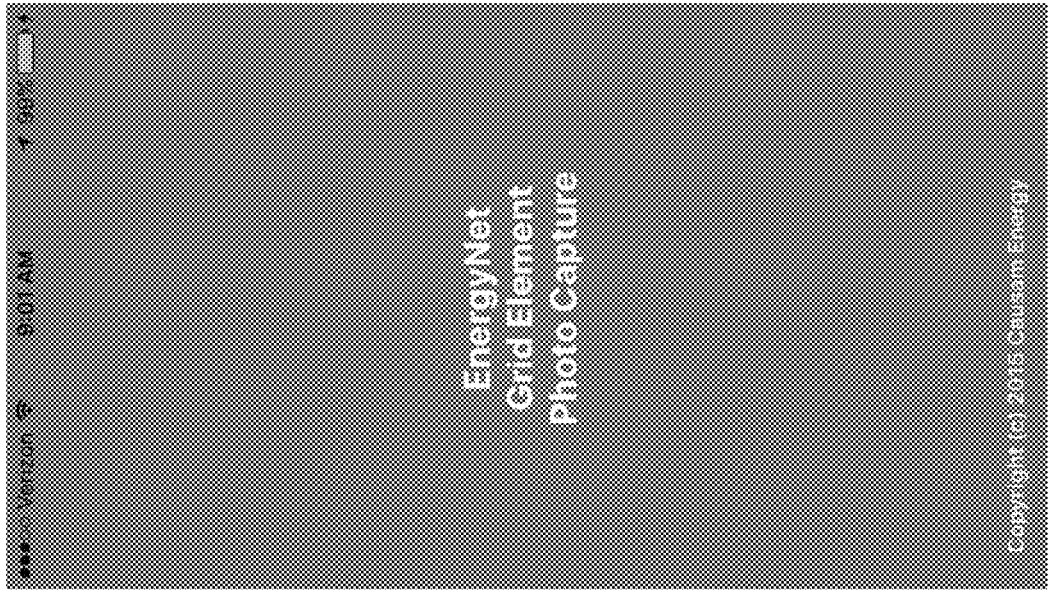
FIG. 45 is a screenshot for the EnergyNet Grid Element Photo Capture application.

FIG. 45 is a screenshot for the EnergyNet Grid Element Photo Capture application. Field technicians install this application on any modern smartphone platform including iOS and Android. Professional ruggedized devices can be pre-provisioned and shipped to field technicians, or field technicians can use their own commodity equipment available over the counter.

Figure 46:
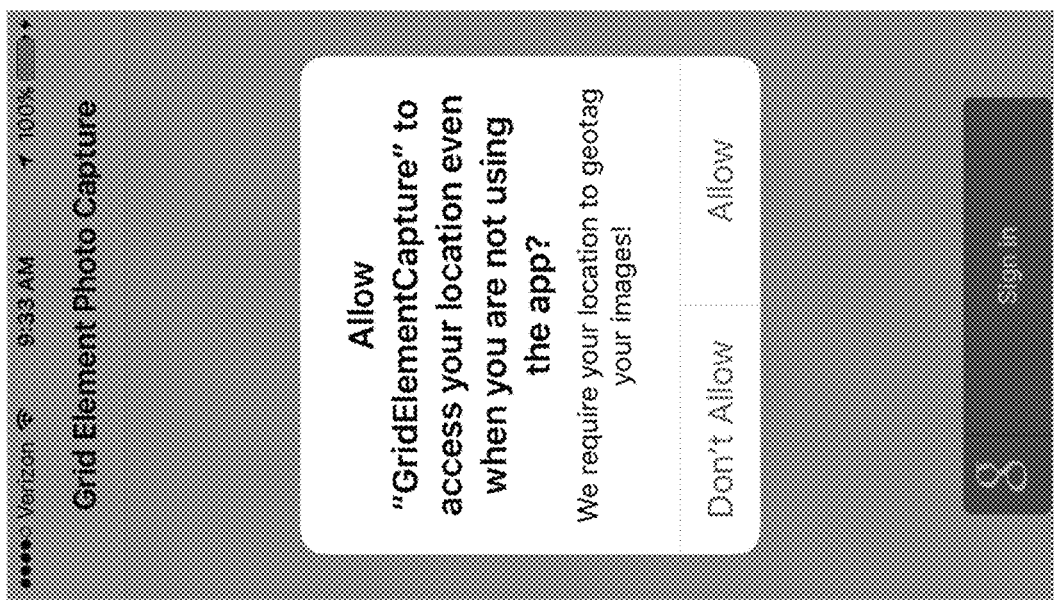
FIG. 46 is another screenshot for the EnergyNet Grid Element Photo Capture application.

FIG. 46 is another screenshot of the EnergyNet Grid Element Photo Capture application. A field technician launches the application for the first time, a dialogue window pops out asking "allow "GridElementCaputre" to access your location even when you are not using the app?" and reminding "we require your location to geotag your images." The filed technician approves the application to record and/or geotag pictures.

Figure 47:
FIG. 47 is another screenshot for the EnergyNet Grid Element Photo Capture application.

FIG. 47 is another screenshot of the EnergyNet Grid Element Photo Capture application. A field technician authenticates via single sign-in with cloud service, such as google, or enterprise service, such as Active Directory or SAP.

Figure 48:
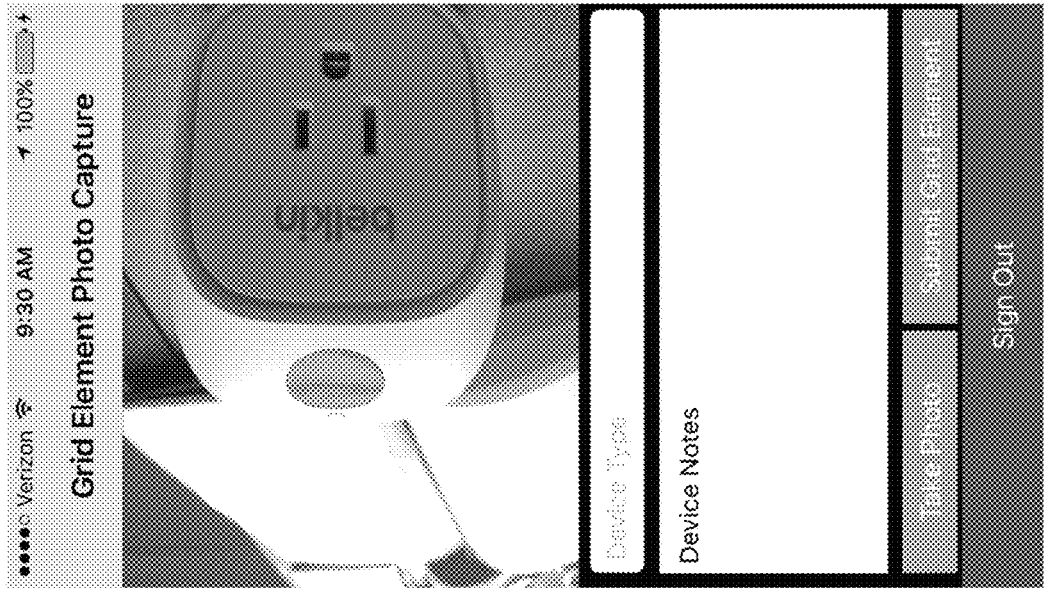
FIG. 48 is another screenshot for the EnergyNet Grid Element Photo Capture application.

FIG. 48 is another screenshot for the EnergyNet Grid Element Photo Capture application. The primary function of the application is to take pictures of grid elements, meters, infrastructure, and power bill invoices. The video camera on the device instantly activates and the view finder displays the object the video camera is pointed at. The field technician presses the "Take Photo" button to capture an image of the object.

Figure 49:
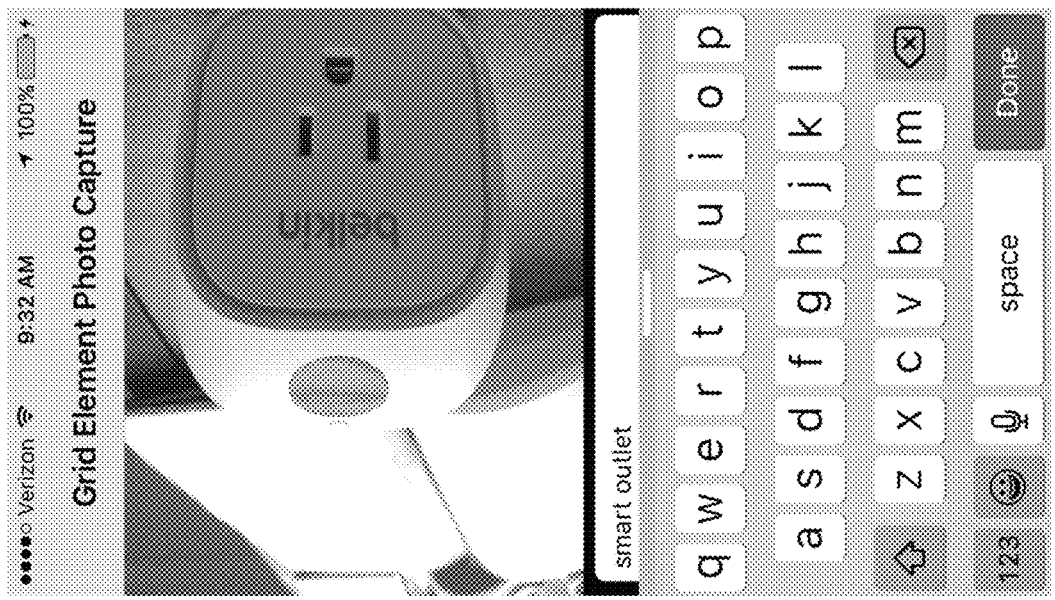
FIG. 49 is another screenshot for the EnergyNet Grid Element Photo Capture application.

FIG. 49 is another screenshot for the EnergyNet Grid Element Photo Capture application. After taking the image, the field technician is prompted to tag the content with a drop-down list of selections, free-form text, and optical character recognition (OCR) review and approval. For example, OCR can be used to automatically detect meter manufacturer brand information, face place data, or LCD real-time data points.

Figure 50:
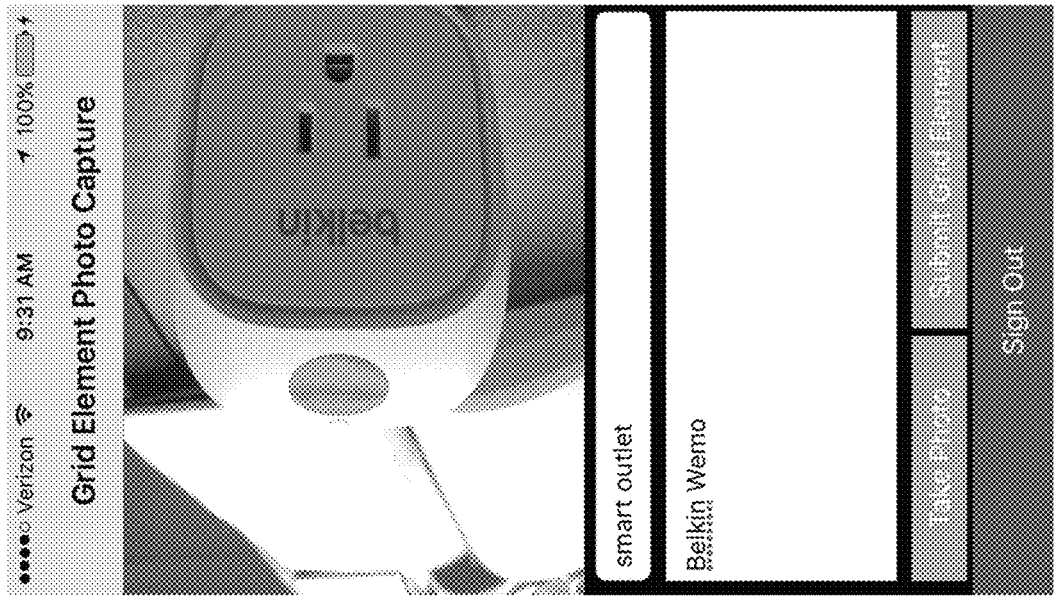
FIG. 50 is another screenshot for the EnergyNet Grid Element Photo Capture application.

FIG. 50 is another screenshot for the EnergyNet Grid Element Photo Capture application. After the image is tagged, the user presses the "Submit Grid Element" button. The image, tagging, description, location, geoTag are all sent to the server side.

The active grid elements within an electric power grid (or off the grid in alternative embodiments) operate to receive information automatically through a plurality of methods utilizing IP-based communications methods and web based devices such as in car computers, smart phones, computers, text messages, paging messages, or even voice response units or live customer service agents. Under a real time scenario, active grid elements could dynamically "Opt In" to a pre-determined profile or "Opt Out" or more importantly change the profile dynamically through the Energy Net Customer Portal GUI to take advantage of real time market pricing of electricity being sold by the utility, market participant, REP or any entity authorized to buy, sell and trade electric commodity or demand response products on behalf of the owner. Control activity including messaging for changing account and/or grid element settings, profile, functionality, and combinations thereof is also provided; analytics are included as well. Event-based messaging is also provided. In one embodiment, electric power is supplied through non-islanded microgrid or cogeneration. The settlement is independent of utility. Transformers are functioning like diodes; current flowing through the branch is stopped. The advanced EnergyNet settlement platform matches load and supply as long as not exceeding limitations of the leg. The flow of power is stopped that is being measured by utility revenue grid meter by TDSP. In another embodiment, still with utility connected microgrid, but the advanced EnergyNet settlement platform can run bilateral transaction that is settled as described herein within. Add FERC Order No. 2003 and No. 2006 are incorporate by reference in entirety herein. The systems and methods of the present invention further provide for analyzing the control activity, responses to the controls (for example like Google adwords so that when a marketing message is provided, then there is compensation for the messaging like Google adwords), e.g., least cost provider for recharging mobile electric power storage and/or EVs; whoever plugs in also is preferably connected to the financial settlement network associated with the mobile app and/or charging terminal, which may further include a marketing database, so that as the consumer is reviewing possible opportunities. The system includes AES messaging and/or payment to clear the messages and/or data packet transmission, and for delivering the marketing message, and the analytics over the marketing message including but not limited to open rate, response rate, referral rate, purchase conversion rate.

In one embodiment of the present invention, the EV app and GUI provide for targeted mobile and in-car advertising to the user or consumer based upon the consumer profile, in particular where the consumer has authorized information to be shared or used for purposes other than for EV charging at any given time.

While the foregoing description of preferred embodiments illustrates the applications for EVs as automobiles, the present invention further includes other EV applications, including but not limited to trucks, transport vehicles, boats and boat marinas, and the like, and mobile battery charging for portable storage of electric power. Also, the present invention for EV automobiles applies to private residence and private parking facilities, as well as fixed and temporary public EV charging including but not limited to hotels, public parking slips or spots, public parking in garage settings, corporate, event venues, temporary parking, overflow parking, etc.

Certain modifications and improvements will occur to those skilled in the art upon a reading of the foregoing description. By way of example, communications alternatives will be understood to be covered under the present invention. As an example but not limitation, 5G communication may be used for messaging in the systems and methods of advanced energy settlements in an electric power grid in the present invention. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

What is claimed is:
1. A method for advanced energy settlements in an electric power grid, comprising:
providing an advanced energy settlement platform comprising at least one server computer operable for communication over a network with a multiplicity of distributed computing devices, a multiplicity of power consuming devices of at least one energy customer, a multiplicity of revenue grade distributed generators, and a multiplicity of non-revenue grade distributed generators;
the advanced energy settlement platform aggregating power consumption data from the multiplicity of power consuming devices of the at least one energy customer;
the advanced energy settlement platform aggregating revenue grade power supply data from the multiplicity of revenue grade distributed generators;
the advanced energy settlement platform aggregating revenue grade equivalent power supply data from the multiplicity of non-revenue grade distributed generators, wherein the revenue grade equivalent power supply data is data within less than 10% variation from revenue grade metrology as required by a utility or a governing entity for management and settlement on the electric power grid;
the advanced energy settlement platform creating real-time settlement blocks based on the power consumption data, the revenue grade power supply data, and the revenue grade equivalent power supply data received via Internet Protocol (IP)-based metering in real time or near real time, wherein the real-time settlement blocks are further based on energy power purchase agreements between the multiplicity of power consuming devices and the multiplicity of revenue grade distributed generators and the multiplicity of non-revenue grade distributed generators, wherein the real-time settlement blocks are revenue grade settlement blocks;
aggregating and settling distributed energy charges with the multiplicity of revenue grade distributed generators and the multiplicity of non-revenue grade distributed generators for the multiplicity of power consuming devices from the at least one energy customer based on the real-time settlement blocks during a billing period through a clearing house; aggregating and settling fixed energy charges with the energy retailer or retail energy provider for the at least one energy customer during the billing period;
the multiplicity of revenue grade distributed generators and the multiplicity of non-revenue grade distributed generators altering power supply patterns based on the real-time settlement blocks;

the multiplicity of power consuming devices updating power consumption patterns based on the real-time settlement blocks; and wherein the step of aggregating and settling distributed energy charges is initiated via a graphical user interface (GUI) by any of the at least one energy customer, the multiplicity of revenue grade distributed generators, and the multiplicity of non-revenue grade distributed generators.

2. The method of claim 1, wherein the power consumption data is measured through sub-metering technology in real-time or near real-time.

3. The method of claim 1, further comprising the advanced energy settlement platform underpinning a settlement process for the billing period based on the real-time settlement blocks.

4. The method of claim 3, further comprising the advanced energy settlement platform mapping the real-time settlement blocks to corresponding energy power purchase agreements.

5. The method of claim 3, further comprising generating a cost for each of the real-time settlement blocks and a customer balance from all the real-time settlement blocks during the billing period.

6. The method of claim 1, further comprising automatically collecting payments from the at least one energy customer.

7. The method of claim 1, further comprising generating a cost for each of the real-time settlement blocks based upon a Time of Use (TOU), a demand, taxes, access fees, and/or the distributed energy charges.

8. The method of claim 1, further comprising integrating the advanced energy settlement platform with an energy market exchange, wherein the energy market exchange provides prices on distributed generation.

9. The method of claim 1, further comprising providing a real-time energy purchasing solution matching real energy consumption of the at least one energy customer against energy currently available with an energy market exchange.

10. The method of claim 1, further comprising storing and organizing packet level information for forecasting, data mining, revenue extraction, event detection, sophisticated energy management, and enterprise integration.

11. The method of claim 1, further comprising managing and/or distributing and/or allocating a customer payment for the billing period among multiple distributed generators and an existing energy retailer of the at least one energy customer.

12. The method of claim 1, further comprising providing intelligent analytics for the multiplicity of revenue grade distributed generators and the multiplicity of non-revenue grade distributed generators by capturing and transforming market data for trending, forecasting, planning and maximizing revenue and/or investment opportunities.

13. The method of claim 1, further comprising providing intelligent analytics for the multiplicity of power consuming devices at the at least one energy customer by capturing and transforming energy data for energy management, forecasting, procurement, profiling, bill optimization, and/or recommendations.

14. The method of claim 1, wherein the at least one energy customer has a generation capability, an exportable generation capability, and/or function as at least one of the multiplicity of revenue grade distributed generators.

15. The method of claim 1, further comprising providing an interactive graphical user interface for different participants in the advanced energy settlement.

16. The method of claim 1, further comprising providing a mobile application program for the advanced energy settlement.

17. A system for advanced energy settlements in electric power grid, comprising:

an advanced energy settlement platform in network communication with a multiplicity of power consuming devices of at least one energy customer, a multiplicity of revenue grade distributed generators, and a multiplicity of non-revenue grade distributed generators;

wherein the advanced energy settlement platform comprises interactive graphical user interfaces (GUIs) and at least one server computer communicatively connected via a network with distributed computing devices, wherein the advanced energy settlement platform is operable to:

aggregate power consumption data from the multiplicity of power consuming devices of the at least one energy customer;

aggregate revenue grade power supply data from the multiplicity of revenue grade distributed generators;

aggregate revenue grade equivalent power supply data from the multiplicity of non-revenue grade distributed generators, wherein the revenue grade equivalent power supply data is data within less than 10% variation from revenue grade metrology as required by a utility or a governing entity for the electric power grid management and settlement;

create real-time settlement blocks based on the power consumption data, the revenue grade power supply data, and the revenue grade equivalent power supply data received via Internet Protocol (IP)-based metering in real time or near real time, wherein the real-time settlement blocks are further based on energy power purchase agreements between the multiplicity of power consuming devices and the multiplicity of revenue grade distributed generators and the multiplicity of non-revenue grade distributed generators, wherein the real-time settlement blocks are revenue grade settlement blocks;

aggregate for settlement distributed energy charges with the multiplicity of revenue grade distributed generators and the multiplicity of non-revenue grade distributed generators for the multiplicity of power consuming devices of the at least one energy customer based on the real-time settlement blocks during a billing period through a clearinghouse; and aggregate for settlement fixed energy charges with an energy retailer or a retail energy provider for the at least one energy customer during the billing period;

wherein the multiplicity of revenue grade distributed generators and the multiplicity of non-revenue grade distributed generators are operable to alter power supply patterns based on the real-time settlement blocks;

wherein the multiplicity of power consuming devices is operable to update power consumption patterns based on the real-time settlement blocks; and wherein aggregation for settlement of distributed energy charges is initiated via the interactive GUIs by any of the at least one energy customer, the multiplicity of revenue grade distributed generators, and the multiplicity of non-revenue grade distributed generators.

18. The system of claim 17, wherein the power consumption data is measured through sub metering technology in real-time or near real-time and communicated to the advanced energy settlement platform.

19. The system of claim 17, wherein the advanced energy settlement platform is communicatively coupled with at least one energy management system (EMS), and wherein interconnection points and/or geodetic attachment points determine price and order for the advanced energy settlement.

20. The system of claim 17, wherein the interactive GUIs provide for engagement with the advanced energy settlement platform for the at least one energy customer, the retail electric provider, the multiplicity of revenue grade distributed generators and/or the multiplicity of non-revenue grade distributed generators.

21. The system of claim 17, wherein the advanced energy settlement platform further comprises a settlement process for the billing period based on the real-time settlement blocks.

22. The system of claim 17, wherein the advanced energy settlement platform is further operable to map the real-time settlement blocks to corresponding energy power purchase agreements; to calculate a cost or pricing of each of the real-time settlement blocks; and to summate at least one customer balance from the real-time settlement blocks during the billing period.

23. The system of claim 17, wherein the cost of each real-time settlement block includes a Time of Use (TOU), a demand, taxes, a geodetic location, an attachment point, access fees, and/or energy charges.

24. The system of claim 17, wherein the advanced energy settlement platform is integrated with an existing distributed energy market exchange that provides prices on distributed generation of electric power.

25. The system of claim 24, wherein the advanced energy settlement platform is operable to provide a real-time energy purchasing solution matching an actual energy consumption of the at least one energy customer against energy currently available with the existing distributed energy market exchange.

26. The system of claim 17, wherein the advanced energy settlement platform is operable to store and organize packet level information for forecasting, data mining, revenue extraction, event detection, sophisticated energy management, and/or enterprise integration.

27. The system of claim 17, wherein customer payment for the billing period for the multiplicity of revenue grade distributed generators, the multiplicity of non-revenue grade distributed generators and the energy retailer is managed in a single energy bill.

28. The system of claim 17, wherein the advanced energy settlement platform is operable to provide intelligent analytics for the multiplicity of revenue grade distributed generators and the multiplicity of non-revenue grade distributed generators by capturing and transforming market data for trending, forecasting, planning, and/or maximizing revenue or investment opportunities.

29. The system of claim 17, wherein the advanced energy settlement platform is further operable to provide intelligent analytics for the multiplicity of power consuming devices of the at least one energy customer by capturing and transforming energy data for energy management, forecasting, procurement, profiling, bill optimization and/or recommendation.

30. The system of claim 17, wherein the at least one energy customer has a generation capability and an exportable generation capacity, and wherein the at least one energy customer acts as an electric power generator for compensation at a market rate for a time corresponding to its activity to supply power to the electric power grid and/or a microgrid.

31. The system of claim 17, wherein the advanced energy settlement platform is operable to provide at least one participant-oriented interactive GUI for participants in the advanced energy settlement, the participants selected from the group consisting of: the at least one energy customer, the energy retailer, the retail energy provider, the multiplicity of revenue grade distributed generators, and the multiplicity of non-revenue grade distributed generators.

32. The system of claim 17, wherein the advanced energy settlement platform is operable to provide a mobile application program for the advanced energy settlement.

\* \* \* \* \*